US012800775B2

(12) United States Patent
Takenaka et al.

(10) Patent No.: US 12,800,775 B2
(45) Date of Patent: Nov. 17, 2026

(54) RADIATION IMAGING APPARATUS, RADIATION IMAGING SYSTEM, AND CONTROL METHOD FOR RADIATION IMAGING APPARATUS

(71) Applicant: CANON KABUSHIKI KAISHA, Tokyo (JP)

(72) Inventors: Katsuro Takenaka, Saitama (JP); Shutaro Kunieda, Kanagawa (JP); Ryo Ezure, Tokyo (JP); Junki Adachi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 233 days.

(21) Appl. No.: 18/740,345

(22) Filed: Jun. 11, 2024

(65) Prior Publication Data

US 2024/0418873 A1 Dec. 19, 2024

(30) Foreign Application Priority Data

| | | |
|---|---|---|
| Jun. 13, 2023 | (JP) | 2023-097247 |
| Nov. 8, 2023 | (JP) | 2023-191126 |
| Nov. 8, 2023 | (JP) | 2023-191127 |
| Jan. 29, 2024 | (JP) | 2024-011258 |

(51) Int. Cl.

| | |
|---|---|
| *G01T 1/17* | (2006.01) |
| *G01T 1/24* | (2006.01) |
| *G01T 7/00* | (2006.01) |

(52) U.S. Cl.
CPC ................ *G01T 1/17* (2013.01); *G01T 1/245* (2013.01); *G01T 1/247* (2013.01); *G01T 7/005* (2013.01)

(58) Field of Classification Search
CPC ........... G01T 1/17; G01T 1/245; G01T 1/247; G01T 7/005; G06T 5/00; A61B 6/00; A61B 6/571
See application file for complete search history.

(56) References Cited

FOREIGN PATENT DOCUMENTS

| | | | |
|---|---|---|---|
| JP | 2014168602 A | * | 9/2014 |
| JP | 2021126466 A | | 9/2021 |

* cited by examiner

*Primary Examiner* — Courtney D Thomas
(74) *Attorney, Agent, or Firm* — Canon U.S.A., Inc. IP Division

(57) ABSTRACT

A radiation imaging apparatus including a plurality of pixels arranged to form a plurality of pixel rows and a plurality of pixel columns and configured to generate and accumulate electric charges, a driving circuit configured to supply, to the plurality of pixels, a driving signal for selecting one of the plurality of pixels, a readout circuit configured to read out a signal based on the electric charges accumulated in the pixel selected by the driving signal, a control circuit configured to control the readout circuit and the driving circuit and an image generation circuit configured to generate a radiation image.

15 Claims, 26 Drawing Sheets

RADIATION IMAGING APPARATUS, RADIATION IMAGING SYSTEM, AND CONTROL METHOD FOR RADIATION IMAGING APPARATUS

BACKGROUND OF THE DISCLOSURE

Field of the Disclosure

The present disclosure relates to a radiation imaging apparatus, a radiation imaging system, and a control method for the radiation imaging apparatus.

Description of the Related Art

A radiation imaging apparatus has been put into practical use as an imaging apparatus used for medical image diagnosis or nondestructive inspection. A radiation image generated by a radiation imaging apparatus includes noise caused by a dark current flowing to a photodiode or an afterimage generated by last radiation irradiation. To reduce such noise, the radiation image is corrected using an offset image obtained in a state in which the radiation imaging apparatus is not irradiated with radiation. Japanese Patent Laid-Open No. 2014-168602 describes a technique of correcting a radiation image using primary offset data and reference secondary offset data obtained before the start of imaging and immediately preceding secondary offset data obtained after the start of imaging to implement a high frame rate and reduce an afterimage. The immediately preceding secondary offset data is obtained within an exposure time shorter than that of the radiation image. The primary offset data is obtained within an exposure time equal to that of the radiation image. The reference secondary offset data is obtained within an exposure time equal to that of the immediately preceding secondary offset data.

In the technique described in Japanese Patent Laid-Open No. 2014-168602, the temporal relationship of obtaining of the reference secondary offset data with obtaining of the primary offset data is different from the temporal relationship of obtaining of the immediately preceding secondary offset data with obtaining of the radiation image. Therefore, it is difficult to accurately reduce noise in the radiation image.

SUMMARY OF THE DISCLOSURE

Some aspects of the present disclosure provide a technique of accurately reducing noise in the radiation image. According to one aspect of the present disclosure, there is provided a radiation imaging apparatus comprising: a plurality of pixels arranged to form a plurality of pixel rows and a plurality of pixel columns and configured to generate and accumulate electric charges; a driving circuit configured to supply, to the plurality of pixels, a driving signal for selecting one of the plurality of pixels; a readout circuit configured to read out a signal based on the electric charges accumulated in the pixel selected by the driving signal; a control circuit configured to control the readout circuit and the driving circuit; and an image generation circuit configured to generate a radiation image, wherein with respect to at least a first pixel among the plurality of pixels, the control circuit controls the readout circuit and the driving circuit to alternately execute, in imaging preparation, a first readout operation of reading out a first offset signal based on electric charges accumulated in the first pixel for a first time length, and a second readout operation of reading out a second offset signal based on electric charges accumulated in the first pixel for a second time length shorter than the first time length, and alternately execute, after imaging preparation ends, a third readout operation of reading out a radiation signal based on electric charges accumulated in the first pixel for a third time length including a period during which the radiation imaging apparatus is irradiated with radiation, and a fourth readout operation of reading out a third offset signal based on electric charges accumulated in the first pixel for a fourth time length shorter than the third time length without including a period during which the radiation imaging apparatus is irradiated with the radiation, and the image generation circuit generates the radiation image based on correction of the radiation signal using the first offset signal, the second offset signal, and the third offset signal.

Further features of the present disclosure will become apparent from the following description of exemplary embodiments (with reference to the attached drawings).

DESCRIPTION OF THE EMBODIMENTS

Figure 1:
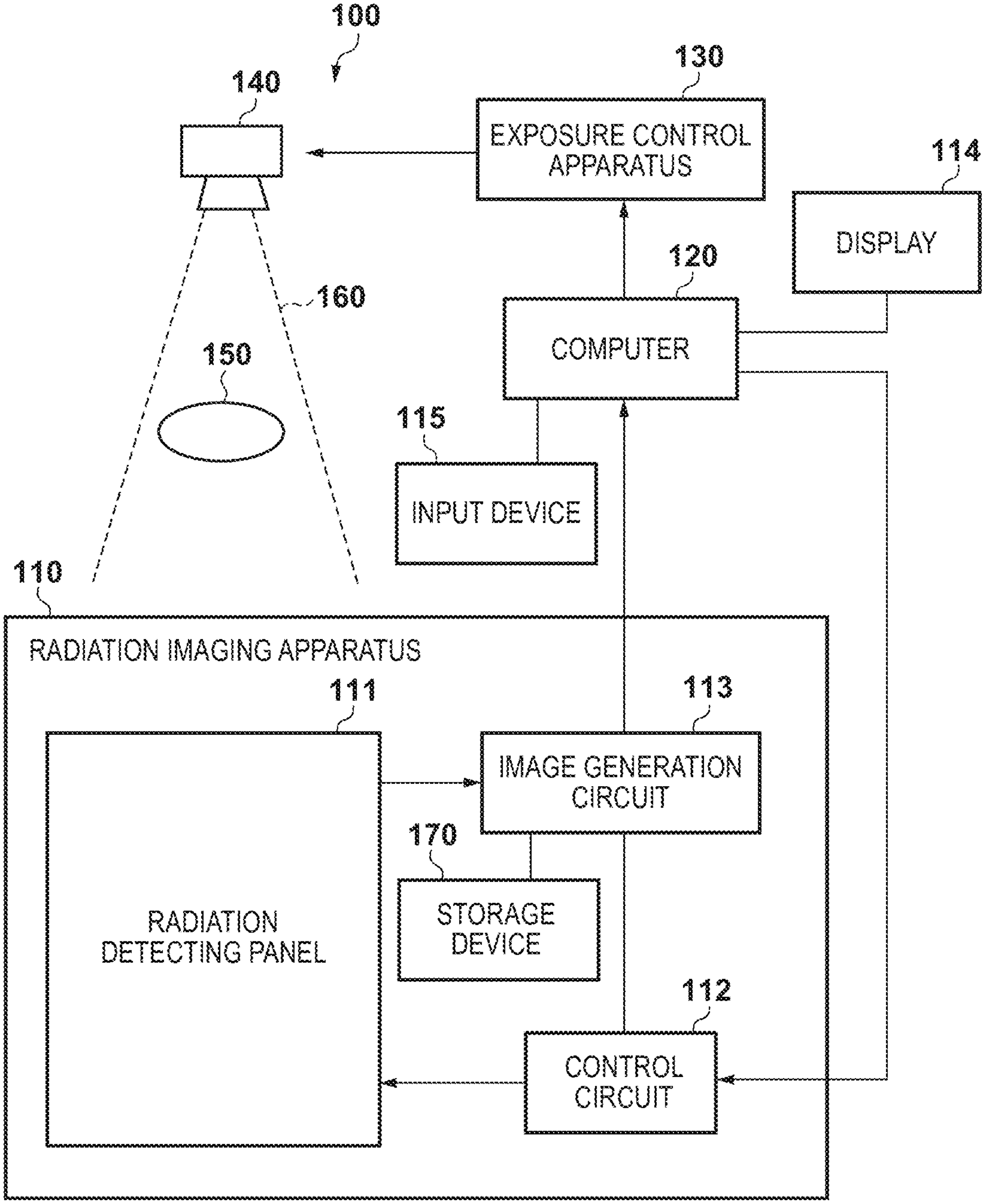
FIG. 1 is a block diagram for explaining an example of the configuration of a radiation imaging system according to some embodiments.

Hereinafter, embodiments will be described in detail with reference to the attached drawings. Note, the following embodiments are not intended to limit the scope of the present disclosure. Multiple features are described in the embodiments, but limitation is not made to the present disclosure that requires all such features, and multiple such features may be combined as appropriate. Furthermore, in the attached drawings, the same reference numerals are given to the same or similar configurations, and redundant description thereof is omitted.

First Embodiment (Overview of Radiation Imaging System)

FIG. 1 shows an example of the configuration of a radiation imaging system 100 according to some embodiments. The radiation imaging system 100 is configured to generate an electrical radiation image by electrically capturing an optical image formed by radiation. The radiation is typically X-rays but may be α-rays, β-rays, γ-rays, or the like. The radiation imaging system 100 includes, for example, a radiation imaging apparatus 110, a computer 120 (to be also referred to as a PC hereinafter), a display 114, an exposure control apparatus 130, and a radiation generating apparatus 140.

The radiation generating apparatus 140 starts irradiation with radiation 160 in accordance with an exposure instruction (emission instruction) from the exposure control apparatus 130. The radiation 160 emitted from the radiation generating apparatus 140 passes through an object 150 to enter the radiation imaging apparatus 110. The radiation generating apparatus 140 stops irradiation with the radiation 160 in accordance with a stop instruction from the exposure control apparatus 130.

The radiation imaging apparatus 110 includes a radiation detecting panel 111, a control circuit 112, an image generation circuit 113, and a storage device 170. The radiation detecting panel 111 generates a radiation image corresponding to the radiation 160 entering the radiation imaging apparatus 110, and transmits the generated radiation image to the computer 120. The control circuit 112 controls the operation of the radiation detecting panel 111. For example, the control circuit 112 generates a stop signal for stopping the irradiation with the radiation 160 from the radiation generating apparatus 140 based on an image signal obtained from the radiation detecting panel 111. The stop signal is supplied to the exposure control apparatus 130. In response to the stop signal, the exposure control apparatus 130 sends a stop instruction to the radiation generating apparatus 140.

The control circuit 112 may be formed by, for example, a dedicated circuit such as a Programmable Logic Device (PLD) including a Field Programmable Gate Array (FPGA), or an Application Specific Integrated Circuit (ASIC). Instead of this, the control circuit 112 may be formed by a combination of a general-purpose processing circuit such as a processor and a storage circuit such as a memory. In this case, the function of the control circuit 112 may be implemented when the general-purpose processing circuit executes a program stored in the storage circuit. The control circuit 112 controls a timing of accumulating electric charges in an image sensor of the radiation detecting panel 111 and a timing of reading out a signal based on the electric charges accumulated in the image sensor.

The image generation circuit 113 stores a signal supplied from the radiation detecting panel 111 in the storage device 170 (memory), and generates a radiation image based on the signal. Details of a method of generating a radiation image will be described later. The image generation circuit 113 transmits the generated radiation image to the computer 120. The image generation circuit 113 stores, in the storage device 170, a radiation image or an offset image generated based on the signal supplied from the radiation detecting panel 111. The image generation circuit 113 performs image correction processing including offset correction (to be described later) using various kinds of correction data stored in the storage device 170.

The computer 120 includes a control unit that controls the radiation imaging apparatus 110 and the exposure control apparatus 130, a reception unit that receives a radiation image from the radiation imaging apparatus 110, and a signal processing unit that processes a radiation image obtained by the radiation imaging apparatus 110. Similar to the control circuit 112, each of the control unit, the reception unit, and the signal processing unit may be formed by a dedicated circuit or a combination of a general-purpose processing circuit and a storage circuit. In an example, the exposure control apparatus 130 includes an exposure switch. When the user turns on the exposure switch, the exposure control apparatus 130 sends an exposure instruction to the radiation generating apparatus 140, and also sends a start notification indicating the start of radiation irradiation to the computer 120. In response to the start notification, the computer 120 that has received the start notification notifies the control circuit 112 of the radiation imaging apparatus 110 of the start of radiation irradiation. In a case where the exposure control apparatus 130 and the computer 120 are not synchronously connected, the radiation detecting panel 111 may detect the start of irradiation with the radiation 160 based on a pixel signal.

Figure 2:
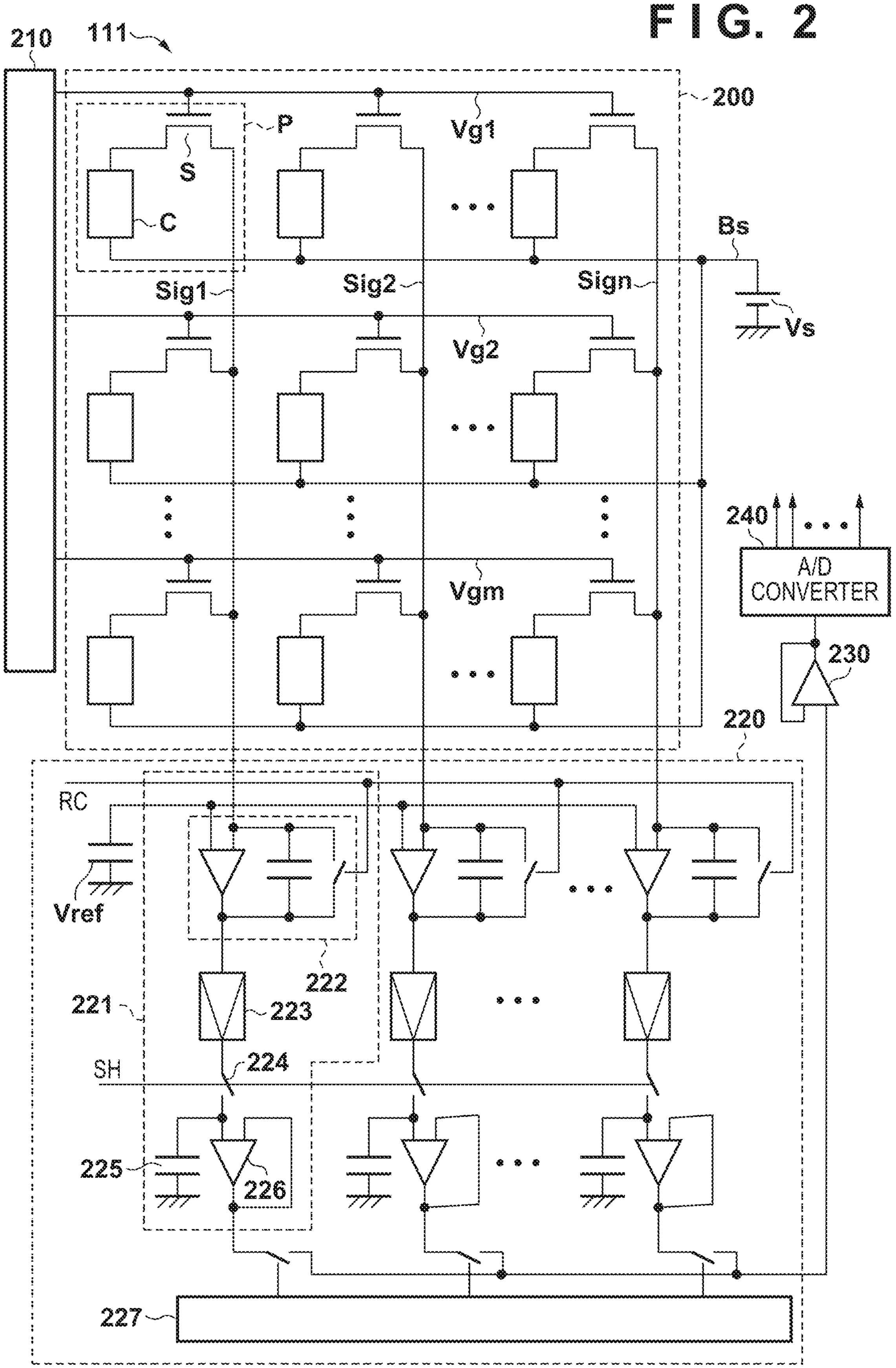
FIG. 2 is an equivalent circuit diagram for explaining an example of the arrangement of a radiation detecting panel according to some embodiments.

FIG. 2 shows an example of the arrangement of the radiation detecting panel 111. The radiation detecting panel 111 includes, for example, a pixel array 200 in which a plurality of pixels P are arrayed in a matrix, a driving circuit 210, a readout circuit 220, a buffer circuit 230, and an analog-to-digital (A/D) converter 240. The driving circuit 210 and the readout circuit 220 function as peripheral circuits of the pixel array 200. The pixel array 200 is formed by, for example, the plurality of pixels P, a plurality of driving lines Vg1 to Vgm, a plurality of signal lines Sig1 to Sign, and a bias line Bs. The driving lines Vg1 to Vgm and the signal lines Sig1 to Sign will correctively be referred to as driving lines Vg and the signal lines Sig, respectively, hereinafter. The plurality of pixels P are arranged to form a plurality of pixel rows and a plurality of pixel columns. The pixel row indicates a set of a plurality of pixels arranged in the horizontal direction in FIG. 2. The pixel column indicates a set of a plurality of pixels arranged in the vertical direction in FIG. 2. In an example, the radiation detecting panel 111 has a size of 17 inches, and the pixel array 200 includes about 3,000 pixel rows×3,000 pixel columns.

The respective pixel rows of the pixel array 200 will be referred to as the first row to the mth row (m is an integer of 1 or more) sequentially from the upper side of FIG. 2 hereinafter, and the respective pixel columns of the pixel array 200 will be referred to as the first column to the nth column (n is an integer of 1 or more) sequentially from the left side of FIG. 2 hereinafter. Each pixel P is formed by a combination of one conversion device C and one switch element S. The pixel P located on the ith row and the jth column in the pixel array 200 is represented by a pixel P(i, j). The conversion device C and the switch element S included in the pixel P(i, j) are represented by a conversion device C(i, j) and a switch element S(i, j), respectively. For example, a pixel P(1, 2) represents the pixel P located on the first row and the second column.

The conversion device C generates electric charges according to radiation entering the pixel P, and accumulates the electric charges. The conversion device C can accumulate not only electric charges according to radiation but also electric charges generated by a dark current. Generation and accumulation of electric charges by the conversion device C of the pixel P will be referred to as generation and accumulation of electric charges by the pixel P hereinafter.

The switch element S is connected between the conversion device C and the signal line Sig corresponding to this conversion device C. For example, the switch elements S(1, 1) to S(m, 1) are connected between the plurality of conversion devices C(1, 1) to C(m, 1) and the signal line Sig1, respectively. When the switch element S is turned on, the conversion device C and the signal line Sig are rendered conductive, and the electric charges obtained by the conversion device C (for example, the electric charges accumulated in the conversion device C) are transferred to the signal line Sig. The conversion device C may be, for example, an MIS type photodiode arranged on an insulating substrate such as a glass substrate and made of amorphous silicon as a main material. Instead of this, the conversion device C may be a PIN type photodiode. The conversion device C may be formed as a direct type that directly converts radiation into electric charges, or formed as an indirect type that converts radiation into light and then detects the light. In the indirect type, a scintillator may be shared by the plurality of pixels P.

The switch element S is formed by, for example, a transistor such as a thin film transistor (TFT) including a control terminal (gate) and two main terminals (source and drain). The conversion device C includes two main electrodes. One main electrode of the conversion device C is connected to one of the two main terminals of the switch element S, and the other main electrode of the conversion device is connected to a bias power supply Vs via the common bias line Bs. The bias power supply Vs generates a bias voltage.

The control terminals of the switch elements S of the pixels P on the first row are connected to the driving line Vg1. The control terminals of the switch elements S of the pixels P on the second row are connected to the driving line Vg2. The same applies to the third to mth rows.

In accordance with a driving signal supplied from the control circuit 112, the driving circuit 210 supplies a driving signal to the control terminal of the switch element S of each pixel P via the driving line Vg. The driving signal includes an ON signal (to be referred to as a high-level voltage hereinafter) for turning on the switch element S, and an OFF signal (to be referred to as a low-level voltage hereinafter) for turning off the switch element S. The driving circuit 210 includes, for example, a shift register, and the shift register executes a shift operation in accordance with a control signal (for example, a clock signal) supplied from the control circuit 112.

Supply of the ON signal (that is, the high-level driving signal) to the pixel P is represented as selection of the pixel P. That is, the driving signal is a signal for selecting one of the plurality of pixels P. The same driving signal is supplied to the plurality of pixels included in the same pixel row. Selection of the plurality of pixels included in one pixel row is represented as selection of the pixel row.

The readout circuit 220 amplifies a signal that appears in the signal line Sig by selecting the pixel P, and reads out the signal. This signal is based on the electric charges accumulated in the conversion device C. Readout of the signal based on the electric charges accumulated in the conversion device C of the pixel P is represented as readout of the signal based on the electric charges accumulated in the pixel P.

The readout circuit 220 includes one amplification circuit 221 for each signal line Sig. Since the pixel array 200 includes n signal lines Sig in the example shown in FIG. 2, the readout circuit 220 includes n amplification circuits 221. The amplification circuit 221 includes, for example, an integration amplifier 222, a variable amplifier 223, a switch element 224, a capacitor 225, and a buffer circuit 226. The switch element 224 and the capacitor 225 form a sample and hold circuit. The integration amplifier 222 includes, for example, an operational amplifier, and an integral capacitor and reset switch connected in parallel between the output terminal and the inverting input terminal of the operational amplifier. A reference voltage is supplied from a reference power supply Vref to the noninverting input terminal of the operational amplifier. When the reset switch is turned on in accordance with a control signal RC (reset pulse) supplied from the control circuit 112, the integral capacitor is reset and the potential of the signal line Sig is also reset to a reference potential. The variable amplifier 223 amplifies a signal from the integration amplifier 222 by a set amplification factor. The sample and hold circuit samples and holds a signal from the variable amplifier 223. ON/OFF of the switch element 224 forming the sample and hold circuit is controlled by a control signal SH supplied from the control circuit 112. The buffer circuit 226 buffers (impedance-converts) the signal from the sample and hold circuit, and outputs the signal.

The readout circuit 220 includes a multiplexer 227 that selects signals from the plurality of amplification circuits 221 in a predetermined order and outputs them. The multiplexer 227 includes, for example, a shift register, and the shift register executes a shift operation in accordance with a control signal (for example, a clock signal) supplied from the control circuit 112. This shift operation selects one of signals from the plurality of amplification circuits 221.

The buffer circuit 230 buffers (impedance-converts) the signal output from the multiplexer 227. The A/D converter 240 converts the analog signal output from the buffer circuit 230 into a digital signal. The output from the A/D converter 240, that is, a pixel signal is transmitted to the computer 120.

Figure 3:
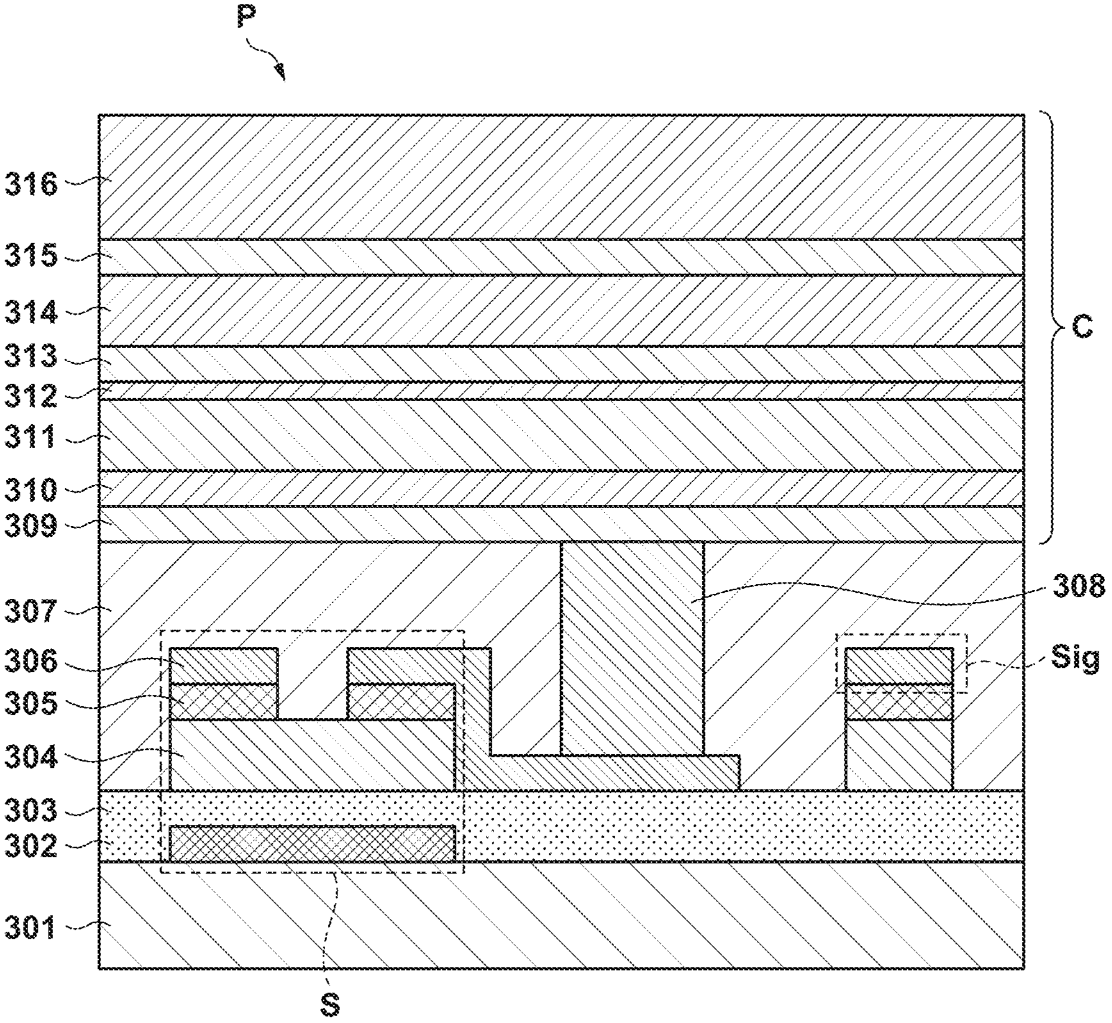
FIG. 3 is a schematic view for explaining an example of the structure of a pixel according to some embodiments.

FIG. 3 schematically shows an example of the sectional structure of one pixel P. The pixel P is formed on an insulating substrate 301 such as a glass substrate. The pixel P includes a conductive layer 302, an insulation layer 303, a semiconductor layer 304, an impurity semiconductor layer 305, and a conductive layer 306 on the insulating substrate 301. The conductive layer 302 forms the gate of the transistor (for example, TFT) forming the switch element S. The insulation layer 303 is arranged to cover the conductive layer 302. The semiconductor layer 304 is arranged on a portion, forming the gate, of the conductive layer 302 via the insulation layer 303. The impurity semiconductor layer 305 is arranged on the semiconductor layer 304 to form the two main terminals (source and drain) of the transistor forming the switch element S. The conductive layer 306 forms wiring patterns respectively connected to the two main terminals (source and drain) of the transistor forming the switch element S. Part of the conductive layer 306 forms the signal line Sig, and another part forms a wiring pattern for connecting the conversion device C and the switch element S.

The pixel P further includes an interlayer insulation film 307 that covers the insulation layer 303 and the conductive layer 306. In the interlayer insulation film 307, a contact plug 308 for connection to the conductive layer 306 (switch element S) is provided. The pixel P further includes, on the interlayer insulation film 307, a conductive layer 309, an insulation layer 310, a semiconductor layer 311, an impurity semiconductor layer 312, a conductive layer 313, a protective layer 314, an adhesive layer 315, and a scintillator 316 in this order. These layers form the indirect type conversion device C. The conductive layers 309 and 313 respectively form a lower electrode and an upper electrode of a photoelectric conversion device forming the conversion device C. The conductive layer 313 is made of, for example, a transparent material. The conductive layer 309, the insulation layer 310, the semiconductor layer 311, the impurity semiconductor layer 312, and the conductive layer 313 form a MIS type sensor as a photoelectric conversion device. The impurity semiconductor layer 312 is formed by, for example, an n-type impurity semiconductor layer. The scintillator 316 is made of, for example, a gadolinium-based material or cesium iodide (CsI) material, and converts radiation into light.

Instead of the above-described example, the conversion device C may be formed as a direct type conversion device that directly converts incident radiation into electric charges. As the direct type conversion device C, for example, there is provided a conversion device made of amorphous selenium, gallium arsenide, gallium phosphide, lead iodide, mercury iodide, CdTe, CdZnTe, or the like as a main material. The conversion device C is not limited to the MIS type, and for example, a pn type or PIN type photodiode may be used.

In the example shown in FIG. 3, in an orthogonal projection (planar view) to the surface of the insulating substrate 301 on which the pixel array 200 is formed, each of the plurality of signal lines Sig overlaps part of the conversion device C. This arrangement is advantageous in increasing the area of the conversion device C of each pixel P.

Figure 4:
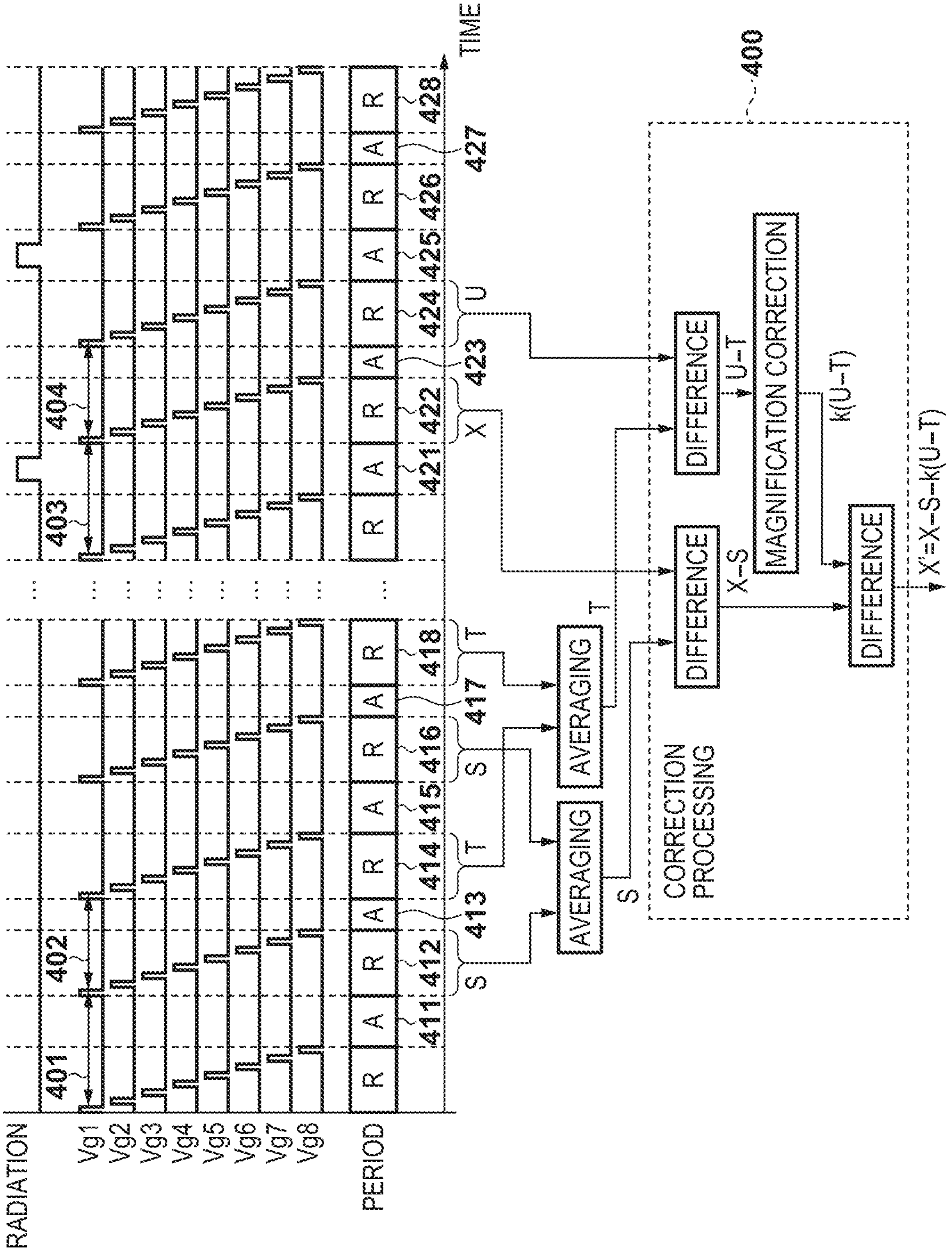
FIG. 4 is a view for explaining an example of the operation of the radiation imaging system according to some embodiments.

An example of the operation of the radiation imaging system 100 will be described with reference to FIG. 4. The upper side of FIG. 4 shows a timing chart, and the lower side of FIG. 4 shows the procedure of signal processing. The same applies to FIGS. 5 to 7 to be described later. The operation shown in FIG. 4 is started when, for example, the user of the radiation imaging system 100 gives an instruction. The operation of the radiation imaging system 100 is controlled by the computer 120. Under the control of the computer 120, the operation of the radiation imaging apparatus 110 is executed by the control circuit 112. More specifically, the control circuit 112 executes the operation shown in FIG. 4 by controlling the driving circuit 210 and the readout circuit 220. In the following description, execution of a specific operation by controlling the driving circuit 210 or the readout circuit 220 by the control circuit 112 will sometimes simply be referred to as execution of a specific operation by the control circuit 112 hereinafter.

In the timing chart shown in FIG. 4, “radiation” indicates whether the radiation imaging apparatus 110 is irradiated with the radiation 160. Low level indicates that the radiation imaging apparatus 110 is not irradiated with the radiation 160 and high level indicates that the radiation imaging apparatus 110 is irradiated with the radiation 160.

In the timing chart shown in FIG. 4, “Vg1” to “Vg8” represent the levels of driving signals supplied from the driving circuit 210 to the driving lines Vg1 to Vg8, respectively. In the example shown in FIG. 4, a case where the pixel array 200 includes eight pixel rows will be described but the number of pixel rows is not limited to this.

In the timing chart shown in FIG. 4, “period” represents a period during which a specific operation is executed. Imaging by the radiation imaging apparatus 110 includes an accumulation period (“A” in FIG. 4) during which an accumulation operation is executed and a readout period (“R” in FIG. 4) during which a readout operation is executed. The control circuit 112 selects none of the plurality of pixels P included in the pixel array 200 during the accumulation period. More specifically, the driving circuit 210 maintains a state in which an OFF signal is supplied to each of the driving lines Vg1 to Vg8. This accumulates, in each conversion device C, electric charges generated in the conversion device C, and also accumulates electric charges according to a dark current flowing to each conversion device C.

During the readout period, the control circuit 112 selects each of the plurality of pixels P included in the pixel array 200, and reads out a signal from the selected pixel P. More specifically, the driving circuit 210 sequentially supplies an ON signal to each of the driving lines Vg1 to Vg8. First, the driving circuit 210 supplies the ON signal only to the driving line Vg1. This turns on the switch element S(1, j) (j=1, . . . , n), the conversion device C(1, j) and the signal line Sigj are rendered conductive, and thus the electric charges accumulated in the conversion device C(1, j) are read out into the signal line Sigj. Next, the driving circuit 210 supplies the ON signal only to the driving line Vg2. This turns on the switch element S(2, j), the conversion device C(2, j) and the signal line Sigj are rendered conductive, and thus the electric charges accumulated in the conversion device C(2, j) are read out into the signal line Sigj. When the driving circuit 210 repeats this operation up to the driving line Vg8, the electric charges based on those accumulated in the conversion device C are read out by the readout circuit 220 via the signal line Sigj. In the following description, execution of the readout operation for the plurality of pixels P means execution of the readout operation for each of the plurality of pixels P.

The operation by the radiation imaging apparatus 110 includes an operation executed in imaging preparation and an operation executed after imaging preparation ends. A period after imaging preparation ends may include a period during which a radiation image is captured, and may further include a period during which a moving image is captured. The period during which the radiation image is captured may be called an imaging period. As will be described later, during the imaging period, the radiation imaging apparatus 110 need not always be irradiated with the radiation 160, and may intermittently be irradiated with the radiation 160.

In imaging preparation, the radiation imaging apparatus 110 is not irradiated with the radiation 160. Imaging preparation may end when a predetermined condition is satisfied. The predetermined condition may be, for example, a condition that a predetermined number of offset images (to be described later) are generated. When imaging preparation ends, the radiation imaging apparatus 110 may notify the computer 120 that radiation irradiation is possible.

After imaging preparation ends, the radiation imaging apparatus 110 is irradiated with the radiation 160, thereby generating a radiation image corresponding to the radiation 160. As shown in FIG. 4, the radiation imaging apparatus 110 may be irradiated with the radiation 160 as a plurality of pulses. The radiation imaging apparatus 110 may generate a radiation image for each pulse. When the radiation imaging apparatus 110 executes moving image capturing, a radiation image for each pulse may form a frame of a moving image.

The control circuit 112 alternately executes the accumulation operation and the readout operation in imaging preparation. As shown in FIG. 4, the accumulation operation is executed during an accumulation period 411, and signals based on electric charges accumulated in the plurality of pixels P are read out during a subsequent readout period 412. Similarly, in an accumulation period 413 to a readout period 418, the control circuit 112 reads out, during the subsequent readout period, at least signals based on electric charges accumulated during the accumulation period. Signals read out from the pixels P in imaging preparation are used to generate an offset image.

During the readout period 412, a signal based on electric charges accumulated for a time length 401 is read out from the pixel P. The time length 401 is a time length from when the last readout operation of the pixel P ends (that is, the driving signal changes to low level) until the current readout operation of the pixel P ends (that is, the driving signal changes to low level again). The same applies to other time lengths for which electric charges are accumulated. The time length 401 includes the accumulation period 411. During the readout period 414, a signal based on electric charges accumulated for a time length 402 is read out from the pixel P. The time length 402 includes the accumulation period 413.

In the example shown in FIG. 4, the accumulation period 413 is shorter than the accumulation period 411. Thus, the time length 402 is shorter than the time length 401. A signal read out from the pixel P during the readout period 412 is represented as a long-time offset signal, and a signal read out from the pixel P during the readout period 414 is represented as a short-time offset signal.

The image generation circuit 113 generates a long-time offset image S based on the long-time offset signals read out from the plurality of pixels P included in the pixel array 200. The long-time offset image S is represented as a matrix of m rows and n columns, and the signal read out from the pixel P(i, j) is the (i, j) element of the matrix. The image generation circuit 113 generates a short-time offset image T based on the short-time offset signals read out from the plurality of pixels P included in the pixel array 200. The short-time offset image T is represented as a matrix of m rows and n columns, and the signal read out from the pixel P(i, j) is the (i, j) element of the matrix.

The control circuit 112 repeatedly executes the operations in the accumulation period 411 to the readout period 414. That is, the same operations as in the accumulation period 411 to the readout period 414 are executed in the accumulation period 415 to the readout period 418. In this way, the control circuit 112 alternately executes the readout operation of reading out the long-time offset signals and the readout operation of reading out the short-time offset signals in imaging preparation.

After imaging preparation ends, the control circuit 112 starts to capture a moving image (that is, a plurality of radiation images). More specifically, the control circuit 112 alternately executes the accumulation operation and the readout operation. As shown in FIG. 4, the accumulation operation is executed during an accumulation period 421, and signals based on electric charges accumulated in the plurality of pixels P are read out during a subsequent readout period 422. Similarly, in an accumulation period 423 to a readout period 428, the control circuit 112 reads out, during the subsequent readout period, at least signals based on electric charges accumulated during the accumulation period. Signals read out from the pixels P after imaging preparation ends are used to generate a radiation image and an offset image.

During the readout period 422, a signal based on electric charges accumulated for a time length 403 is read out from the pixel P. The time length 403 includes the accumulation period 421. The accumulation period 421 includes a period during which the radiation imaging apparatus 110 is irradiated with the radiation 160. Therefore, the time length 403 includes a period during which the radiation imaging apparatus 110 is irradiated with the radiation 160. The time length 403 may be equal to the time length 401. During the readout period 424, a signal based on electric charges accumulated for a time length 404 is read out from the pixel P. The time length 404 includes the accumulation period 423. The time length 404 does not include a period during which the radiation imaging apparatus 110 is irradiated with the radiation 160. The time length 404 may be equal to the time length 402.

In the example shown in FIG. 4, the accumulation period 423 is shorter than the accumulation period 421. Thus, the time length 404 is shorter than the time length 403. A signal read out from the pixel P during the readout period 422 is represented as a radiation signal, and a signal read out from the pixel P during the readout period 424 is represented as an imaging offset signal. The radiation signal includes a component corresponding to the radiation 160 with which the radiation imaging apparatus 110 is irradiated during the accumulation period 421. By setting the accumulation period 423 shorter than the accumulation period 421, the frame rate of the moving image generated by the radiation imaging apparatus 110 can be improved.

The image generation circuit 113 generates a radiation image X based on the radiation signals read out from the plurality of pixels P included in the pixel array 200. The radiation image X is represented as a matrix of m rows and n columns, and the signal read out from the pixel P(i, j) is the (i, j) element of the matrix. The image generation circuit 113 generates an imaging offset image U based on the imaging offset signals read out from the plurality of pixels P included in the pixel array 200. The imaging offset image U is represented as a matrix of m rows and n columns, and the signal read out from the pixel P(i, j) is the (i, j) element of the matrix.

The control circuit 112 repeatedly executes the operations in the accumulation period 421 to the readout period 424. That is, the same operations as in the accumulation period 421 to the readout period 424 are executed in the accumulation period 425 to the readout period 428. In this way, the control circuit 112 alternately executes the readout operation of reading out the radiation signals and the readout operation of reading out the imaging offset signals after imaging preparation ends (for example, in capturing a moving image).

Subsequently, a method in which the image generation circuit 113 corrects the radiation image X using the long-time offset image S, the short-time offset image T, and the imaging offset image U will be described. As described above, components of the long-time offset image S, the short-time offset image T, the imaging offset image U, and the radiation image X are respectively given by the long-time offset signal, the short-time offset signal, the imaging offset signal, and the radiation signal. In the following method, the radiation signal is corrected using the long-time offset signal, the short-time offset signal, and the imaging offset signal.

As described above, in imaging preparation, the control circuit 112 alternately executes generation of the long-time offset image S and generation of the short-time offset image T. This generates the plurality of long-time offset images S and the plurality of short-time offset images T. In imaging preparation, the image generation circuit 113 creates one long-time offset image S by averaging the plurality of long-time offset images S, and stores the created image in the memory of the image generation circuit 113 for subsequent processing. Similarly, in imaging preparation, the image generation circuit 113 creates one short-time offset image T by averaging the plurality of short-time offset images T, and stores the created image in the memory of the image generation circuit 113 for subsequent processing. By averaging the plurality of offset images in this way, noise included in the offset image can be reduced. The number of offset images used for averaging may be two, as shown in FIG. 4, or may be three or more. The number of offset images used for averaging may be preset.

After imaging preparation ends, the image generation circuit 113 generates the radiation image X and the imaging offset image U, and stores them in the memory of the image generation circuit 113. The image generation circuit 113 reads out the long-time offset image S from the memory, and subtracts the long-time offset image S from the radiation image X, thereby generating a radiation afterimage ("X−S" in FIG. 4). In addition, the image generation circuit 113 reads out the short-time offset image T from the memory, and subtracts the short-time offset image T from the imaging offset image U, thereby generating an offset afterimage ("U−T" in FIG. 4).

An afterimage component included in each of the radiation afterimage and the offset afterimage is proportional to a time length for which electric charges are accumulated in the pixel P. The image generation circuit 113 generates an adjustment afterimage ("k(U−T)" in FIG. 4) by multiplying each element of the offset afterimage by a coefficient k equal to the ratio of the time length 403 to the time length 404 (that is, a value obtained by dividing the time length 403 by the time length 404). After that, the image generation circuit 113 generates a radiation image X'(=X−kU+(kT−S)) by subtracting the adjustment afterimage from the radiation afterimage. The radiation image X' is an image obtained by correcting the radiation image X using the long-time offset image S, the short-time offset image T, the imaging offset image U, and the coefficient k. The image generation circuit 113 transmits the corrected radiation image X' to the computer 120.

The above-described calculation order for generating the radiation image X' is merely an example, and calculation may be performed in another order. The radiation image X', that is, X−S−k(U−T) is changed to X−kU+(KT−S). In imaging preparation, the image generation circuit 113 may calculate kT−S using the long-time offset image S, the short-time offset image T, and the coefficient k, and store the value as a correction value in the memory of the image generation circuit 113. The coefficient k can be decided based on the preset of a timing at which the driving circuit 210 supplies the ON signal to the pixel array 200. In capturing a moving image, the image generation circuit 113 may correct the radiation image X using the imaging offset image U, the correction value stored in the memory, and the coefficient k. In this way, by storing the correction value instead of storing the long-time offset image S and the short-time offset image T, it is possible to reduce the memory consumption of the image generation circuit 113.

Subsequently, the technical significance to alternately execute obtaining of the long-time offset image S and obtaining of the short-time offset image T will be described. The driving lines Vg1 to Vgm have various capacitive couplings in the pixel array 200. For example, the driving line Vg2 intersects the signal lines Sig1 to Sign at a plurality of positions of the pixel array 200, and has capacitive coupling at each intersection. Since the driving line Vg2 extends in parallel to the driving line Vg3, it also has capacitive coupling with the driving line Vg3. Since the driving line Vg2 extends in parallel to part of the bias line Bs, it also has capacitive coupling with the bias line Bs. Furthermore, the driving line Vg2 has capacitive coupling with a node of a connecting portion between the switch element S and the conversion device C.

These capacitive couplings change the level of the driving signal supplied to the driving line Vg, and thus the potentials of the signal line Sig, the bias line Bs, other driving lines Vg, and the node of the connecting portion between the switch element S and the conversion device C also change. The signal line Sig, the bias line Bs, other driving lines Vg, and the node of the connecting portion between the switch element S and the conversion device C whose potentials have changed return to the original potentials with time. However, the return amount is different depending on the length of the accumulation period.

Even if the switch element S is in the OFF state, a leakage current may flow. When the switch element S is turned off, the node between the conversion device C and the switch element S changes to the low level side due to injection of electric charges from the control terminal (gate). Therefore, immediately after the switch element S is turned off, a potential difference is generated between the main terminals (source and drain) to cause a leakage current to flow. The leakage current depends on the potential difference between the two main terminals (source and drain) of the switch element. If a leakage current flows during the accumulation period, the potential difference becomes small, and thus the leakage current is different depending on the length of the accumulation period. If the leakage current flows to the switch element S, a current also flows to the signal line Sig and the bias line Bs.

For the above reasons, obtained offset images may be different between a case where the long-time offset image S and the short-time offset image T are continuously obtained a plurality of times and a case where the long-time offset image S and the short-time offset image T are alternately obtained. In the above-described operation of the radiation imaging apparatus 110, the long-time offset image S and the short-time offset image T are alternately obtained in imaging preparation, and the radiation image X and the imaging offset image U are alternately obtained after imaging preparation ends. This can make the state of the capacitive coupling in the pixel array 200 in imaging preparation close to the state of the capacitive coupling in the pixel array 200 in capturing a radiation image. Therefore, it is possible to accurately reduce noise included in the radiation image X.

In the operation shown in FIG. 4, the image generation circuit 113 corrects the radiation signal using the imaging offset signal obtained after the radiation signal. Instead of this, the image generation circuit 113 may correct the radiation signal using the imaging offset signal obtained before the radiation signal.

In the above-described example, the time length 401 is equal to the time length 403. Instead of this, these time lengths may be different from each other. In a case where the time lengths are different from each other, the image generation circuit 113 may multiply each element of the long-time offset image S by the ratio of the time length 403 to the time length 401, and then subtract the resultant from the radiation image X. In the above-described example, the time length 402 is equal to the time length 404. Instead of this, these time lengths may be different from each other. In a case where the time lengths are different from each other, the image generation circuit 113 may multiply each element of the short-time offset image T by the ratio of the time length 404 to the time length 402, and then subtract the resultant from the imaging offset image U.

Subsequently, an example of the operation of the radiation imaging apparatus 110 different from the above-described operation shown in FIG. 4 will be described with reference to FIG. 5. In the operation shown in FIG. 4, to generate the short-time offset image T and the imaging offset image U, the control circuit 112 selects one of the plurality of pixel rows at one time. In the operation shown in FIG. 5, to generate the short-time offset image T and the imaging offset image U, the control circuit 112 selects two of the plurality of pixel rows at one time. More specifically, the control circuit 112 simultaneously selects the (2h−1)th pixel row and the 2hth pixel row (h=1, . . . , m/2). Such operation of simultaneously selecting a plurality of pixel rows can be called a binning operation. In the example shown in FIG. 5, two pixel rows are simultaneously selected but three or more pixel rows may simultaneously be selected.

For example, the control circuit 112 selects the first pixel row and the second pixel row during a period (that may be referred to as the first pixel row selection period) in which the driving signal supplied to the driving line Vg1 is at high level in the readout period 424. This reads out imaging offset signals based on electric charges accumulated in the pixel P(1, j) and electric charges accumulated in the pixel P(2, j).

By reading out the imaging offset signal by the binning operation, it is possible to shorten the readout period (for example, the readout period 424) for reading out the imaging offset signal. As a result, it is possible to improve the frame rate of a moving image. The accumulation period 423 may be shorter than the accumulation period 421 or may be equal to the accumulation period 421. Even if the length of the accumulation period 423 is equal to that of the accumulation period 421, it is possible to improve the frame rate of a moving image by reading out the imaging offset signals by the binning operation. Since the imaging offset signals are read out by the binning operation, short-time offset signals to be used as differences from the imaging offset signals may be read out by the binning operation. Instead of this, the short-time offset signal may be read out by a normal operation (selection of one row). In this case, the short-time offset signal may be multiplied by the coefficient for adjusting the time length for which electric charges are accumulated in the pixel P.

Figure 5:
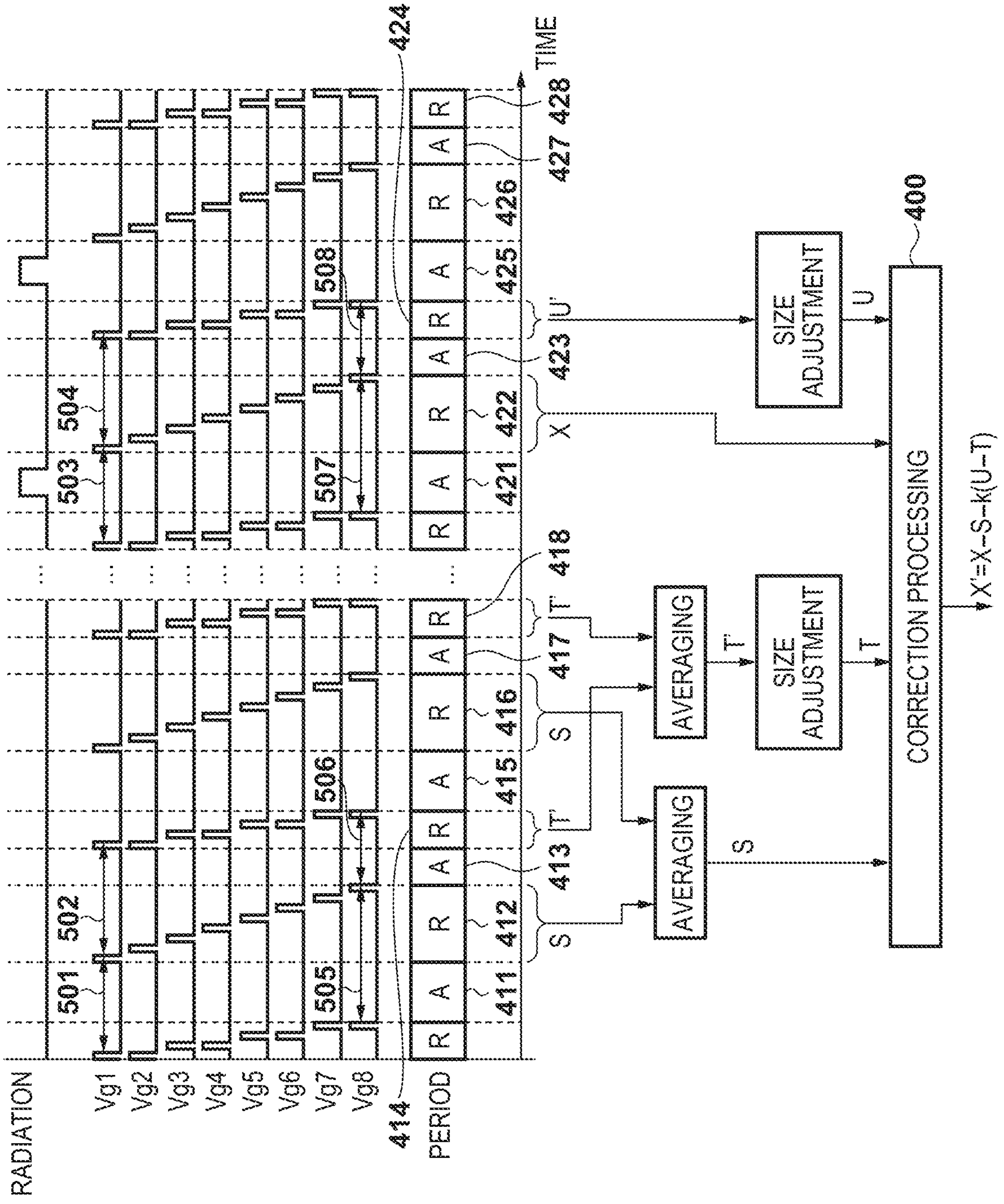
FIG. 5 is a view for explaining an example of the operation of the radiation imaging system according to some embodiments.

In the operation shown in FIG. 5, to generate the long-time offset image S and the radiation image X, the control circuit 112 may select one of the plurality of pixel rows at one time, similar to the operation shown in FIG. 4. For example, the control circuit 112 selects the first pixel row and does not select another row (for example, the second pixel row) during a period (that may be referred to as the first pixel row selection period) in which the driving signal supplied to the driving line Vg1 is at high level in the readout period 422. This reads out a radiation signal based on electric charges accumulated in the pixel P(1, j). Instead of the operation shown in FIG. 5, the binning operation may be performed to generate the long-time offset image S and the radiation image X.

Subsequently, a radiation image generation method in the operation shown in FIG. 5 will be described. The image generation circuit 113 generates the long-time offset image S in imaging preparation, as in the explanation of FIG. 4. Furthermore, in imaging preparation, the image generation circuit 113 generates a short-time offset image T' based on the short-time offset signals read out, by the binning operation, from the plurality of pixels P included in the pixel array 200. The short-time offset image T' is represented as a matrix of (m/2) rows and n columns, and signals read out from the pixels P(2i−1, j) and P(2i, j) give the (i, j) element of the matrix (i=1, . . . , m/2, j=1, . . . , n). The image generation circuit 113 may generate one short-time offset image T' by averaging the plurality of short-time offset images T'.

After that, the image generation circuit 113 generates the short-time offset image T by adjusting the size of the short-time offset image T' to be equal to the size of the radiation image X. More specifically, the image generation circuit 113 sets, as the (i, j) element (i=1, . . . , m, j=1, . . . , n) of the short-time offset image T, a value obtained by multiplying the (Ceiling (i/2), j) element of the short-time offset image T' by ½. Ceiling represents a ceiling function, that is, round-up of digits after the decimal point. The reason why the element is multiplied by ½ is that each element of the short-time offset image T' represents the sum of the signals of two pixels.

After that, as in the explanation of FIG. 4, the image generation circuit 113 generates the radiation image X after imaging preparation ends. In addition, after imaging preparation ends, the image generation circuit 113 generates the imaging offset image U' based on the imaging offset signals read out, by the binning operation, from the plurality of pixels P included in the pixel array 200. A method of generating the imaging offset image U' is the same as the method of generating the short-time offset image T' and a description thereof will be omitted. After that, the image generation circuit 113 generates the imaging offset image U by adjusting the size of the imaging offset image U' to be equal to the size of the radiation image X. A method of generating the imaging offset image U is the same as the method of generating the short-time offset image T and a description thereof will be omitted.

The image generation circuit 113 generates the radiation image X' by correcting the radiation image X using the thus generated long-time offset image S, short-time offset image T, and imaging offset image U. The correction processing of the radiation image X may be the same as correction processing 400 shown in FIG. 4 and a description thereof will be omitted.

The adjustment of the size of the offset image may be performed in another order. For example, the image generation circuit 113 may generate the adjustment image of the correction processing 400 without adjusting the size of the offset image, and then adjust the size of the adjustment image.

As shown in FIG. 5, the ratio of the length of the accumulation time of electric charges read out as a radiation signal to the length of the accumulation time of electric charges read out as an imaging offset signal is different for each pixel row. This is caused by reading out the radiation signal by a normal operation (that is, one of pixel rows is selected at one time) and reading out the imaging offset signals by the binning operation. For example, on the first pixel row, a radiation signal based on electric charges accumulated in the pixel P for a time length 503 is read out and an imaging offset signal based on electric charges accumulated in the pixel P for a time length 504 is read out. On the eighth pixel row, a radiation signal based on electric charges accumulated in the pixel P for a time length 507 is read out and an imaging offset signal based on electric charges accumulated in the pixel P for a time length 508 is read out. The time length 507 is different from the time length 503. The time length 508 is different from the time length 504. Furthermore, the ratio of the time length 508 to the time length 507 is different from the ratio of the time length 503 to the time length 504.

The image generation circuit 113 may use an individual coefficient k for each pixel row in the correction processing 400. More specifically, the image generation circuit 113 may use the ratio of the time length 503 to the time length 504 as the coefficient k with respect to the pixel P included in the first pixel row. The image generation circuit 113 may use the ratio of the time length 507 to the time length 508 as the coefficient k with respect to the pixel P included in the eighth pixel row.

With respect to each of the plurality of pixel rows, the length of the accumulation time of the electric charges read out as a long-time offset signal may be equal to the length of the accumulation time of the electric charges read out as a radiation signal. For example, with respect to the first pixel row, a time length 501 may be equal to the time length 503 and a time length 502 may be equal to the time length 504. With respect to the eighth pixel row, a time length 505 may be equal to the time length 507 and a time length 506 may be equal to the time length 508.

Figure 6:
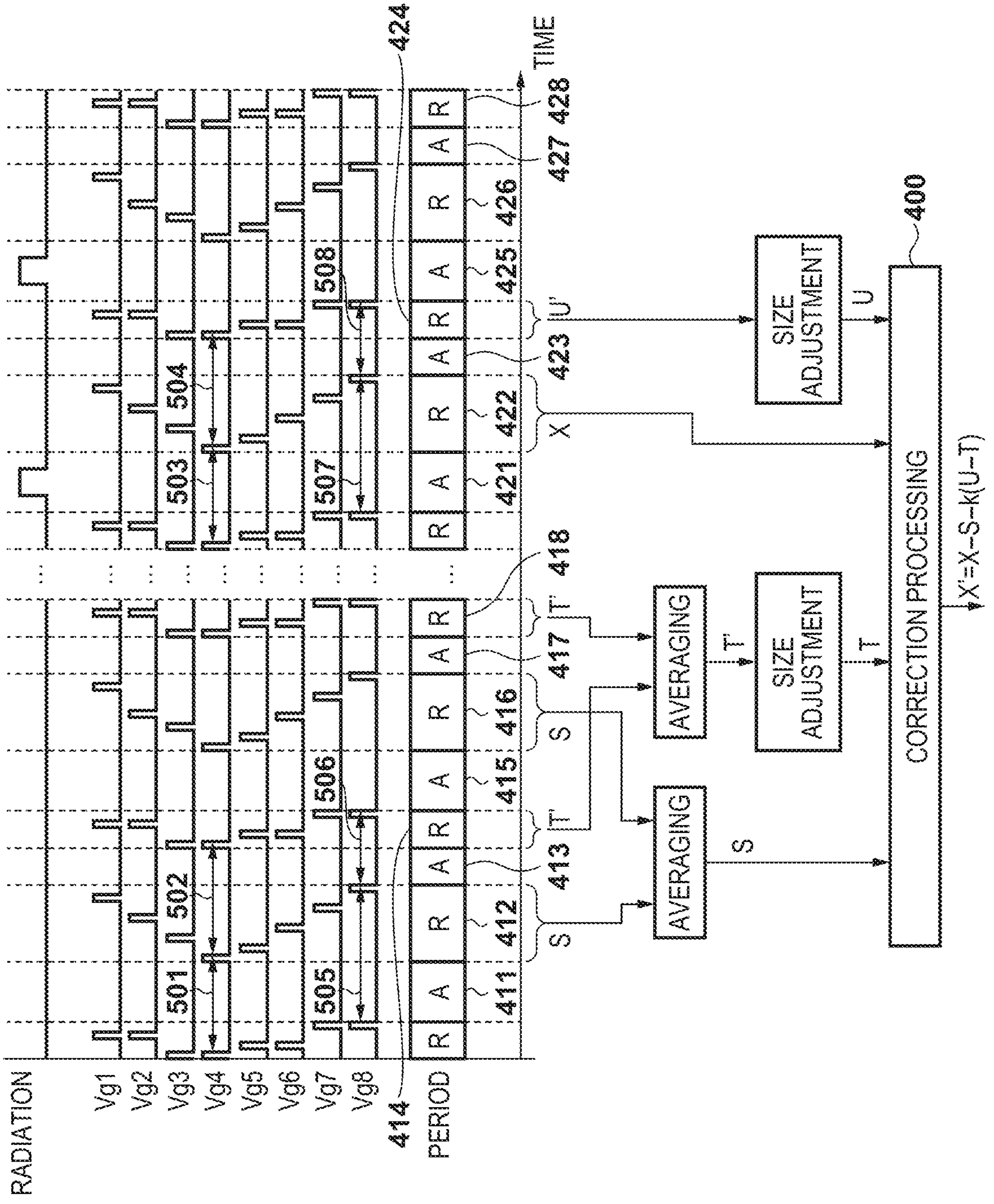
FIG. 6 is a view for explaining an example of the operation of the radiation imaging system according to some embodiments.

Subsequently, an example of the operation of the radiation imaging apparatus 110 different from the above-described operation shown in FIG. 4 will be described with reference to FIG. 6. In the operation shown in FIG. 6, similar to the operation shown in FIG. 5, the short-time offset signals and the imaging offset signals are read out by the binning operation. In the operation shown in FIG. 6, to read out a signal from each of the plurality of pixels P included in the pixel array 200, a pixel row is selected outward from the center of the plurality of pixel rows. More specifically, in the example shown in FIG. 5, to read out the long-time offset signals and the radiation signals, the control circuit 112 sequentially selects the pixel rows in the order of the fourth row, the fifth row, the third row, the sixth row, the second row, the seventh row, the first row, and the eighth row. To read out the short-time offset signals and the imaging offset signals, the control circuit 112 sequentially selects the pixel rows in the order of the third and fourth rows, the fifth and sixth rows, the first and second rows, and the seventh and eighth rows. In this way, in the operation shown in FIG. 6, the control circuit 112 selects pixel rows located at the center of the plurality of pixel rows before two pixel rows located at the two ends of the plurality of pixel rows.

In the operation shown in FIG. 6, the coefficient k for the pixel row selected first is smaller than the coefficient k for the pixel row selected later. As the coefficient k is larger, noise included in the short-time offset signal and the imaging offset signal can be increased. Therefore, by selecting the pixel row so that the coefficient k for the pixel P which is located at the center of the image and is highly probably in a region of interest of the radiation image is small, it is possible to further reduce a deterioration in image quality of the radiation image caused by noise. In a case where the coefficient k is large, noise may be increased. Therefore, the coefficient k may be set to a value smaller than the ratio between the lengths of the electric charge accumulation times in accordance with the degree of influence of an afterimage.

Figure 7:
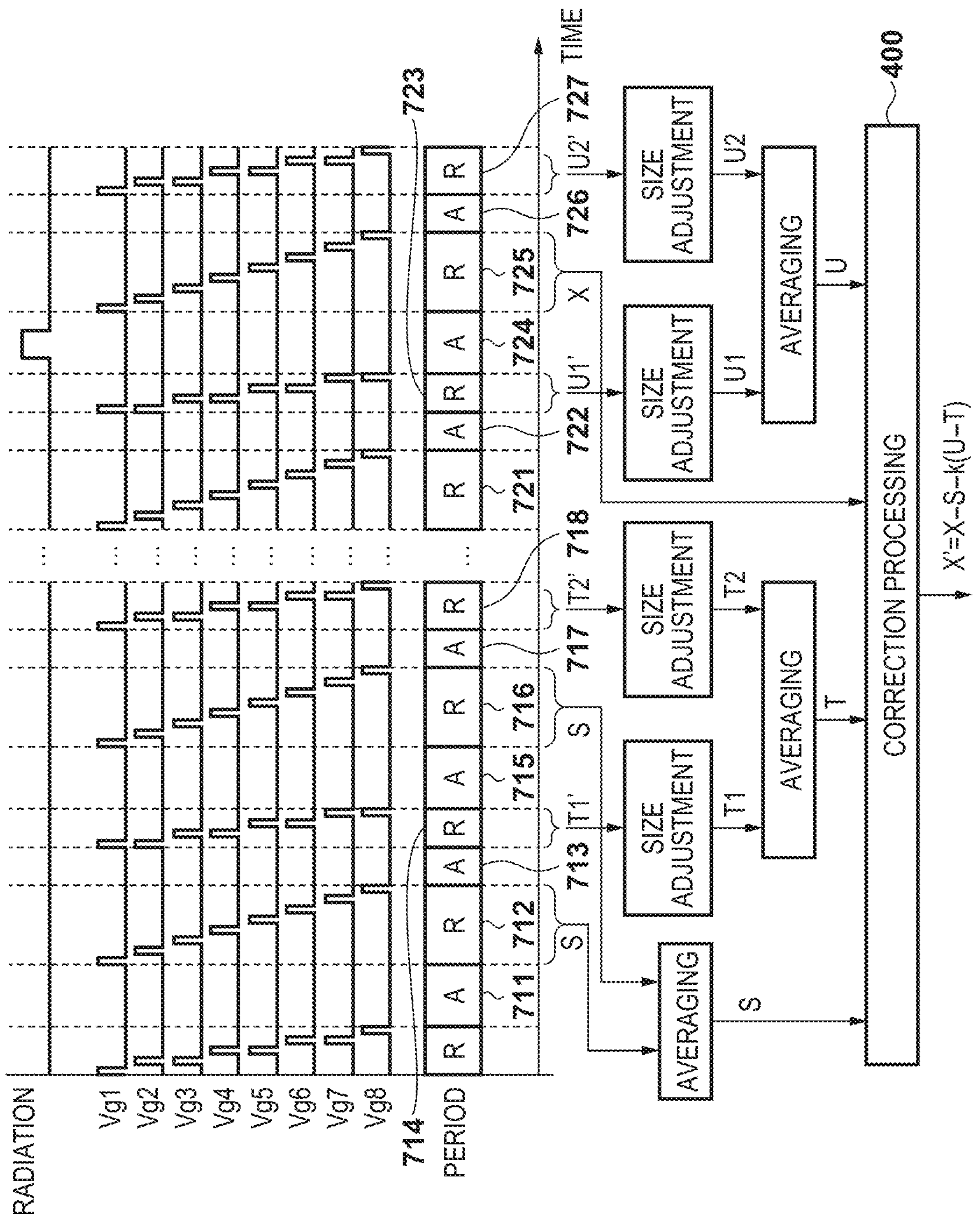
FIG. 7 is a view for explaining an example of the operation of the radiation imaging system according to some embodiments.

Subsequently, an example of the operation of the radiation imaging apparatus 110 different from the above-described operation shown in FIG. 4 will be described with reference to FIG. 7. In the operation shown in FIG. 7, similar to the operation shown in FIG. 5, the short time offset signals and the imaging offset signals are read out by the binning operation. In the operation shown in FIG. 7, the control circuit 112 switches, for each readout period, a combination of pixel rows to be selected to read out the imaging offset signals by the binning operation.

First, an operation in imaging preparation will be described. An operation in an accumulation period 711 to an accumulation period 713 and an operation in an accumulation period 715 to an accumulation period 717 may be the same as the operation in the accumulation period 411 to the accumulation period 413 in FIG. 4 and a description thereof will be omitted. During a readout period 714, the control circuit 112 simultaneously selects the (2h−1)th pixel row and the 2hth pixel row (h=1, . . . , m/2). This reads out imaging offset signals based on electric charges accumulated in the pixel P(2h−1, j) and electric charges accumulated in the pixel P(2h, j). During a readout period 718, the control circuit 112 simultaneously selects the 2hth pixel row and the (2h+1)th pixel row (h=1, . . . , m/2−1). This reads out imaging offset signals based on electric charges accumulated in the pixel P(2h−1, j) and electric charges accumulated in the pixel P(2h, j). Note that the pixel rows (that is, the first row and the mth row) located at the two ends of the plurality of pixel row are selected one by one.

Similar to the operation shown in FIG. 4, the image generation circuit 113 generates the long-time offset image S. The image generation circuit 113 generates a short-time offset image T1' using the short-time offset signals read out during the readout period 714, and generates a short-time offset image T2' using the short-time offset signals read out during the readout period 718. The image generation circuit 113 generates each of the short-time offset images T1 and T2 by adjusting the size of each of the short-time offset images T1' and T2'. The image generation circuit 113 generates the short-time offset image T by averaging the short-time offset images T1 and T2. By averaging the combination of the different pixel rows in this way, it is possible to improve the resolution in the column direction (the vertical direction in FIG. 7) of the short-time offset image T. In the example of FIG. 7, only one short-time offset image T1' and one short-time offset image T2' are shown. To generate the short-time offset image T, the plurality of short-time offset images T1' and T2' may be averaged.

Subsequently, an operation after imaging preparation ends (for example, in capturing a moving image) will be described. An operation in a readout period 721 to a readout period 727 may be the same as the operation in the readout period 712 to the readout period 718 and a description thereof will be omitted.

Similar to the operation shown in FIG. 4, the image generation circuit 113 generates the radiation image X. The image generation circuit 113 generates an imaging offset image U1' using the imaging offset signals read out during the readout period 723, and generates an imaging offset image U2' using the imaging offset signals read out during the readout period 727. The image generation circuit 113 generates each of imaging offset images U1 and U2 by adjusting the size of each of the imaging offset images U1' and U2'. The image generation circuit 113 generates the imaging offset image U by averaging the imaging offset images U1 and U2. By averaging the combination of the different pixel rows in this way, it is possible to improve the resolution in the column direction (the vertical direction in FIG. 7) of the imaging offset image U.

After that, the image generation circuit 113 generates the radiation image X' by correcting the radiation image X using the thus generated long-time offset image S, short-time offset image T, and imaging offset image U. The correction processing of the radiation image X may be the same as the correction processing 400 shown in FIG. 4 and a description thereof will be omitted. As described above, the imaging offset image U is generated using the imaging offset signals read out during the readout period 723 before the accumulation period 724 in which irradiation with the radiation 160 is performed and the imaging offset signals read out during the readout period 727 after the accumulation period 724. This can reduce noise in the radiation image X more accurately.

In the above-described first embodiment, the pixel array 200 includes only the pixels P to be used to generate a radiation image. Instead of this, the pixel array 200 may include pixels to be used for the purpose other than generation of a radiation image, like pixels to be used for automatic exposure control. According to the first embodiment, it is possible to accurately reduce noise in a radiation image.

Second Embodiment (Offset Image Generation Processing)

Figure 8:
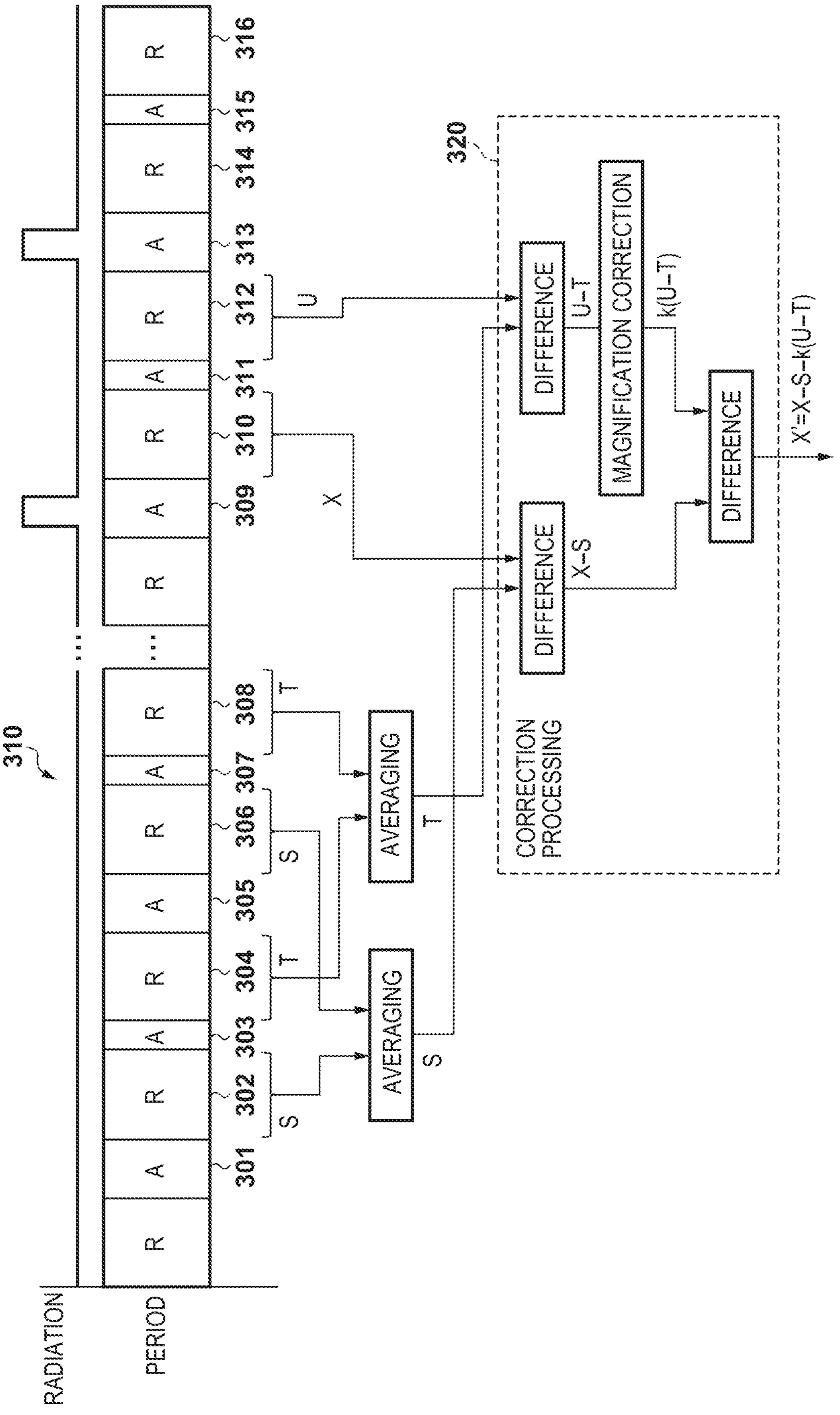
FIG. 8 is a view for explaining an example of the operation of a radiation imaging system according to some embodiments.
Figure 9:
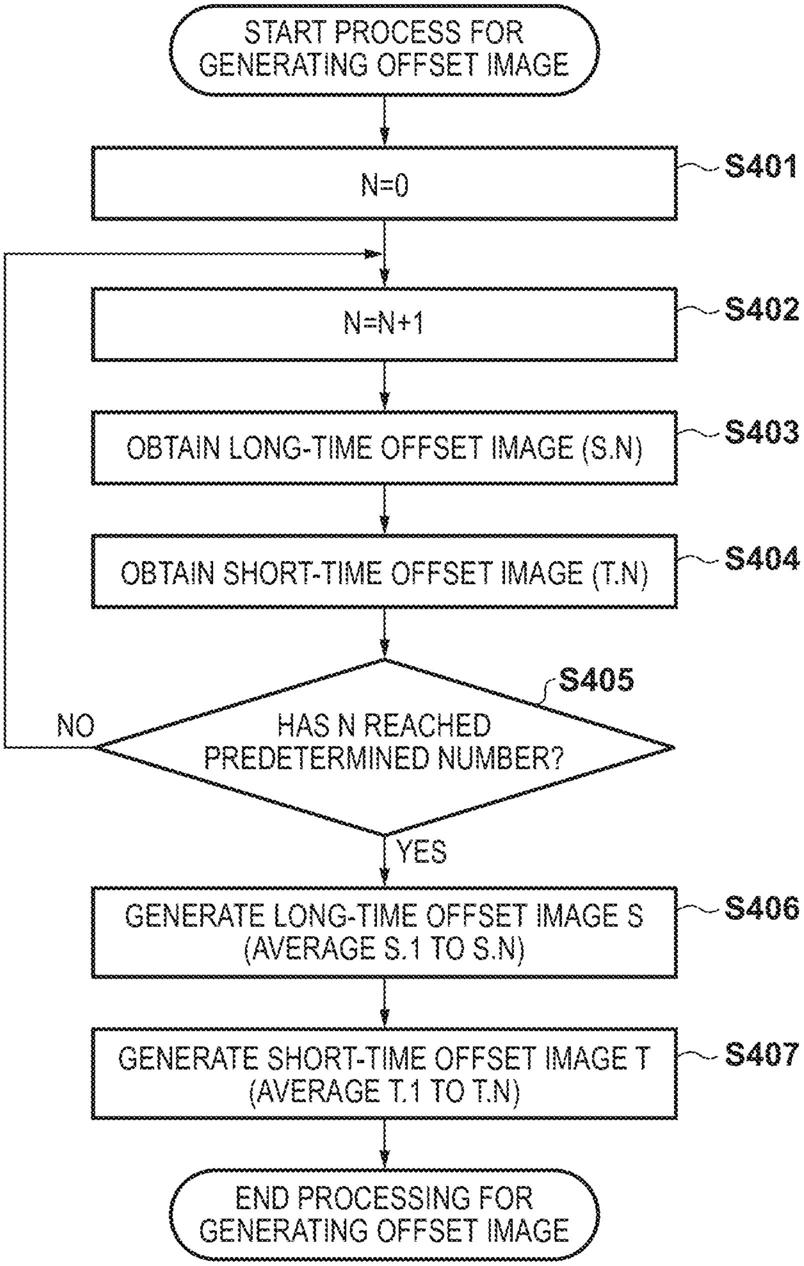
FIG. 9 is a flowchart for explaining offset image generation processing by the radiation imaging system according to some embodiments.

FIG. 8 is a view for explaining an example of the operation of a radiation imaging system 100 according to the second embodiment. FIG. 9 is a flowchart for explaining offset image generation processing by the radiation imaging system 100 according to second embodiment.

The offset image generation processing will be described below with reference to a timing chart 310 and a correction processing procedure 320 shown in FIG. 8 and the flowchart shown in FIG. 9. The upper side of FIG. 8 shows the timing chart 310, and the lower side of FIG. 8 shows the correction processing procedure 320.

In the timing chart 310 shown in FIG. 8, "radiation" indicates whether a radiation generating apparatus 140 irradiates a radiation imaging apparatus 110 with radiation 160. Low level indicates that the radiation imaging apparatus 110 is not irradiated with the radiation 160 and high level indicates that the radiation imaging apparatus 110 is irradiated with the radiation 160.

In the timing chart 310 shown in FIG. 8, "period" represents a period (time length) during which a specific operation is executed. Imaging by the radiation imaging apparatus 110 includes an accumulation period ("A" in FIG. 8) during which an accumulation operation is executed and a readout period ("R" in FIG. 8) during which a readout operation is executed. A control circuit 112 selects none of a plurality of pixels P included in a pixel array 200 during the accumulation period. More specifically, a driving circuit 210 maintains a state in which an OFF signal is supplied to each of driving lines Vg1 to Vgm. This accumulates, in each conversion device C, electric charges generated in the conversion device C, and also accumulates electric charges according to a dark current flowing to each conversion device C.

During the readout period, the control circuit 112 selects each of the plurality of pixels P included in the pixel array 200, and reads out a signal from the selected pixel P. More specifically, the driving circuit 210 sequentially supplies an ON signal to each of the driving lines Vg1 to Vgm. First, the driving circuit 210 supplies the ON signal only to the driving line Vg1. This turns on a switch element S(1, j) (j=1, . . . , n), a conversion device C(1, j) and a signal line Sigj are rendered conductive, and thus electric charges accumulated in the conversion device C(1, j) are read out into the signal line Sigj. Next, the driving circuit 210 supplies the ON signal only to the driving line Vg2. This turns on a switch element S(2, j), a conversion device C(2, j) and the signal line Sigj are rendered conductive, and thus electric charges accumulated in the conversion device C(2, j) are read out into the signal line Sigj. When the driving circuit 210 repeats this operation up to the driving line Vgm, the electric charges based on those accumulated in the conversion device C are read out by a readout circuit 220 via the signal line Sigj. In the following description, execution of the readout operation for the plurality of pixels P means execution of the readout operation for each of the plurality of pixels P. Offset image generation processing to be described in the following example is performed in imaging preparation, and is performed in periods 301 to 308 shown in FIG. 8.

In imaging preparation, the control circuit 112 alternately executes an accumulation operation and a readout operation in a state in which radiation irradiation is not performed. As shown in FIG. 8, an accumulation operation is executed during the accumulation period 301, and signals based on electric charges accumulated in the plurality of pixels P included in the pixel array 200 are read out during the subsequent readout period 302. The same applies to the accumulation period 303 to the readout period 308. The control circuit 112 reads out, during the subsequent readout period 304, 306, or 308, signals based on electric charges accumulated during the accumulation period 303, 305, or 307. In imaging preparation, signals read out from the plurality of pixels P included in the pixel array 200 are used to generate an offset image.

In the example shown in FIG. 8, the accumulation period 303 is shorter than the accumulation period 301. Similarly, the accumulation period 307 is shorter than the accumulation period 305. Each of the accumulation periods 301 and 305 will also be referred to as the first period hereinafter, and each of the accumulation periods 303 and 307 will also be referred to as the second period shorter than the first period hereinafter.

A signal read out during the readout period 302 or 306 is represented as a long-time offset signal (to be also referred to as the first signal or the first offset signal hereinafter), and a signal read out during the readout period 304 or 308 is represented as a short-time offset signal (to be also referred to as the second signal or the second offset signal hereinafter). In the state in which radiation irradiation is not performed, the control circuit 112 alternately executes the first readout control of reading out the first signal based on the electric charges accumulated during the accumulation period 301 or 305 (first period) and the second readout control of reading out the second signal based on the electric charges accumulated during the accumulation period 303 or 307 (second period) shorter than the first period.

An offset image generated based on the long-time offset signal (first signal) is represented as a long-time offset image (to be also referred to as the first offset image hereinafter), and an offset image generated based on the short-time offset signal (second signal) is represented as a short-time offset image (to be also referred to as the second offset image hereinafter).

In the following description, a long-time offset image obtained when a frame counter is set to N is represented by "S.N", and a short-time offset image is represented by "T.N". For example, a long-time offset image obtained when the frame counter is set to N=1 is represented by "S.1", and a short-time offset image is represented by "T.1".

In step S401, the control circuit 112 sets the frame counter N to 0. After that, in step S402, the control circuit 112 increments the frame counter N by adding 1 to the frame counter N.

In step S403, the long-time offset image S.1 is obtained. The operation of obtaining the long-time offset image S.1 includes the accumulation operation executed during the accumulation period 301 of FIG. 8 and the readout operation of the signal (long-time offset signal) executed during the readout period 302. An image generation circuit 113 generates the long-time offset image S.1 based on a signal (long-time offset signal) obtained from a radiation detecting panel 111.

As a practical operation, during the accumulation period 301, the radiation imaging apparatus 110 performs an electric charge accumulation operation in all the pixels P (all image sensors) included in the pixel array 200 of the radiation detecting panel 111 in a state in which irradiation with the radiation 160 is not performed, as indicated by "radiation" in the timing chart 310 shown in FIG. 8. After that, in the readout operation executed during the readout period 302, the control circuit 112 controls the radiation detecting panel 111 to output a signal (electrical signal) based on the electric charges accumulated during the accumulation period 301, and the image generation circuit 113 generates image data based on the signal (electrical signal) obtained from the radiation detecting panel 111. The image generation circuit 113 stores the generated image data as the long-time offset image S.1 in a storage device 170.

In step S404, the short-time offset image T.1 is obtained. The operation of obtaining the short-time offset image T.1 includes the accumulation operation executed during the accumulation period 303 of FIG. 8 and the readout operation of the signal (short-time offset signal) executed during the readout period 304. The image generation circuit 113 generates the short-time offset image T.1 based on the signal (short-time offset signal) obtained from the radiation detecting panel 111.

During the accumulation period 303 shorter than the accumulation period 301, the radiation imaging apparatus 110 performs an electric charge accumulation operation in all the pixels P (all the image sensors) included in the pixel array 200 of the radiation detecting panel 111 in a state in which the radiation imaging apparatus 110 is not irradiated with the radiation 160. After that, in the readout operation executed during the readout period 304, the control circuit 112 controls the radiation detecting panel 111 to output a signal (electrical signal) based on the electric charges accumulated during the accumulation period 303, and the image generation circuit 113 generates image data based on the signal (electrical signal) obtained from the radiation detecting panel 111. The image generation circuit 113 stores the generated image data as the short-time offset image T.1 in the storage device 170.

After that, in step S405, the control circuit 112 determines whether the frame counter N has reached a predetermined number. As an example, a case where the predetermined number is two will be described. If it is determined in step S405 that the frame counter N has not reached the predetermined number (NO in step S405), the process is returned to step S402. That is, if the frame counter is N=1, the frame counter N has not reached the predetermined number, and thus the control circuit 112 returns the process to step S402.

After that, in step S402, the control circuit 112 increments the frame counter N by adding 1 to the frame counter N, and advances the process to step S403.

In step S403, a long-time offset image S.2 is obtained. The operation of obtaining the long-time offset image S.2 includes the accumulation operation executed during the accumulation period 305 of FIG. 8 and the readout operation of the signal (long-time offset signal) executed during the readout period 306. The image generation circuit 113 generates the long-time offset image S.2 based on the signal obtained from the radiation detecting panel 111.

The accumulation operation executed during the accumulation period 305 and the readout operation executed during the readout period 306 are respectively the same as the electric charge accumulation operation during the accumulation period 301 and the readout operation of the signal based on the electric charges during the readout period 302 when generating the long-time offset image S.1. The control circuit 112 controls the radiation detecting panel 111 to output the signal (electrical signal) based on the electric charges accumulated during the accumulation period 305, and the image generation circuit 113 generates image data based on the signal (electrical signal) obtained from the radiation detecting panel 111. The image generation circuit 113 stores the generated image data as the long-time offset image S.2 in the storage device 170. Thus, the storage device 170 stores the long-time offset images S.1 and S.2.

After that, in step S404, a short-time offset image T.2 is obtained. The operation of obtaining the short-time offset image T.2 includes the accumulation operation executed during the accumulation period 307 of FIG. 8 and the readout operation of the signal (short-time offset signal) executed during the readout period 308. The image generation circuit 113 generates the short-time offset image T.2 based on the signal (short-time offset signal) obtained from the radiation detecting panel 111.

The accumulation operation executed during the accumulation period 307 and the readout operation executed during the readout period 308 are respectively the same as the electric charge accumulation operation during the accumulation period 303 and the readout operation of the signal based on the electric charges during the readout period 304 when generating the short-time offset image T.1. The control circuit 112 controls the radiation detecting panel 111 to output the signal (electrical signal) based on the electric charges accumulated during the accumulation period 307, and the image generation circuit 113 generates image data based on the signal (electrical signal) obtained from the radiation detecting panel 111. The image generation circuit 113 stores the generated image data as the short-time offset image T.2 in the storage device 170. Thus, the storage device 170 stores the short-time offset images T.1 and T.2.

In step S405, the control circuit 112 determines again whether the frame counter N has reached the predetermined number. Assume here that the predetermined number is two. Therefore, the control circuit 112 determines that the frame counter N has reached the predetermined number (YES in step S405), and advances the process to step S406.

In step S406, the image generation circuit 113 performs processing for generating a long-time offset image S. The image generation circuit 113 generates the long-time offset image S by performing addition and averaging of the images from the long-time offset image S. 1 to the long-time offset image S.N (in this example, N=2) stored in the storage device 170. The image generation circuit 113 stores the generated long-time offset image S in the storage device 170.

Subsequently, in step S407, the image generation circuit 113 performs processing for generating a short-time offset image T. The image generation circuit 113 generates the short-time offset image T by performing addition and averaging of the images from the short-time offset image T.1 to the short-time offset image T.N (in this example, N=2) stored in the storage device 170. The image generation circuit 113 stores the generated short-time offset image T in the storage device 170.

Then, the processing for generating the offset image to be used for image processing of a radiation image ends. As described above, in imaging preparation, the control circuit 112 alternately executes generation of the long-time offset image S and generation of the short-time offset image T. This generates the plurality of long-time offset images S and the plurality of short-time offset images T. In imaging preparation, the image generation circuit 113 creates one long-time offset image S by averaging (performing addition and averaging) the plurality of long-time offset images S.i (i=1 to N), and stores the created image in the storage device 170 for subsequent processing. Similarly, in imaging preparation, the image generation circuit 113 creates one short-time offset image T by averaging (performing addition and averaging) the plurality of short-time offset images T.i (i=1 to N), and stores the created image in the storage device 170 for subsequent processing. By averaging the plurality of offset images in this way, it is possible to reduce noise included in the offset image.

Note that in the example described with reference to FIGS. 8 and 9, the predetermined number is two. However, the predetermined number is not limited to this, and the predetermined number is a number of 1 or more. The user can set an arbitrary number via an input device 115 connected to a PC 120. If the control circuit 112 determines in step S405 that the frame counter N has not reached the predetermined number has not been reached (NO in step S405), the control circuit 112 returns the process to step S402, and increments the frame counter N by adding 1 to the frame counter N. Until the value of the frame counter N reaches the predetermined number, the operation of obtaining the long-time offset image S.N and the operation of obtaining the short-time offset image T.N are repeated as many times as the predetermined number (frame counter N). As the predetermined number is larger, it is possible to reduce noise included in the long-time offset image S and the short-time offset image T generated by the addition and averaging, and improve correction accuracy of correction processing (to be described later). The predetermined number, that is, the number of offset images to be used for averaging may be preset.

Figure 10:
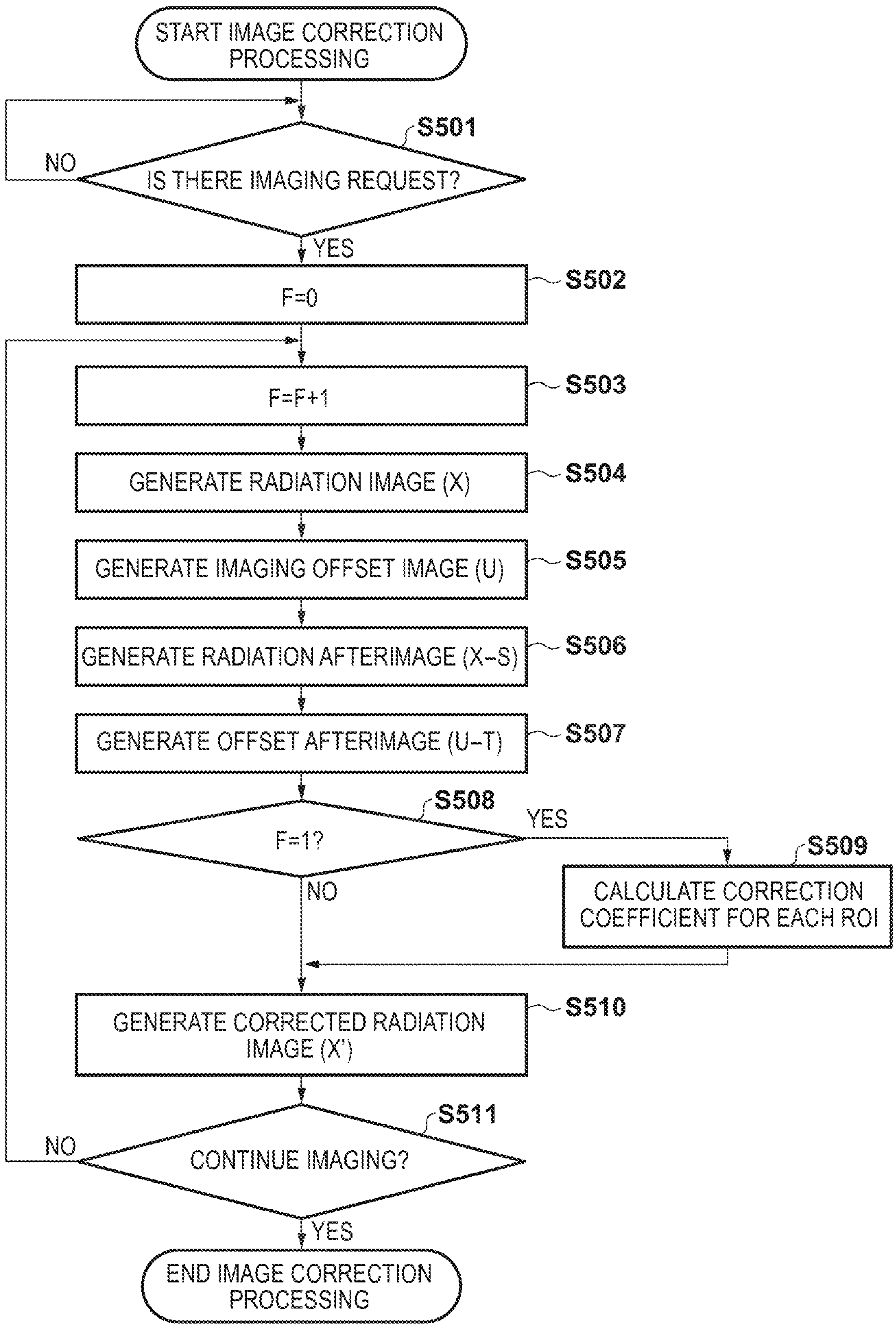
FIG. 10 is a flowchart for explaining image correction processing of a radiation image by the radiation imaging system according to some embodiments.

FIG. 10 is a flowchart for explaining image correction processing of a radiation image by the radiation imaging system 100 according to the second embodiment. The image correction processing of the radiation image will be described with reference to the timing chart 310 and the correction processing procedure 320 shown in FIG. 8 and the flowchart shown in FIG. 10. Note that since the long-time offset image S and the short-time offset image T generated by the offset image generation processing are used in the image correction processing of the radiation image, it is assumed that the offset image generation processing is performed in advance. Therefore, assume that the image correction processing of the radiation image is performed after imaging preparation ends.

In step S501 of FIG. 10, the control circuit 112 confirms the presence/absence of an imaging start request from the PC 120. In an example, the exposure control apparatus 130 includes an exposure switch (not shown). When the user turns on the exposure switch, the exposure control apparatus 130 sends an exposure instruction to the radiation generating apparatus 140, and also sends a start notification indicating the start of radiation irradiation to the PC 120. In response to the start notification, the PC 120 that has received the start notification notifies the control circuit 112 of the radiation imaging apparatus 110 of the start of radiation irradiation. The control circuit 112 confirms the presence/absence of the notification from the PC 120. If the notification is sent (YES in step S501), the control circuit 112 advances the process to step S502. If no notification is sent from the PC 120 (NO in step S501), the control circuit 112 returns the process to step S501 again, and confirms the presence/absence of the notification from the PC 120.

Subsequently, in step S502, the control circuit 112 initializes a parameter F representing the number of captured images to 0. In step S503, the control circuit 112 adds 1 to the parameter F representing the number of captured images.

In step S504, the control circuit 112 and the image generation circuit 113 perform processing for generating a radiation image X. The processing for generating the radiation image X includes an accumulation operation executed during an accumulation period 309 of FIG. 8 and a signal readout operation executed during a readout period 310.

The accumulation operation during the accumulation period 309 is performed in a state in which irradiation with radiation 160 is performed, as indicated by "radiation" in the timing chart 310 shown in FIG. 8. Note that a time length (accumulation time) representing the time length of the accumulation period 309 at the time of obtaining the radiation image X is equal to the time length (accumulation time) of the accumulation period 301 or 305 during which the accumulation operation is performed to obtain the long-time offset image S in imaging preparation. The accumulation period 309 will also be referred to as the third period hereinafter, and the accumulation period 309 (third period) has a time length equal to that of the accumulation period 301 or 305 (first period).

During the readout period 310, the control circuit 112 executes the third readout control of reading out, as the third signal, a radiation signal based on electric charges accumulated during the accumulation period 309 (third period) having the time length equal to that of the accumulation period 301 or 305 (first period) in the state in which radiation irradiation is performed. In the readout operation executed during the readout period 310, the control circuit 112 controls the radiation detecting panel 111 to output a signal (electrical signal) based on the electric charges accumulated during the accumulation period 309. The image generation circuit 113 generates the radiation image X based on the signal (electrical signal) output from the radiation detecting panel 111, and stores the generated image in the storage device 170. Note that the readout operation executed by the control circuit 112 during the readout period 310 is the same as the readout operation executed during the readout period 302 or 306 to obtain the long-time offset image S in imaging preparation.

In step S505, the control circuit 112 and the image generation circuit 113 perform processing for generating an imaging offset image U. The processing for generating the imaging offset image U includes an accumulation operation executed during an accumulation period 311 shown in FIG. 8 and a signal readout operation executed during a readout period 312.

The accumulation operation during the accumulation period 311 is performed in the state in which irradiation with the radiation 160 is not performed, as indicated by "radiation" in the timing chart 310 shown in FIG. 8. Note that a time length (accumulation time) representing the time length of the accumulation period 311 at the time of obtaining the imaging offset image U is equal to the time length (accumulation time) of the accumulation period 303 or 307 during which the accumulation operation is performed to obtain the short-time offset image T in imaging preparation. The accumulation period 311 will also be referred to as the fourth period hereinafter, and the accumulation period 311 (fourth period) has a time length equal to that of the accumulation period 303 or 307 (second period).

During the readout period 312, the control circuit 112 executes the fourth readout control of reading out, as an imaging offset signal (to be also referred to as the fourth signal hereinafter), a signal based on electric charges accumulated during the accumulation period 311 (fourth period) in the state in which radiation irradiation is not performed after reading out the radiation signal (third signal) during the readout period 310. In the readout operation executed during the readout period 312, the control circuit 112 controls the radiation detecting panel 111 to output a signal (electrical signal) based on the electric charges accumulated during the accumulation period 311.

The image generation circuit 113 generates the imaging offset image U based on the imaging offset signal (fourth signal) output from the radiation detecting panel 111, and stores the generated image in the storage device 170. Note that the readout operation executed by the control circuit 112 during the readout period 312 is the same as the readout operation executed during the readout period 304 or 308 to obtain the short-time offset image T in imaging preparation. Note also that since the short-time offset image T obtained in imaging preparation is generated by performing addition and averaging of the plurality of short-time offset images T.N, noise included in the image is reduced. However, since only one imaging offset image U is used, noise included in the image may be large, as compared with the short-time offset image T.

In step S506, the image generation circuit 113 performs processing for generating a radiation afterimage. The image generation circuit 113 reads out the radiation image X and the long-time offset image S (first offset image) stored in the storage device 170, and subtracts the long-time offset image S (first offset image) from the radiation image X, thereby generating a radiation afterimage ("X−S" in FIG. 8).

Subsequently, in step S507, the image generation circuit 113 performs processing for generating an offset afterimage. The image generation circuit 113 reads out the imaging offset image U and the short-time offset image T (second offset image) stored in the storage device 170, and subtracts the short-time offset image T (second offset image) from the imaging offset image U, thereby generating an offset afterimage ("U−T" in FIG. 8).

After that, in step S508, the control circuit 112 determines whether the parameter F representing the number of captured images is 1. If it is determined that the parameter F is 1 (YES in step S508), the control circuit 112 advances the process to step S509. If it is determined that the parameter F is not 1 (NO in step S508), the control circuit 112 advances the process to step S510.

In step S509, the image generation circuit 113 performs calculation processing of a correction coefficient k for each pixel region including at least one pixel in the offset afterimage (U−T). The pixel region will also be referred to as a region of interest (to be referred to as an ROI) hereinafter, and the image generation circuit 113 performs calculation processing of the correction coefficient k for each ROI.

Figure 11:
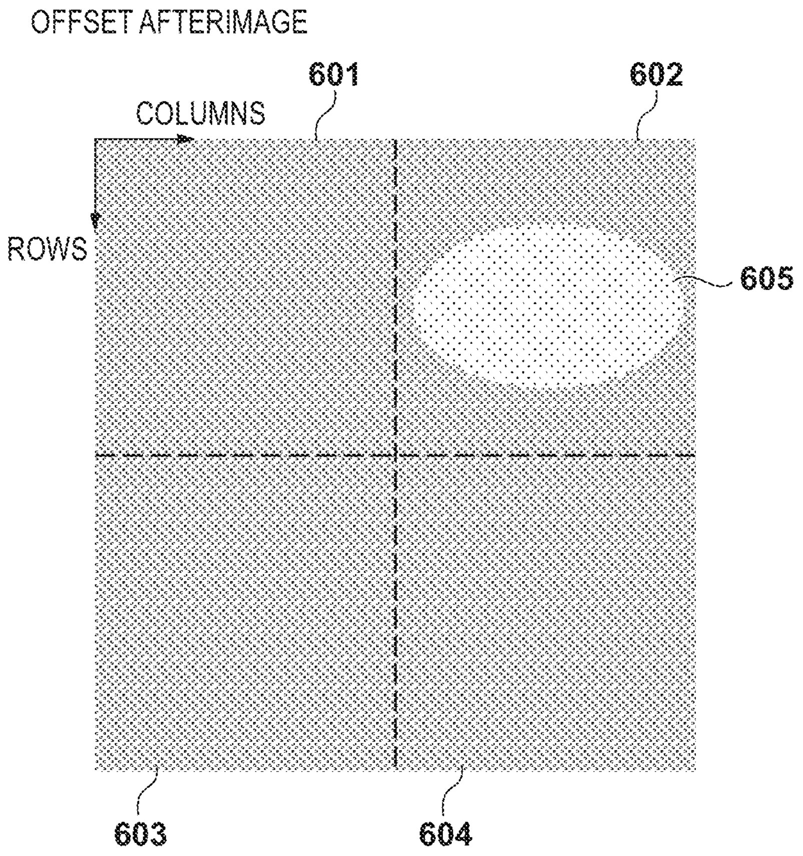
FIG. 11 is a view for explaining an example of generation of an afterimage in the radiation imaging system according to some embodiments.
Figure 12:
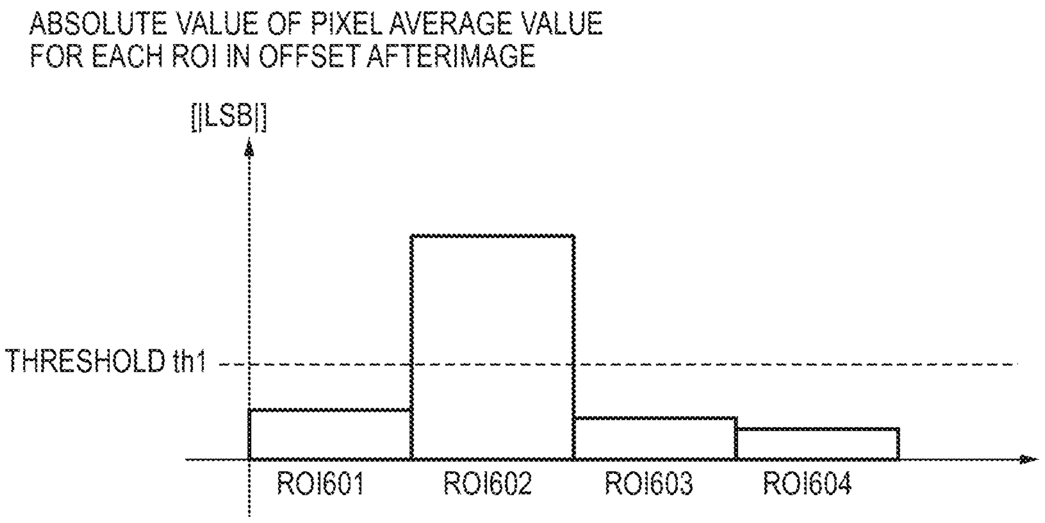
FIG. 12 is a view exemplifying comparison between a threshold and the absolute value of the average value of pixel values for each region of interest of an offset afterimage obtained in the radiation imaging system according to some embodiments.

FIG. 11 is a view for explaining an example of generation of an afterimage in the radiation imaging system 100 according to the second embodiment. The calculation processing of the correction coefficient will be described below using an example of dividing the offset afterimage (U−T) generated in step S507 into four regions, as shown in FIG. 11. In FIG. 11, the four divided regions are represented as regions 601 to 604 of interest (ROIs). In a case where imaging is performed with radiation of a predetermined intensity in the readout period 308 to the accumulation period 309 in the timing chart 310 shown in FIG. 8 and the radiation 160 enters the radiation detecting panel 111 without placing an object 150, an afterimage is generated in a partial region 605 in the region 602 of interest (ROI), as shown in FIG. 11, in the offset afterimage (U−T) generated in step S507. The region 602 of interest (ROI) where an afterimage is generated will also be referred to as an afterimage region hereinafter. In addition, the region 601, 603, or 604 of interest (ROI) where no afterimage is generated will also be referred to as a non-afterimage region 601, 603, or 604 hereinafter. In step S509, to perform calculation processing of the correction coefficient for each region of interest (ROI), the image generation circuit 113 calculates the absolute value of the pixel average value for each region of interest (ROI) of the offset afterimage (U−T). FIG. 12 is a view exemplifying comparison between a threshold th1 (first threshold) and the absolute value of the pixel average value for each region of interest (ROI) of the offset afterimage (U−T) obtained in the radiation imaging system 100 according to the second embodiment. It can be determined that an afterimage is generated (an afterimage component is included) in an ROI (the ROI 602 in FIGS. 11 and 12) where the absolute value of the pixel average value exceeds the predetermined threshold th1, as shown in FIG. 12.

The image generation circuit 113 sets the correction coefficient for each region of interest (ROI) based on the result of determining whether the absolute value of the pixel average value for each region of interest (ROI) exceeds the threshold th1. For the ROI determined as an ROI where the absolute value of the pixel average value exceeds the predetermined threshold th1 and an afterimage is generated (an afterimage component is included), the image generation circuit 113 sets the correction coefficient k (to be described later) to be larger than zero (0), and sets the correction coefficient k to become larger as the absolute value of the pixel average value increases. On the other hand, for the ROI determines as an ROI where the absolute value of the pixel average value for each region of interest (ROI) is smaller than the predetermined threshold th1 and no afterimage is generated (no afterimage component is included), the image generation circuit 113 sets the correction coefficient k to zero (0).

After that, in step S510, the image generation circuit 113 performs processing for generating a radiation image by correcting the radiation image X. A radiation image X' obtained by correcting the radiation image X will also be referred to as a corrected radiation image X' hereinafter. In this step, the image generation circuit 113 sets a different correction coefficient k for each of the pixel region (ROI) including the afterimage component and the pixel region (ROI) including no afterimage component, which are determined by comparing the statistical information of the pixel values obtained for each pixel region (ROI) with the threshold, and then generates a magnification correction image by correcting the pixel values for each pixel region using the set different correction coefficient k. The image generation circuit 113 generates a magnification correction image (k(U−T) in FIG. 8) by performing magnification correction processing of multiplying the pixel values of the offset afterimage (U−T) by the correction coefficient k for each pixel region (ROI). That is, the image generation circuit 113 generates the magnification correction image (k(U−T)) by multiplying the pixel value of each pixel for each pixel region (ROI) of the offset afterimage (U−T) by the correction coefficient k calculated in step S509.

After that, the image generation circuit 113 subtracts the offset afterimage (magnification correction image k(U−T)) having undergone the magnification correction processing from the radiation afterimage (X−S) generated in step S506, thereby generating the corrected radiation image (X'=(X−S)−k(U−T) in FIG. 8) obtained by correcting the radiation image X.

In the processing for generating the corrected radiation image X', the image generation circuit 113 sets the correction coefficient k to zero (0) for the ROI determined as an ROI where no afterimage is generated. Therefore, in the region 601, 603, or 604 of interest (ROI) as a non-afterimage region, by performing the magnification correction processing using the correction coefficient k set to zero (0), the corrected radiation image X' is generated by calculating X'=X−S. That is, the corrected radiation image X' is an image obtained by subtracting the long-time offset image S from the radiation image X before correction. Therefore, in the non-afterimage region, noise is not increased by using the imaging offset image U in the processing for generating the corrected radiation image X'.

On the other hand, in the region of interest (ROI) 602 where an afterimage is generated, the correction coefficient k is set to be larger than zero (0), and the corrected radiation image X' is generated by calculating X'=(X−S)−k(U−T). In the afterimage region, noise can be increased by using the imaging offset image U in the processing for generating the corrected radiation image X', but a remaining afterimage component can be reduced only in the radiation afterimage (X−S). In this way, while reducing an afterimage component in the ROI where an afterimage is generated, it is possible to generate the corrected radiation image X' in which an increase in noise is suppressed in the ROI where no afterimage is generated. The image generation circuit 113 transmits the generated corrected radiation image X' to the PC 120.

After that, in step S511, the control circuit 112 determines whether to continue imaging. In an example, the exposure control apparatus 130 includes an exposure switch (not shown). When the user turns off the exposure switch, the exposure control apparatus 130 sends an exposure stop instruction to the radiation generating apparatus 140, and also sends a stop notification indicating the stop of radiation irradiation to the PC 120. In response to the stop notification, the PC 120 that has received the stop notification notifies the control circuit 112 of the radiation imaging apparatus 110 of the stop of radiation irradiation. The control circuit 112 confirms the presence/absence of an imaging end request from the PC 120. If an imaging end request is sent (YES in step S511), the control circuit 112 ends image processing at the time of radiation imaging. On the other hand, if an imaging end request is not sent to capture a plurality of frames like moving image capturing (NO in step S511), the control circuit 112 returns the process to step S503 again, and repeats the same processing. If imaging is continued, the control circuit 112 and the image generation circuit 113 perform the same processing in an accumulation period 313 (third period), a readout period 314, an accumulation period 315 (fourth period), and a readout period 316.

After that, the processes in steps S503 to S507 are repeated again, and the control circuit 112 determines, in step S508, whether the parameter F representing the number of captured images is 1. Since the number of captured images is not 1 at this time (NO in step S508), the control circuit 112 advances the process to step S510. That is, with respect to the second frame and subsequent frames, the image generation circuit 113 performs magnification correction processing using the correction coefficient k calculated for the first frame (F=1:first frame) in the magnification correction processing in step S510. When capturing radiation images by moving image capturing, the image generation circuit 113 corrects radiation images obtained in the second frame and subsequent frames following the first frame using the correction coefficient k calculated for the first frame of moving image capturing. When capturing a moving image, the image generation circuit 113 calculates the correction coefficient k for the first frame of the moving image, and generates a magnification correction image (k(U−T) using an offset afterimage (U−T) obtained in each frame and the correction coefficient k calculated for the first frame with respect to each frame following the first frame. Then, the image generation circuit 113 generates the corrected radiation image X' by subtracting the magnification correction image (k(U−T) from the radiation afterimage (X−S) obtained in each frame.

Although the calculation processing of the correction coefficient k requires high performance of the image generation circuit 113, a change in afterimage characteristic is small within a short time, and thus the afterimage can be reduced even by using, for the second frame and the subsequent frames, the correction coefficient k calculated for the first frame for the first time. In this way, it is possible to perform accurate afterimage correction while suppressing an increase in noise. This can reduce the calculation load of the correction coefficient k, and attempt to increase the speed of the processing for generating the corrected radiation image X'.

Note that in steps S509 and S510, the example of dividing the offset afterimage (U−T) into four pixel regions (ROIs) has been described. The present disclosure, however, is not limited to this, and the division number of the offset afterimage may be 1 (that is, no division) or equal to the number of pixels P of the radiation detecting panel 111. That is, the ROI need only include at least one pixel. For example, if the division number is equal to the number of pixels P of the radiation detecting panel 111, the image generation circuit 113 calculates the correction coefficient k for each pixel P.

Figure 13:
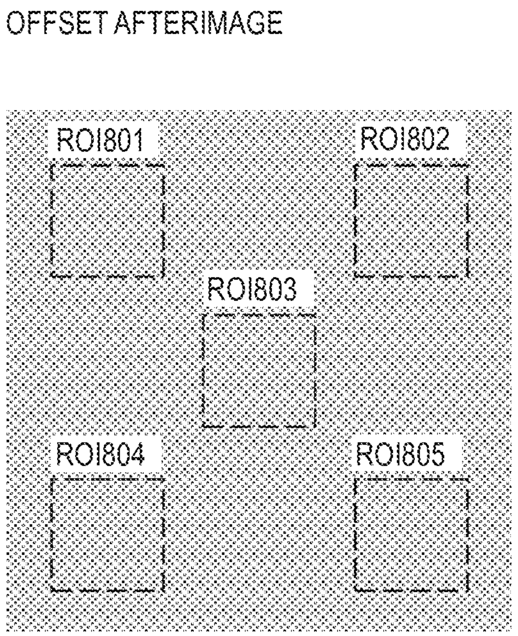
FIG. 13 is a view showing an example of setting of regions in an offset afterimage when an afterimage is generated in the radiation imaging system according to some embodiments.

Furthermore, a method of dividing the offset afterimage is not limited to a method of dividing the offset afterimage so that divided ROIs are adjacent to each other, and the ROIs may be separated from each other. FIG. 13 is a view showing an example of setting of regions in an offset afterimage when an afterimage is generated in the radiation imaging system 100. As shown in FIG. 13, ROIs (801 to 805) may be set at such positions that the ROIs are separated from each other. A dividing method or the selection of an ROI for which the correction coefficient k is calculated may be designated by the user using the input device 115 (for example, a keyboard and a mouse, a touch panel, or the like) connected to the computer 120, or the user can use the input device 115 to change the dividing method or the selection of an ROI for which the correction coefficient k is calculated. In this case, the PC 120 notifies the control circuit 112 of information concerning the dividing method or the selection of an ROI. The control circuit 112 may notify the image generation circuit 113 of the information concerning the dividing method or the selection of an ROI, that has been notified from the PC 120, and the image generation circuit 113 may perform calculation processing of the correction coefficient k for each ROI in step S509 based on the information notified from the control circuit 112.

Furthermore, the control circuit 112 may switch the selection (the setting of the position) of the ROI for which the correction coefficient k is calculated, and the number (division number) of ROIs in accordance with an imaging technique or a captured portion. In this case, the user designates an imaging technique or a captured portion by an input from the input device 115 connected to the PC 120, and the PC 120 transmits the information of the imaging technique or the captured portion to the control circuit 112. The control circuit 112 sets the selection (the setting of the position) of the ROI and the number (division number) of ROIs based on the received information of the imaging technique or the captured portion. For example, if the captured portion is the stomach, the dividing method or the selection of an ROI for which the correction coefficient k is calculated is switched, and the center of the radiation detecting panel 111 may be set as an ROI for which the correction coefficient k is calculated. The control circuit 112 notifies the image generation circuit 113 of the information concerning the division method (division number) or the selection (the setting of the position) of an ROI, that has been notified from the PC 120. The image generation circuit 113 switches the dividing method or the selection of an ROI based on the setting of the control circuit 112.

In the second embodiment, in step S509, the image generation circuit 113 calculates, as the statistical information of each ROI, the absolute value of the pixel average value for each ROI of the offset afterimage, and adjusts the correction coefficient k for each ROI based on a result of comparing the absolute value of the pixel average value with the threshold th1. However, the correction coefficient k may be decided using other statistical information obtained by statistical processing of the pixel values. For example, the correction coefficient k may be decided based on statistical information such as the maximum pixel value, the minimum pixel value, or the standard deviation of the pixel values for each ROI of the offset afterimage. The image generation circuit 113 obtains the statistical information of the pixel values by performing statistical processing for the pixel values in the offset afterimage, and the statistical information includes at least one of the absolute value of the pixel average value, the maximum pixel value, the minimum pixel value, and the standard deviation of the pixel values, which are obtained for each pixel region (ROI) of the offset afterimage.

The second embodiment has exemplarily explained the processing that limits the calculation of the correction coefficient k for each ROI in step S509 to the first frame of a captured radiation image based on the relationship between the afterimage characteristic and the performance of the image generation circuit 113. However, the present disclosure is not limited to this and the correction coefficient k may be calculated for each ROI in all the frames. For example, the image generation circuit 113 may perform the calculation processing of the correction coefficient k for each ROI in step S509 in all the frames, and then perform the processing for generating the corrected radiation image X' in step S510, without performing the determination processing of step S508.

Figure 14A:
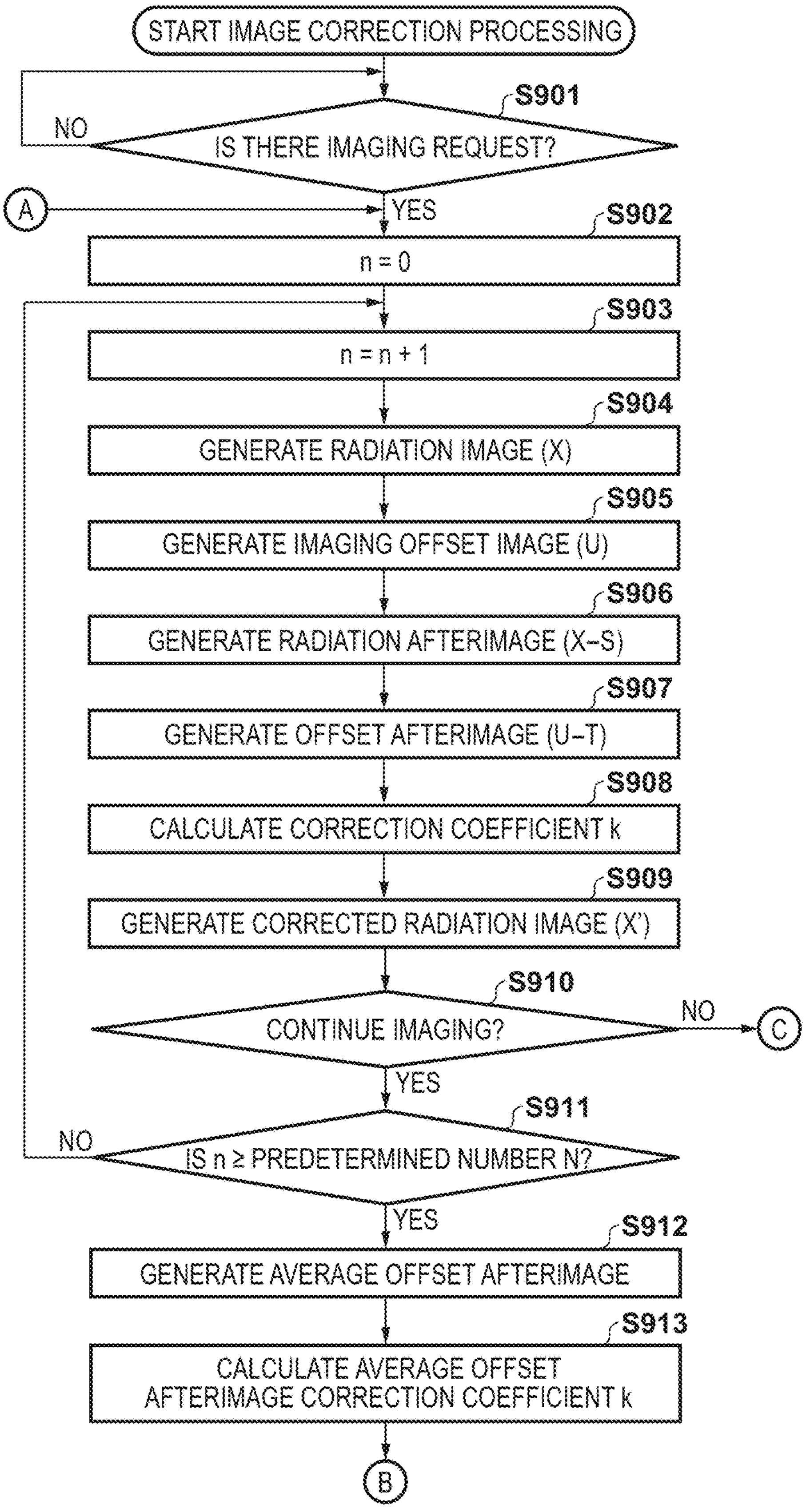
FIGS. 14A and 14B are flowcharts for explaining the procedure of processing of improving the efficiency of calculation processing of a correction coefficient in the radiation imaging system according to some embodiments.
Figure 14B:
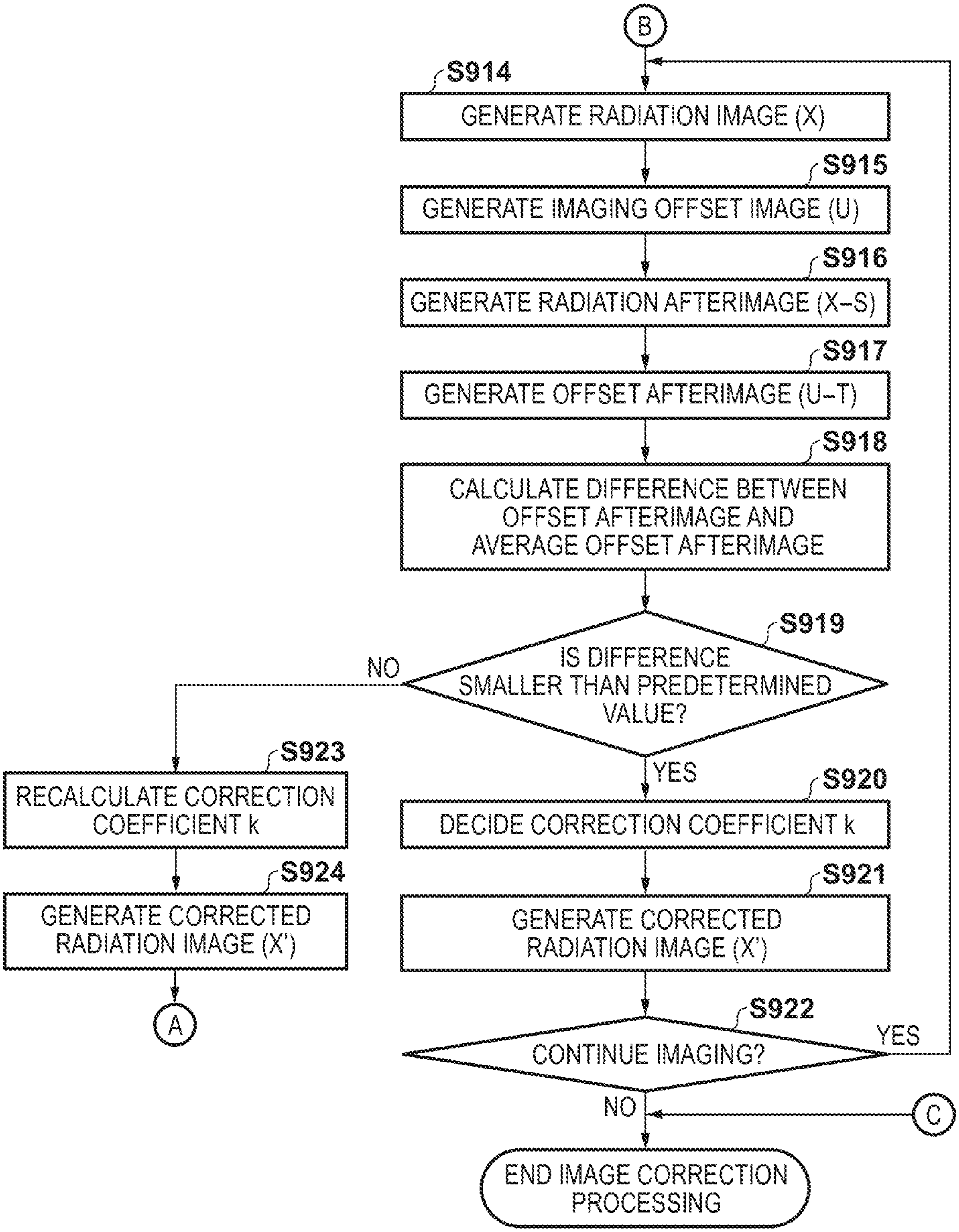

In this case, as a further different operation, the efficiency of calculation processing of the correction coefficient k may be improved, as illustrated in a flowchart shown in FIG. 14. After irradiation with radiation having high intensity, an afterimage component amount included in the offset afterimage (U−T) nonlinearly attenuates with time, and the attenuation amount of the afterimage component has a property of converging into zero (0). The flowchart shown in FIG. 14 shows the procedure of processing of improving the efficiency of calculation processing of the correction coefficient k in consideration of the attenuation characteristic of the afterimage component included in the offset afterimage (U−T). The procedure of processing of improving the efficiency of calculation processing of the correction coefficient k will be described below with reference to FIG. 14. Note that the processing shown in FIG. 14 includes processing common to the flowchart shown in FIG. 10, and different parts of processing will be described in detail to avoid a repetitive description.

In step S901, the control circuit 112 confirms the presence/absence of an imaging start request from the PC 120. This processing is the same as that in step S501 of FIG. 10.

In step S902, the control circuit 112 resets an internal estimation sampling counter n to 0. The control circuit 112 includes a memory (not shown), and can store the setting of the estimation sampling counter n. In this step, the control circuit 112 resets the setting of the estimation sampling counter n stored in the memory (not shown).

In step S903, the control circuit 112 increments the estimation sampling counter n.

Processes of steps S904 to S906 are the same as those of step S504 (the processing for generating the radiation image X), step S505 (the processing for generating the imaging offset image U), and step S506 (the processing for generating the radiation afterimage (X−S)) of FIG. 10.

In step S907, the image generation circuit 113 performs the processing for generating the offset afterimage (U−T). The processing of the image generation circuit 113 in this step includes the processing of step S507 of FIG. 10. In this step, in addition to the generation of the offset afterimage (U−T), the image generation circuit 113 stores the generated offset afterimage (U−T) in the storage device 170.

The calculation processing of the correction coefficient k in step S908 and the processing for generating the corrected radiation image X' in step S909 are the same as those of steps S509 and S510 of FIG. 10.

Processing of determining in step S910 whether to continue imaging is the same as that in step S511 of FIG. 10. If imaging is ended (NO in step S910), image processing at the time of radiation imaging is ended. On the other hand, if imaging is continued (YES in step S910), the control circuit 112 advances the process to step S911.

In step S911, the control circuit 112 determines whether the estimation sampling counter n has reached a predetermined number N. If it is determined that the estimation sampling counter n has not exceeded the predetermined number N (NO in step S911), the control circuit 112 returns the process to step S903 and repeats the processes in step S903 and the subsequent steps. On the other hand, if it is determined, in the determination processing of step S911, that the estimation sampling counter n has reached the predetermined number N (YES in step S911), the control circuit 112 advances the process to step S912.

In step S912, the image generation circuit 113 generates an average offset afterimage by averaging the pixel values of a plurality of offset afterimages obtained in advance by continuing imaging. The image generation circuit 113 reads out several latest offset afterimages (U−T) that have been stored in the storage device 170 in step S907, and averages the pixel values of the readout several latest offset afterimages (U−T), thereby generating an average offset afterimage as an average image of the offset afterimages (U−T).

In step S913, the image generation circuit 113 adjusts the correction coefficient k with respect to the afterimage amount of the average offset afterimage generated in step S912 by the same method as in step S509 of FIG. 10. That is, the image generation circuit 113 calculates the correction coefficient k for each pixel region in the average offset afterimage generated by averaging pieces of pixel information (pixel value information) of the plurality of offset afterimages (U−T).

Processes (processes in steps S914 to S917) of newly obtaining various kinds of images by continuing imaging are the same as those of step S904 (the processing for generating the radiation image X), step S905 (the processing for generating the imaging offset image U), step S906 (the processing for generating the radiation afterimage (X−S)), and step S907 (the processing for generating the offset afterimage (U−T)).

In step S918, the image generation circuit 113 calculates a difference in average pixel value between the offset afterimage (U−T) and the average offset afterimage. The image generation circuit 113 calculates the difference (the absolute value of the difference) between the average pixel value for each ROI of the offset afterimage (U−T) generated in step S917 and the average pixel value for each ROI of the average offset afterimage generated in step S912. The image generation circuit 113 changes the correction coefficient k to be used for the processing for generating a magnification correction image by comparing, with a predetermined value, the difference between the average pixel value for each pixel region in the offset afterimage and the average pixel value for each pixel region in the average offset afterimage.

In step S919, the image generation circuit 113 determines whether the difference (the absolute value of the difference) for each ROI, which has been calculated in step S918, exceeds the predetermined value. If the difference (the absolute value of the difference) exceeds the predetermined value in one ROI (NO in step S919), the image generation circuit 113 advances the process to step S923. On the other hand, if it is determined, in the determination processing of step S919, that the difference (the absolute value of the difference) does not exceed the predetermined value in any of the ROIs (YES in step S919), the image generation circuit 113 advances the process to step S920. If it is determined, in the determination processing of step S919, that the difference (the absolute value of the difference) between the average pixel value for each ROI and the average pixel value for each ROI of the average offset afterimage, which has been calculated in step S918, does not exceed the predetermined value, there is no large change in the characteristic of the afterimage. In this case, when the difference (the absolute value of the difference) does not exceed the predetermined value, the image generation circuit 113 generates a magnification correction image using the correction coefficient k calculated for each pixel region in the average offset afterimage, and subtracts the magnification correction image (k(U−T)) from the radiation afterimage X newly obtained by continuing imaging, thereby generating the corrected radiation image X'.

In step S920, the image generation circuit 113 decides, as the correction coefficient k for each ROI to be used for the processing in step S921, the correction coefficient k of the average offset afterimage calculated in step S913.

In step S921, the image generation circuit 113 performs magnification correction processing using the correction coefficient k decided in step S920. Then, the image generation circuit 113 generates a corrected radiation image (X'=(X−S)−k(U−T)) by subtracting the offset afterimage (magnification correction image k(U−T)) having undergone the magnification correction processing from the radiation afterimage (X−S) generated in step S916. The image generation circuit 113 transmits the generated corrected radiation image X' to the PC 120.

Then, in step S922, the control circuit 112 performs the same processing of determining whether to continue imaging as that in step S910. If it is determined to continue imaging (YES in step S922), the control circuit 112 returns the process to step S914 and repeats the same processing. On the other hand, if it is determined not to continue imaging (NO in step S922), the control circuit 112 ends the image processing at the time of radiation imaging.

In this way, in a case where there is no large change in the characteristic of an afterimage, it is possible to reduce the afterimage using even the correction coefficient k calculated in step S913. Therefore, it is possible to improve the efficiency of calculation processing by omitting calculation of the correction coefficient k.

On the other hand, if it is determined, in the determination processing of step S919, that the difference (the absolute value of the difference) calculated in step S918 exceeds the predetermined value (NO in step S919), such large change that the predetermined value is exceeded occurs in the characteristic of the afterimage in the middle of imaging. In this case, the image generation circuit 113 advances the process to step S923. In subsequent processing, if the difference (the absolute value of the difference) exceeds the predetermined value, the image generation circuit 113 generates the magnification correction image (k(U−T)) using the correction coefficient k recalculated for each pixel region in the offset afterimage (U−T) newly obtained by continuing imaging, and subtracts the magnification correction image (k(U−T)) from the radiation afterimage (X−S) newly obtained by continuing imaging, thereby generating the corrected radiation image X'.

In step S923, the image generation circuit 113 recalculates the correction coefficient k. When performing recalculation, the image generation circuit 113 calculates the correction coefficient k by the same calculation processing as that in step S908 using the offset afterimage (U−T) generated in step S917. The image generation circuit 113 performs calculation processing of the correction coefficient for each region of interest (ROI) using the offset afterimage (U−T) generated in step S917.

In step S924, the image generation circuit 113 performs magnification correction processing using the correction coefficient k calculated in step S923. Then, the image generation circuit 113 generates the corrected radiation image X'(X'=(X−S)−k(U−T)) by subtracting the offset afterimage (magnification correction image k(U−T)) having undergone the magnification correction processing from the radiation afterimage (X−S) generated in step S916. The image generation circuit 113 transmits the generated corrected radiation image X' to the PC 120. After that, the process returns to step S902 again to perform the same processing. In the processing described with reference to FIG. 14, in a case where a large change occurs in the characteristic of the afterimage in the middle of imaging, it is possible to more accurately reduce the influence of the afterimage by regenerating the average offset afterimage.

Third Embodiment

The third embodiment of the present disclosure will be described next. The third embodiment is different from the second embodiment in that smoothing processing of the correction coefficient is performed after calculation processing of a correction coefficient k for each ROI, which has been described in step S509 of FIG. 10. Different parts of processing will be described in detail below to avoid a repetitive description.

In step S509 of the second embodiment, the calculation processing of the correction coefficient k for each ROI is performed, thereby deciding the correction coefficient k. However, when a difference in the correction coefficient k between adjacent ROIs is larger than a predetermined value, the difference in the correction coefficient k may cause a case where a step that can visually be perceived is generated at the boundary between the ROIs in the corrected radiation image X' generated in step S511.

In the third embodiment, to suppress the generation of a step at the boundary between ROIs, after calculation processing of the correction coefficient k for each ROI, an image generation circuit 113 compares the correction coefficients k calculated for the respective ROIs, and performs, if the difference in the correction coefficient k between adjacent ROIs exceeds a predetermined value (second threshold), correction processing (smoothing processing of the correction coefficient k) of smoothing the correction coefficient k between the adjacent ROIs. That is, if the difference between the correction coefficients of adjacent pixel regions among a plurality of pixel regions (ROIs) exceeds the predetermined value (second threshold), the image generation circuit 113 performs smoothing processing for the correction coefficients of the adjacent pixel regions so that the difference between the correction coefficients becomes smaller than the predetermined value (second threshold).

Figure 15:
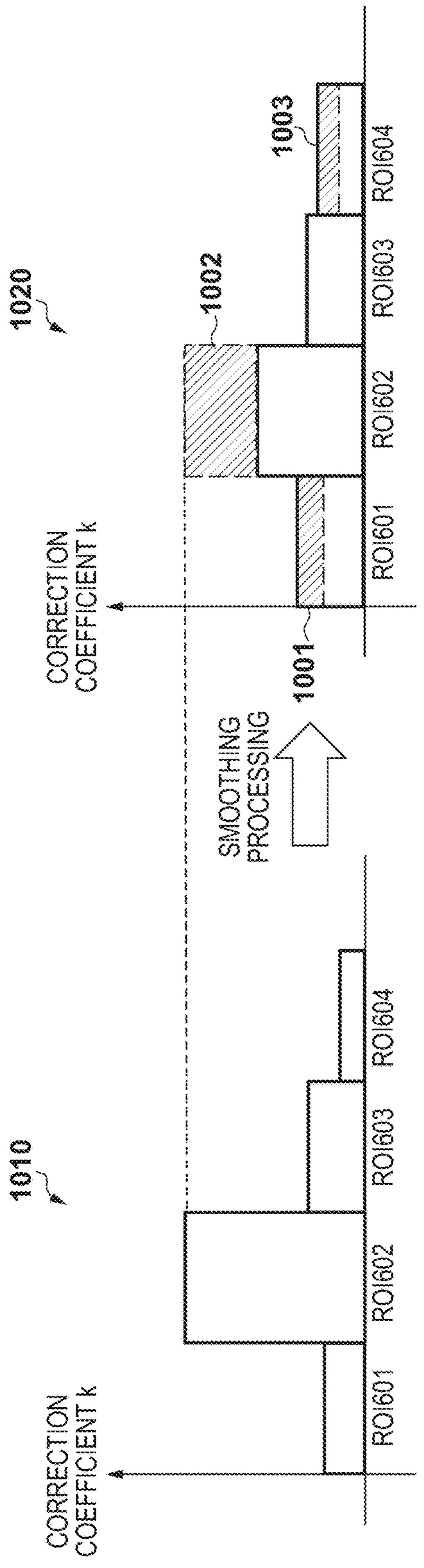
FIG. 15 is a view for explaining smoothing processing of a correction coefficient in a radiation imaging system according to some embodiments.
Figure 16:
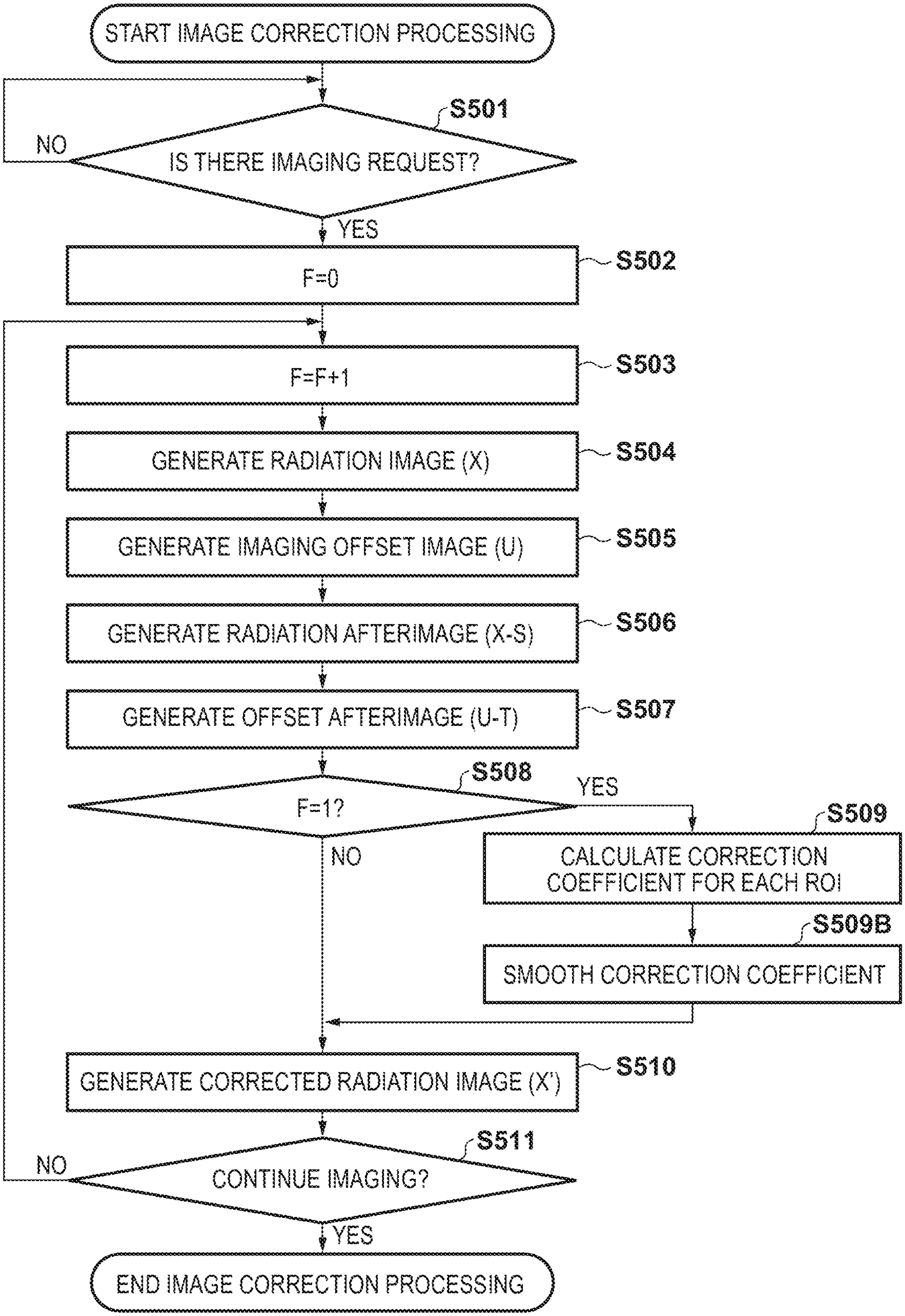
FIG. 16 is a flowchart for explaining image correction processing of a radiation image by the radiation imaging system according to some embodiments.

FIG. 15 is a view for explaining smoothing processing of the correction coefficient k in a radiation imaging system 100 according to the third embodiment. FIG. 16 is a flowchart for explaining image correction processing of a radiation image by the radiation imaging system 100 according to the third embodiment. In the flowchart shown in FIG. 16, after calculating the correction coefficient in step S509, smoothing processing for the correction coefficients calculated for the respective ROIs in step S509 is performed in step S509B. The remaining processing steps are the same as in the flowchart shown in FIG. 10. Detailed contents of the smoothing processing for the correction coefficients executed in step S509B will be described with reference to FIG. 15.

On the left side of FIG. 15, 1010 exemplifies the correction coefficient k of each ROI obtained by the calculation processing. On the right side of FIG. 15, 1020 exemplifies the correction coefficient k of each ROI obtained by the smoothing processing of the correction coefficient k. In FIG. 15, as an example, assume that the difference in the correction coefficient k between ROIs 601 and 602 or between the ROI 602 and an ROI 604 exceeds the predetermined value. In this case, correction processing (smoothing processing of the correction coefficient k) of smoothing the correction coefficient k is performed so that the difference in the correction coefficient k between the adjacent ROIs becomes smaller than the predetermined value, as shown in FIG. 15.

By the smoothing processing of the correction coefficient k, a smoothing correction amount 1001 is added to the correction coefficient k of the ROI 601 obtained by the calculation processing. Furthermore, a smoothing correction amount 1002 is subtracted from the correction coefficient k of the ROI 602 obtained by the calculation processing. A smoothing correction amount 1003 is added to the correction coefficient k of the ROI 604 obtained by the calculation processing. By performing the smoothing processing, the difference in the correction coefficient k between the ROIs 601 and 602 or between the ROIs 602 and 604 is smaller than the predetermined value. Note that in the example of the smoothing processing shown in FIG. 15, the correction coefficient k of each of the adjacent ROIs between which the difference in the correction coefficient k exceeds the predetermined value is corrected. However, the present disclosure is not limited to this, and the correction coefficient k of at least one of the adjacent ROIs may be corrected.

As the smoothing processing, various kinds of processes can be applied. As an example of the smoothing processing, for example, processing such as linear interpolation can be applied. The image generation circuit 113 generates a corrected radiation image X' using the correction coefficient k having undergone the smoothing processing. By performing the smoothing processing, it is possible to suppress generation of a step, that can visually be perceived, at the boundary between the ROIs in the generated corrected radiation image X'.

Note that the third embodiment has explained an example of processing in which the image generation circuit 113 compares the correction coefficients k calculated for the respective ROIs and determines whether the difference in the correction coefficient k between the adjacent ROIs exceeds the predetermined value (second threshold). However, the image generation circuit 113 may perform the smoothing processing for the correction coefficients k of all the ROIs without determining whether the difference in the correction coefficient exceeds the predetermined value (second threshold). The image generation circuit 113 may perform the smoothing processing to reduce the difference in the correction coefficient between the pixel regions among the plurality of pixel regions.

In the techniques disclosed in the above second and third embodiments, it is possible to perform accurate afterimage correction while improving the frame rate and reducing noise in a radiation image.

Fourth Embodiment (Offset Image Generation Processing)

Figure 17:
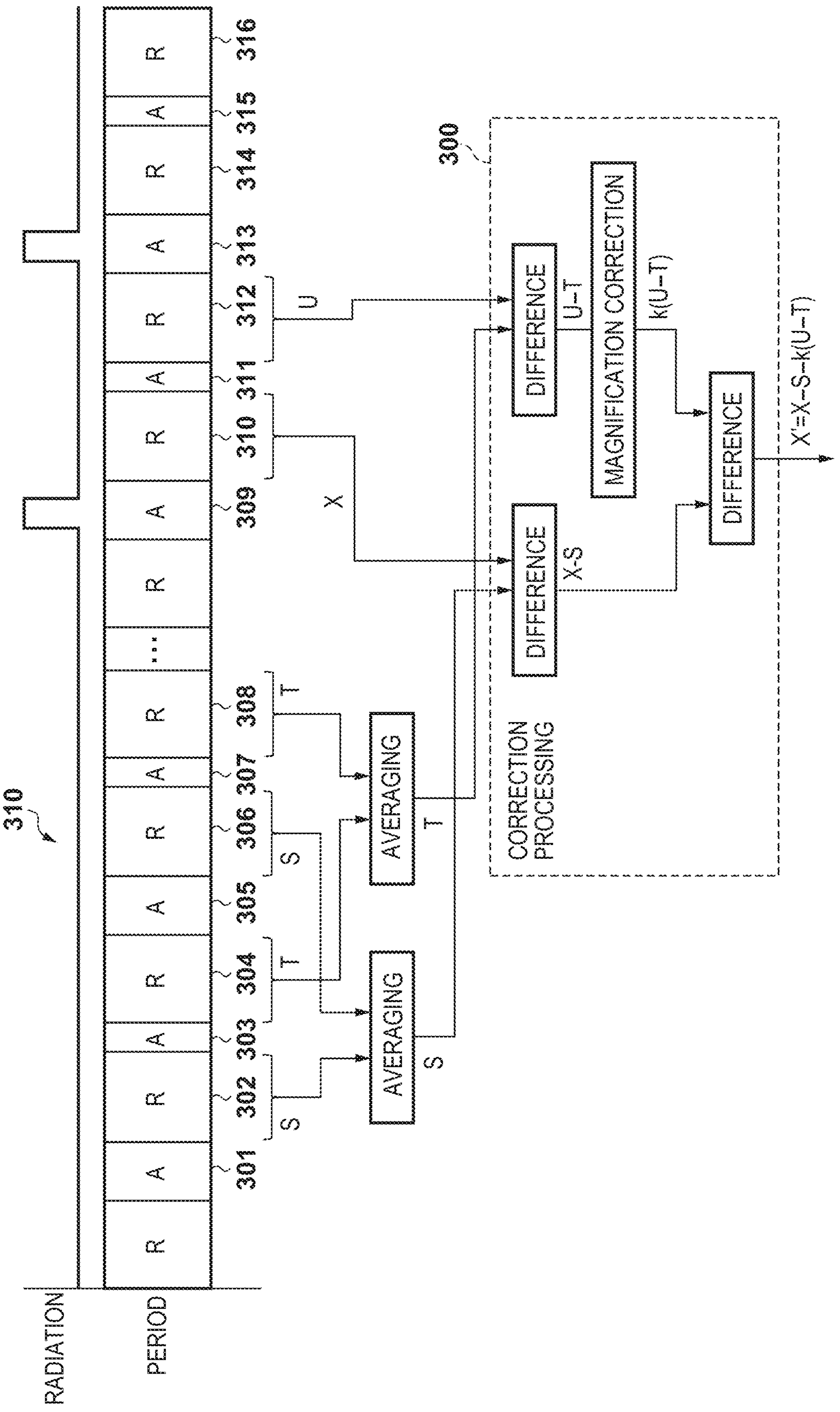
FIG. 17 is a view for explaining an example of the operation of the radiation imaging system according to some embodiments.
Figure 18:
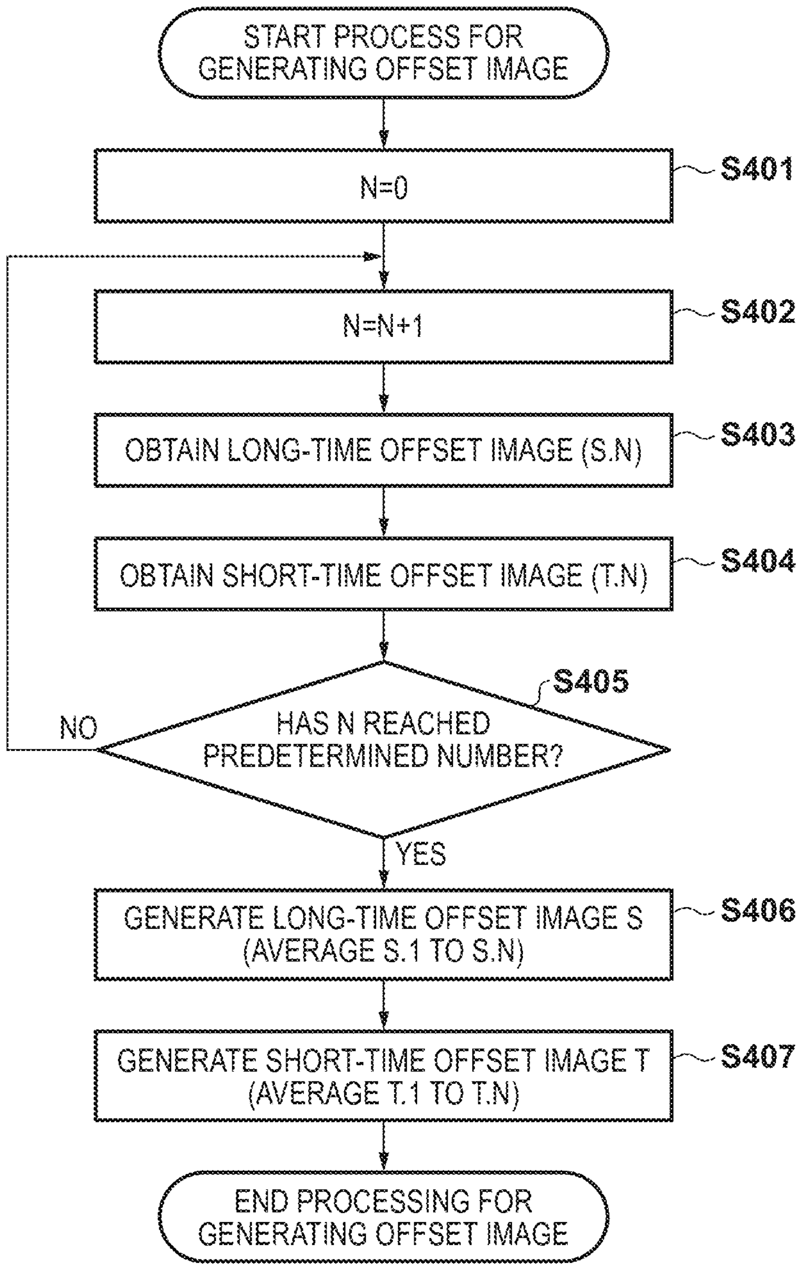
FIG. 18 is a flowchart for explaining offset image generation processing by a radiation imaging system according to some embodiments.

FIG. 17 is a view for explaining an example of the operation of a radiation imaging system 100 according to the fourth embodiment. FIG. 18 is a flowchart for explaining offset image generation processing by the radiation imaging system 100 according to fourth embodiment.

The offset image generation processing will be described below with reference to a timing chart 310 and a correction processing procedure 320 shown in FIG. 17 and the flowchart shown in FIG. 18. The upper side of FIG. 17 shows the timing chart 310, and the lower side of FIG. 17 shows the correction processing procedure 320.

In the timing chart 310 shown in FIG. 17, "radiation" indicates whether a radiation generating apparatus 140 irradiates a radiation imaging apparatus 110 with radiation 160. Low level indicates a state in which the radiation imaging apparatus 110 is not irradiated with the radiation 160 and high level indicates a state in which the radiation imaging apparatus 110 is irradiated with the radiation 160.

In the timing chart 310 shown in FIG. 17, "period" represents a period (time length) during which a specific operation is executed. Imaging by the radiation imaging apparatus 110 includes an accumulation period ("A" in FIG. 17) during which an accumulation operation is executed and a readout period ("R" in FIG. 17) during which a readout operation is executed. A control circuit 112 selects none of a plurality of pixels P included in a pixel array 200 during the accumulation period. More specifically, a driving circuit 210 maintains a state in which an OFF signal is supplied to each of driving lines Vg1 to Vgm. This accumulates, in each conversion device C, electric charges generated in the conversion device C, and also accumulates electric charges according to a dark current flowing to each conversion device C.

During the readout period, the control circuit 112 selects each of the plurality of pixels P included in the pixel array 200, and reads out a signal from the selected pixel P. More specifically, the driving circuit 210 sequentially supplies an ON signal to each of the driving lines Vg1 to Vgm. First, the driving circuit 210 supplies the ON signal only to the driving line Vg1. This turns on a switch element S(1, j) (j=1, . . . , n), a conversion device C(1, j) and a signal line Sigj are rendered conductive, and thus electric charges accumulated in the conversion device C(1, j) are read out into the signal line Sigj. Next, the driving circuit 210 supplies the ON signal only to the driving line Vg2. This turns on a switch element S(2, j), a conversion device C(2, j) and the signal line Sigj are rendered conductive, and thus electric charges accumulated in the conversion device C(2, j) are read out into the signal line Sigj. When the driving circuit 210 repeats this operation up to the driving line Vgm, the electric charges based on those accumulated in the conversion device C are read out by a readout circuit 220 via the signal line Sigj. In the following description, execution of the readout operation for the plurality of pixels P means execution of the readout operation for each of the plurality of pixels P. Offset image generation processing to be described in the following example is performed in imaging preparation, and is performed in periods 301 to 308 shown in FIG. 17.

In imaging preparation, the control circuit 112 alternately executes an accumulation operation and a readout operation in a state in which radiation irradiation is not performed. As shown in FIG. 17, an accumulation operation is executed during the accumulation period 301, and signals based on electric charges accumulated in the plurality of pixels P included in the pixel array 200 are read out during the accumulation period 302 after the accumulation period 301. The same applies to the accumulation period 303 to the readout period 308. The control circuit 112 reads out, during the subsequent readout period 304, 306, or 308, signals based on electric charges accumulated during the accumulation period 303, 305, or 307. In imaging preparation, signals read out from the plurality of pixels P included in the pixel array 200 are used to generate an offset image.

In the example shown in FIG. 17, the accumulation period 303 is shorter than the accumulation period 301. Similarly, the accumulation period 307 is shorter than the accumulation period 305. Each of the accumulation periods 301 and 305 will also be referred to as the first period hereinafter, and each of the accumulation periods 303 and 307 will also be referred to as the second period shorter than the first period hereinafter.

A signal read out during the readout period 302 or 306 is represented as a long-time offset signal (to be also referred to as the first signal or the first offset signal hereinafter), and a signal read out during the readout period 304 or 308 is represented as a short-time offset signal (to be also referred to as the second signal or the second offset signal hereinafter). In the state in which radiation irradiation is not performed, the control circuit 112 alternately executes the first readout control of reading out the first signal based on the electric charges accumulated during the accumulation period 301 or 305 (first period) and the second readout control of reading out the second signal based on the electric charges accumulated during the accumulation period 303 or 307 (second period) shorter than the first period.

An offset image generated based on the long-time offset signal (first signal) is represented as a long-time offset image (to be also referred to as the first offset image hereinafter), and an offset image generated based on the short-time offset signal (second signal) is represented as a short-time offset image (to be also referred to as the second offset image hereinafter).

In the following description, a long-time offset image obtained when a frame counter is set to N is represented by "S.N", and a short-time offset image is represented by "T.N". For example, a long-time offset image obtained when the frame counter is set to N=1 is represented by "S.1", and a short-time offset image is represented by "T.1".

In step S401, the control circuit 112 sets the frame counter N to 0. After that, in step S402, the control circuit 112 increments the frame counter N by adding 1 to the frame counter N.

In step S403, the long-time offset image S.1 is obtained. The operation of obtaining the long-time offset image S. 1 includes the accumulation operation executed during the accumulation period 301 of FIG. 17 and the readout operation of the signal (long-time offset signal) executed during the readout period 302. An image generation circuit 113 generates the long-time offset image S.1 based on a signal (long-time offset signal) obtained from a radiation detecting panel 111.

As a practical operation, during the accumulation period 301, the radiation imaging apparatus 110 performs an electric charge accumulation operation in all the pixels P (all image sensors) included in the pixel array 200 of the radiation detecting panel 111 in a state in which irradiation with the radiation 160 is not performed, as indicated by "radiation" in the timing chart 310 shown in FIG. 17. After that, in the readout operation executed during the readout period 302, the control circuit 112 controls the radiation detecting panel 111 to output a signal (electrical signal) based on the electric charges accumulated during the accumulation period 301, and the image generation circuit 113 generates image data based on the signal (electrical signal) obtained from the radiation detecting panel 111. The image generation circuit 113 stores the generated image data as the long-time offset image S.1 in a storage device 170.

In step S404, the short-time offset image T.1 is obtained. The operation of obtaining the short-time offset image T.1 includes the accumulation operation executed during the accumulation period 303 of FIG. 17 and the readout operation of the signal (short-time offset signal) executed during the readout period 304. The image generation circuit 113 generates the short-time offset image T.1 based on the signal (short-time offset signal) obtained from the radiation detecting panel 111.

During the accumulation period 303 shorter than the accumulation period 301, the radiation imaging apparatus 110 performs an electric charge accumulation operation in all the pixels P (all the image sensors) included in the pixel array 200 of the radiation detecting panel 111 in a state in which the radiation imaging apparatus 110 is not irradiated with the radiation 160. After that, in the readout operation executed during the readout period 304, the control circuit 112 controls the radiation detecting panel 111 to output a signal (electrical signal) based on the electric charges accumulated during the accumulation period 303, and the image generation circuit 113 generates image data based on the signal (electrical signal) obtained from the radiation detecting panel 111. The image generation circuit 113 stores the generated image data as the short-time offset image T.1 in the storage device 170.

After that, in step S405, the control circuit 112 determines whether the frame counter N has reached a predetermined number. As an example, a case where the predetermined number is two will be described. If it is determined in step S405 that the frame counter N has not reached the predetermined number (NO in step S405), the process is returned to step S402. That is, if the frame counter is N=1, the frame counter N has not reached the predetermined number, and thus the control circuit 112 returns the process to step S402.

After that, in step S402, the control circuit 112 increments the frame counter N by adding 1 to the frame counter N, and advances the process to step S403.

In step S403, a long-time offset image S.2 is obtained. The operation of obtaining the long-time offset image S.2 includes the accumulation operation executed during the accumulation period 305 of FIG. 17 and the readout operation of the signal (long-time offset signal) executed during the readout period 306. The image generation circuit 113 generates the long-time offset image S.2 based on the signal obtained from the radiation detecting panel 111.

The accumulation operation executed during the accumulation period 305 and the readout operation executed during the readout period 306 are respectively the same as the electric charge accumulation operation during the accumulation period 301 and the readout operation of the signal based on the electric charges during the readout period 302 when generating the long-time offset image S.1. The control circuit 112 controls the radiation detecting panel 111 to output the signal (electrical signal) based on the electric charges accumulated during the accumulation period 305, and the image generation circuit 113 generates image data based on the signal (electrical signal) obtained from the radiation detecting panel 111. The image generation circuit 113 stores the generated image data as the long-time offset image S.2 in the storage device 170. Thus, the storage device 170 stores the long-time offset images S.1 and S.2.

After that, in step S404, a short-time offset image T.2 is obtained. The operation of obtaining the short-time offset image T.2 includes the accumulation operation executed during the accumulation period 307 of FIG. 17 and the readout operation of the signal (short-time offset signal) executed during the readout period 308. The image generation circuit 113 generates the short-time offset image T.2 based on the signal (short-time offset signal) obtained from the radiation detecting panel 111.

The accumulation operation executed during the accumulation period 307 and the readout operation executed during the readout period 308 are respectively the same as the electric charge accumulation operation during the accumulation period 303 and the readout operation of the signal based on the electric charges during the readout period 304 when generating the short-time offset image T.1. The control circuit 112 controls the radiation detecting panel 111 to output the signal (electrical signal) based on the electric charges accumulated during the accumulation period 307, and the image generation circuit 113 generates image data based on the signal (electrical signal) obtained from the radiation detecting panel 111. The image generation circuit 113 stores the generated image data as the short-time offset image T.2 in the storage device 170. Thus, the storage device 170 stores the short-time offset images T.1 and T.2.

In step S405, the control circuit 112 determines again whether the frame counter N has reached the predetermined number. Assume here that the predetermined number is two. Therefore, the control circuit 112 determines that the frame counter N has reached the predetermined number (YES in step S405), and advances the process to step S406.

In step S406, the image generation circuit 113 performs processing for generating a long-time offset image S. The image generation circuit 113 generates the long-time offset image S by performing addition and averaging of the images from the long-time offset image S.1 to the long-time offset image S.N (in this example, N=2) stored in the storage device 170. The image generation circuit 113 stores the generated long-time offset image S in the storage device 170.

Subsequently, in step S407, the image generation circuit 113 performs processing for generating a short-time offset image T. The image generation circuit 113 generates the short-time offset image T by performing addition and averaging of the images from the short-time offset image T.1 to the short-time offset image T.N (in this example, N=2) stored in the storage device 170. The image generation circuit 113 stores the generated short-time offset image T in the storage device 170.

Then, the processing for generating the offset image to be used for image processing of a radiation image ends. As described above, in imaging preparation, the control circuit 112 alternately executes generation of the long-time offset image S and generation of the short-time offset image T.

This generates the plurality of long-time offset images S and the plurality of short-time offset images T. In imaging preparation, the image generation circuit 113 creates one long-time offset image S by averaging (performing addition and averaging) the plurality of long-time offset images S.i (i=1 to N), and stores the created image in the storage device 170 for subsequent processing. Similarly, in imaging preparation, the image generation circuit 113 creates one short-time offset image T by averaging (performing addition and averaging) the plurality of short-time offset images T.i (i=1 to N), and stores the created image in the storage device 170 for subsequent processing. By averaging the plurality of offset images in this way, it is possible to reduce noise included in the offset image.

Note that in the example described with reference to FIGS. 17 and 18, the predetermined number is two. However, the predetermined number is not limited to this, and the predetermined number is a number of 1 or more. The user can set an arbitrary number via an input device 115 connected to a computer 120. If the control circuit 112 determines in step S405 that the frame counter N has not reached the predetermined number (NO in step S405), the control circuit 112 returns the process to step S402, and increments the frame counter N by adding 1 to the frame counter N. Until the value of the frame counter N reaches the predetermined number, the operation of obtaining the long-time offset image S.N and the operation of obtaining the short-time offset image T.N are repeated as many times as the predetermined number (frame counter N). As the predetermined number is larger, it is possible to reduce noise included in the long-time offset image S and the short-time offset image T generated by the addition and averaging, and improve correction accuracy of correction processing (to be described later). The predetermined number, that is, the number of offset images to be used for averaging may be preset.

Operation Example 1

Figure 19:
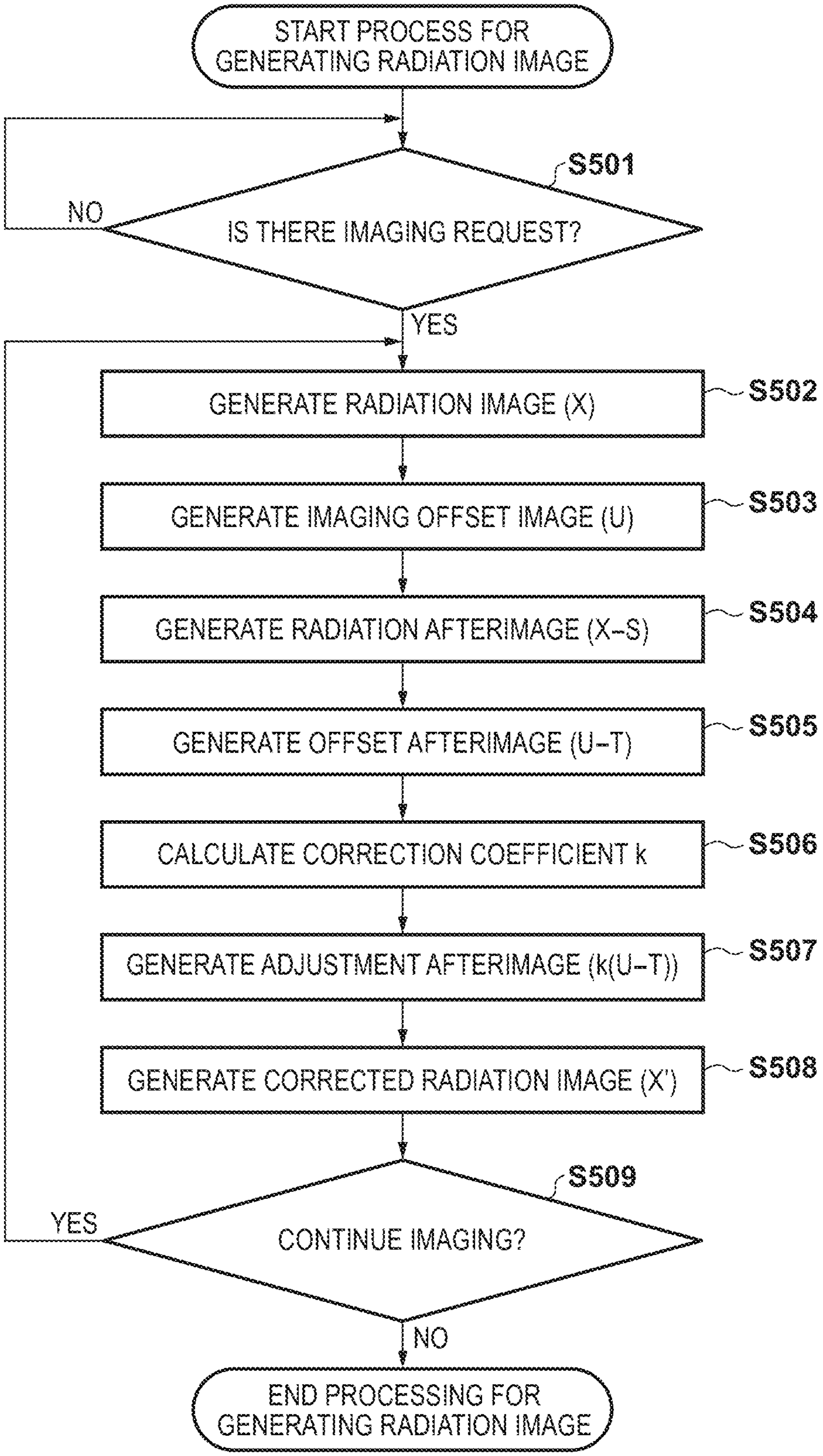
FIG. 19 is a flowchart for explaining operation example 1 of the radiation imaging system according to some embodiments.

FIG. 19 is a flowchart for explaining operation example 1 of the radiation imaging system 100 according to the fourth embodiment. Processing for generating a corrected radiation image X' obtained by correcting a radiation image X will be described with reference to the timing chart 310 and the correction processing procedure 320 shown in FIG. 17 and the flowchart shown in FIG. 19. Note that since the long-time offset image S and the short-time offset image T generated by the offset image generation processing are used in the image processing at the time of radiation imaging, it is assumed that the offset image generation processing is performed in advance. Therefore, assume that the image processing at the time of radiation imaging is performed after imaging preparation ends.

In step S501 of FIG. 19, the control circuit 112 confirms the presence/absence of an imaging start request from the computer 120. In an example, an exposure control apparatus 130 includes an exposure switch (not shown). When the user turns on the exposure switch, the exposure control apparatus 130 sends an exposure instruction to the radiation generating apparatus 140, and also sends a start notification indicating the start of radiation irradiation to the computer 120. In response to the start notification, the computer 120 that has received the start notification notifies the control circuit 112 of the radiation imaging apparatus 110 of the start of radiation irradiation. The control circuit 112 confirms the presence/absence of the notification from the computer 120. If the notification is sent (YES in step S501), the control circuit 112 advances the process to step S502. If no notification is sent from the computer 120 (NO in step S501), the control circuit 112 returns the process to step S501 again, and confirms the presence/absence of the notification from the computer 120.

In step S502, the control circuit 112 and the image generation circuit 113 perform processing for generating the radiation image X. The processing for generating the radiation image X includes an accumulation operation executed during an accumulation period 309 of FIG. 17 and a signal readout operation executed during a readout period 310.

The accumulation operation during the accumulation period 309 is performed in a state in which irradiation with radiation 160 is performed, as indicated by “radiation” in the timing chart 310 shown in FIG. 17. Note that a time length (accumulation time) representing the time length of the accumulation period 309 at the time of obtaining the radiation image X is equal to the time length (accumulation time) of the accumulation period 301 or 305 during which the accumulation operation is performed to obtain the long-time offset image S in imaging preparation. The accumulation period 309 will also be referred to as the third period hereinafter, and the accumulation period 309 (third period) has a time length equal to that of the accumulation period 301 or 305 (first period).

During the readout period 310, the control circuit 112 executes the third readout control of reading out, as the third signal, a radiation signal based on electric charges accumulated during the accumulation period 309 (third period) having the time length equal to that of the accumulation period 301 or 305 (first period) in the state in which radiation irradiation is performed. In the readout operation executed during the readout period 310, the control circuit 112 controls the radiation detecting panel 111 to output a signal (electrical signal) based on the electric charges accumulated during the accumulation period 309. The image generation circuit 113 generates the radiation image X based on the signal (electrical signal) output from the radiation detecting panel 111, and stores the generated image in the storage device 170. Note that the readout operation executed by the control circuit 112 during the readout period 310 is the same as the readout operation executed during the readout period 302 or 306 to obtain the long-time offset image S in imaging preparation.

In step S503, the control circuit 112 and the image generation circuit 113 perform processing for generating an imaging offset image U. The processing for generating the imaging offset image U includes an accumulation operation executed during an accumulation period 311 shown in FIG. 17 and a signal readout operation executed during a readout period 312.

The accumulation operation during the accumulation period 311 is performed in the state in which irradiation with the radiation 160 is not performed, as indicated by “radiation” in the timing chart 310 shown in FIG. 17. Note that a time length (accumulation time) representing the time length of the accumulation period 311 at the time of obtaining the imaging offset image U is equal to the time length (accumulation time) of the accumulation period 303 or 307 during which the accumulation operation is performed to obtain the short-time offset image Tin imaging preparation. The accumulation period 311 will also be referred to as the fourth period hereinafter, and the accumulation period 311 (fourth period) has a time length equal to that of the accumulation period 303 or 307 (second period).

During the readout period 312, the control circuit 112 executes the fourth readout control of reading out, as an imaging offset signal (to be also referred to as the fourth signal hereinafter), a signal based on electric charges accumulated during the accumulation period 311 (fourth period) in the state in which radiation irradiation is not performed after reading out the radiation signal (third signal) during the readout period 310. In the readout operation executed during the readout period 312, the control circuit 112 controls the radiation detecting panel 111 to output a signal (electrical signal) based on the electric charges accumulated during the accumulation period 311.

The image generation circuit 113 generates the imaging offset image U based on the signal (electrical signal) output from the radiation detecting panel 111, and stores the generated image in the storage device 170. Note that the readout operation executed by the control circuit 112 during the readout period 312 is the same as the readout operation executed during the readout period 304 or 308 to obtain the short-time offset image T in imaging preparation.

In step S504, the image generation circuit 113 performs processing for generating a radiation afterimage. The image generation circuit 113 reads out the radiation image X and the long-time offset image S (first offset image) stored in the storage device 170, and subtracts the long-time offset image S (first offset image) from the radiation image X, thereby generating a radiation afterimage ("X−S" in FIG. 17).

Subsequently, in step S505, the image generation circuit 113 performs processing for generating an offset afterimage. The image generation circuit 113 reads out the imaging offset image U and the short-time offset image T (second offset image) stored in the storage device 170, and subtracts the short-time offset image T (second offset image) from the imaging offset image U, thereby generating an offset afterimage ("U−T" in FIG. 17).

An afterimage amount included in each of the radiation afterimage (X−S) and the offset afterimage (U−T) is proportional to a time length for which electric charges are accumulated in the pixel P. In step S506, the image generation circuit 113 determines the afterimage amount in the offset afterimage (U−T) based on statistical information obtained by statistical processing of pixel values. The statistical information includes, for example, at least one of the maximum pixel value, the minimum pixel value, the standard deviation of the pixel values, the average value (in-plane average pixel value) of the pixel values, and the like in the offset afterimage (U−T).

Next, the image generation circuit 113 adjusts a correction coefficient k in accordance with the afterimage amount determined based on the statistical information obtained by the statistical processing of the pixel values in the offset afterimage (U−T). The afterimage amount is information representing the amount of afterimage components included in the offset afterimage (U−T).

Comparison between the afterimage amount and a threshold is merely an example. For example, if the statistical information is equal to or larger than a threshold th1 (first threshold), the image generation circuit 113 determines that the afterimage amount included in the offset afterimage (U−T) is large (a large afterimage amount), and sets the correction coefficient k based on the electric charge accumulation time. For example, the image generation circuit 113 may calculate the correction coefficient k based on the ratio (time length of third period/time length of fourth period) between the electric charge accumulation time (the time length of the third period) in the state in which radiation irradiation is performed and the electric charge accumulation time (the time length of the fourth period) in the state in which radiation irradiation is not performed.

In a case where, for example, the electric charge accumulation period based on radiation (for example, the period 309 (third period) in FIG. 17) and the accumulation period of electric charges accumulated in the state in which radiation irradiation is not performed (for example, the period 311 (fourth period) in FIG. 17) are used as the electric charge accumulation periods, the ratio of the period 309 to the period 311 (that is, a value obtained by dividing the time length of the period 309 by the time length of the period 311) may be used as the correction coefficient k. Since the time length of the period 309 is longer than the time length of the period 311, the value obtained by dividing the period 309 by the period 311 is larger than "1".

In a case where the statistical information is smaller than the threshold th1 (first threshold) and equal to or larger than a threshold th2 (second threshold) smaller than the threshold th1 (th1>afterimage amount≥th2), the image generation circuit 113 sets "1" as the correction coefficient k. In this case, the image generation circuit 113 determines that the afterimage amount included in the offset afterimage (U−T) is small (a small afterimage amount), and the image generation circuit 113 sets "1" as the correction coefficient k.

In a case where the statistical information is smaller than the threshold th2 (second threshold) (afterimage amount<th2), the image generation circuit 113 determines that no afterimage is generated, and sets the correction coefficient k to zero (0). In this case, the image generation circuit 113 determines that the offset afterimage (U−T) includes no afterimage component (afterimage amount: none), and sets the correction coefficient k to zero (0).

The above-described example is merely an example, and the image generation circuit 113 determines the afterimage amount by the determination processing of comparing, with the threshold, the statistical information obtained by the statistical processing of the pixel values in the offset afterimage (U−T), and adjusts the correction coefficient k stepwise in accordance with the afterimage amount. In this example, the arrangement of using the first and second thresholds has been exemplified. However, the present disclosure is not limited to this, and the user can arbitrarily set, via the input device 115, the number of thresholds to be used for determination of the afterimage amount, the setting value of each threshold, and the like. For example, the setting value of each threshold may be changed in accordance with the intensity and irradiation time of radiation to be emitted, a captured portion, an imaging condition, and the like.

In step S507, the image generation circuit 113 generates an adjustment afterimage (k(U−T) in FIG. 17) by correcting the pixel values in the offset afterimage (U−T) using the correction coefficient k calculated in step S506. That is, the image generation circuit 113 generates an adjustment afterimage (k(U−T) in FIG. 17) by multiplying the pixel values in the offset afterimage (U−T) by the correction coefficient k.

In step S508, the image generation circuit 113 subtracts the adjustment afterimage (k(U−T) from the radiation afterimage (X−S) generated in step S504, thereby generating the radiation image X'(X'=(X−S)−k(U−T) in FIG. 17) obtained by correcting the radiation image X. The corrected radiation image X' is obtained by reducing the afterimage from the radiation image X.

The radiation image X' obtained by correcting the radiation image X is an image obtained by correcting the radiation image X using the long-time offset image S (first offset image), the short-time offset image T (second offset image), the imaging offset image U (third offset image), and the correction coefficient k. The image generation circuit 113 transmits the corrected radiation image X' to the computer 120.

The above-described calculation order for generating the radiation image X' is merely an example, and calculation may be performed in another order. The radiation image X', that is, X−S−k(U−T) is changed to X−kU+(kT−S). In imaging preparation, the image generation circuit 113 may calculate kT−S using the long-time offset image S, the short-time offset image T, and the correction coefficient k, and store the value as a correction value in the memory of the image generation circuit 113. The correction coefficient k can be decided based on the preset of a timing at which the driving circuit 210 supplies the ON signal to the pixel array 200. In capturing a moving image, the image generation circuit 113 may correct the radiation image X using the imaging offset image U, the correction value stored in the storage device 170, and the correction coefficient k. In this way, by storing the correction value instead of storing the long-time offset image S and the short-time offset image T, it is possible to reduce the memory consumption of the image generation circuit 113.

After that, in step S509, the control circuit 112 determines whether to continue imaging. In an example, the exposure control apparatus 130 includes an exposure switch (not shown). When the user turns off the exposure switch, the exposure control apparatus 130 sends an exposure stop instruction to the radiation generating apparatus 140, and also sends a stop notification indicating the stop of radiation irradiation to the computer 120. In response to the stop notification, the computer 120 that has received the stop notification notifies the control circuit 112 of the radiation imaging apparatus 110 of the stop of radiation irradiation. The control circuit 112 confirms the presence/absence of an imaging end request from the computer 120. If imaging is not continued (NO in step S509), the control circuit 112 ends the processing for generating the radiation image. On the other hand, if an imaging end request is not sent to capture a plurality of frames like moving image capturing, it is determined to continue imaging (YES in step S509), and the control circuit 112 returns the process to step S502 again, and repeats the same processing. If imaging is continued, the control circuit 112 and the image generation circuit 113 perform the same processing in an accumulation period 313 (third period), a readout period 314, an accumulation period 315 (fourth period), and a readout period 316.

After that, the processes in steps S502 to S508 are repeated again. By generating the corrected radiation image X' by correcting the radiation image X for each captured frame in the above-described processing, it is possible to perform accurate afterimage correction while improving the frame rate and reducing noise in a radiation image.

Operation Example 2

Figure 20A:
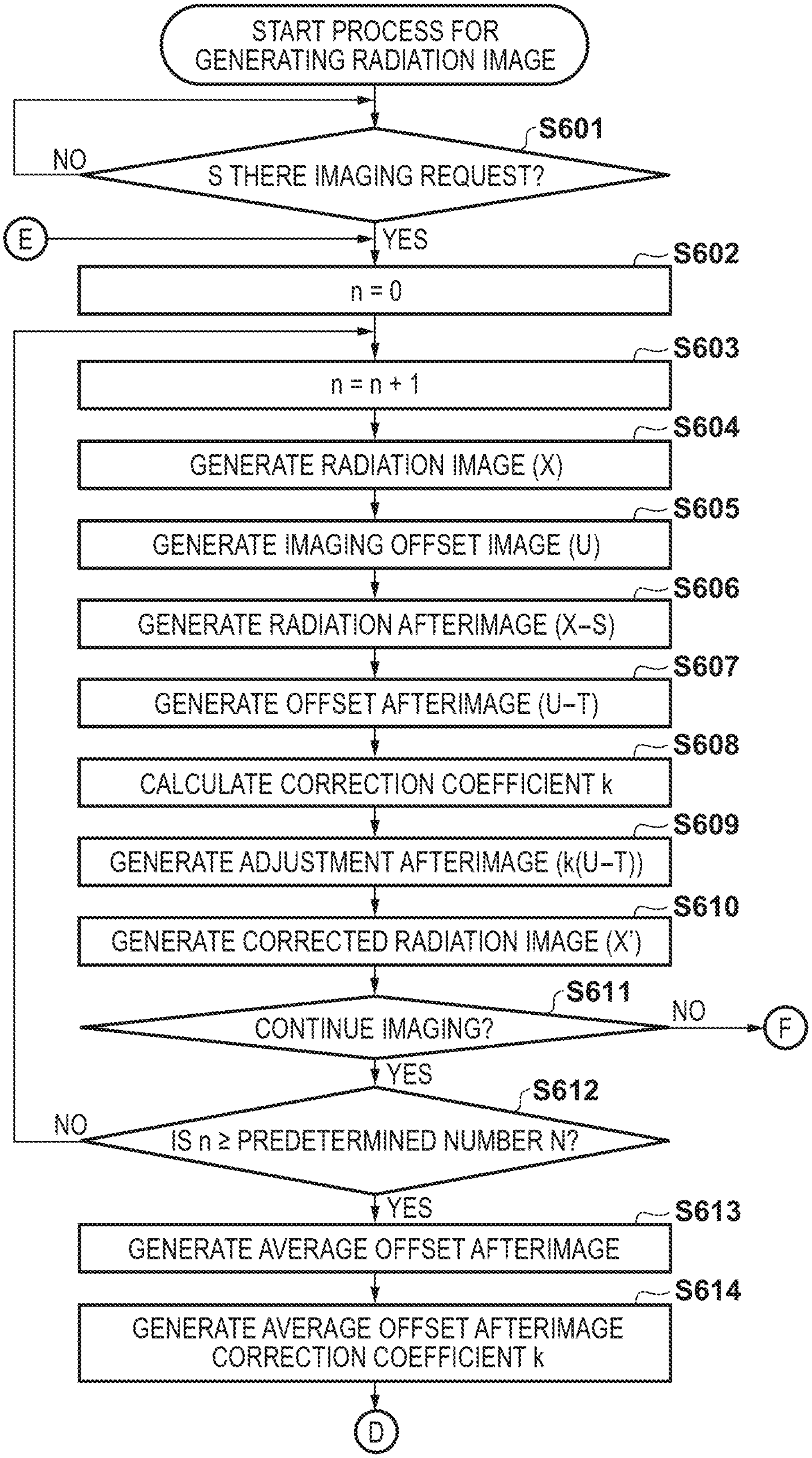
FIGS. 20A and 20B are flowcharts for explaining operation example 2 of the radiation imaging system according to some embodiments.
Figure 20B:
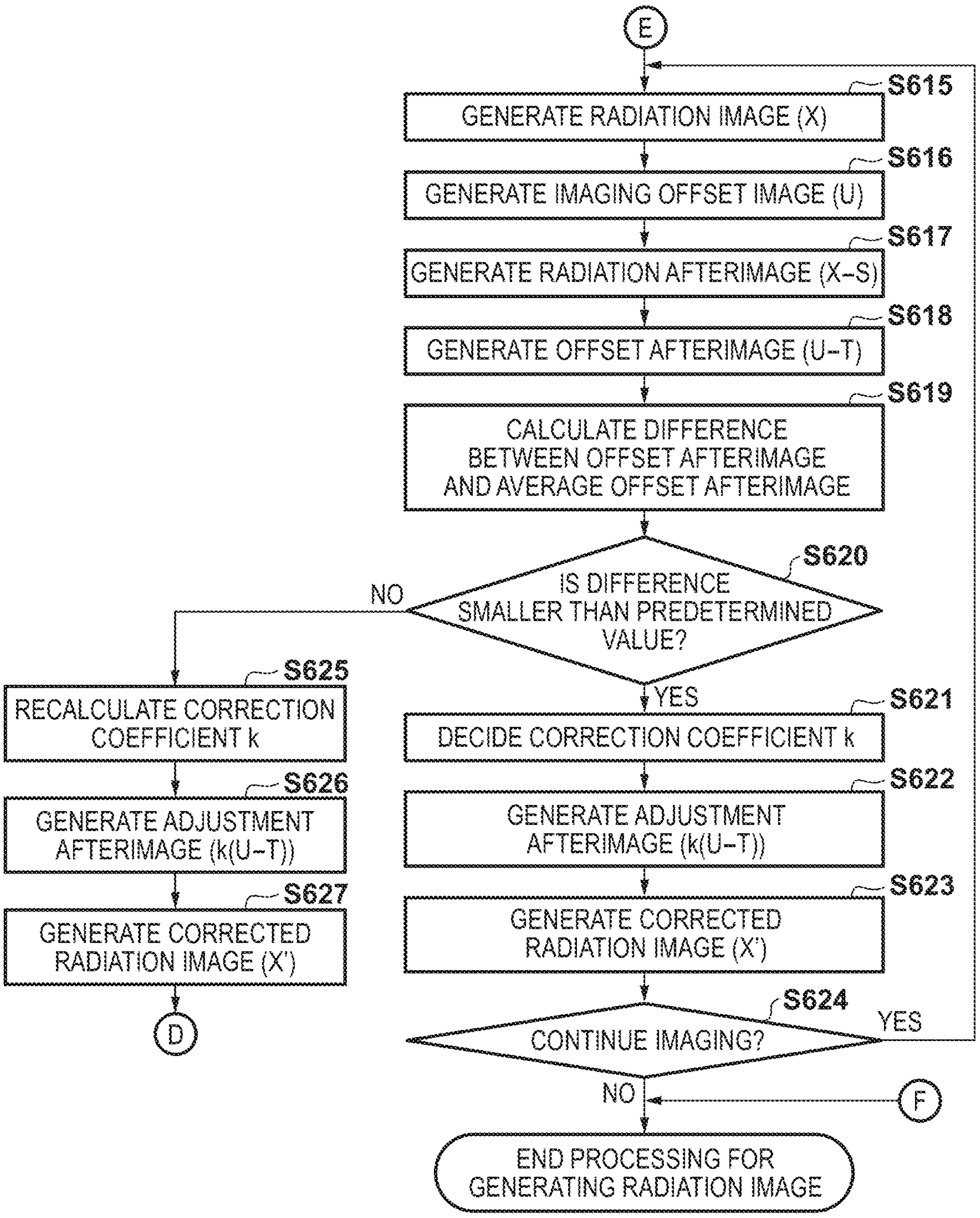

Operation example 2 of the radiation imaging apparatus 110 different from operation example 1 of the radiation imaging apparatus 110 described with reference to FIG. 19 will be described next with reference to a flowchart shown in FIG. 20. FIG. 20 is a flowchart for explaining operation example 2 of the radiation imaging system 100 according to the fourth embodiment. Processing for generating the corrected radiation image X' by correcting the radiation image X will be described with reference to the timing chart 310 and the correction processing procedure 320 shown in FIG. 17 and the flowchart shown in FIG. 20.

As different operation example 2, the efficiency of calculation processing of the correction coefficient k may be improved, as illustrated in the flowchart shown FIG. 20. After irradiation with radiation having high intensity, an afterimage component amount included in the offset afterimage (U−T) nonlinearly attenuates with time, and the attenuation amount of the afterimage component has a property of converging into zero (0).

Figure 21:
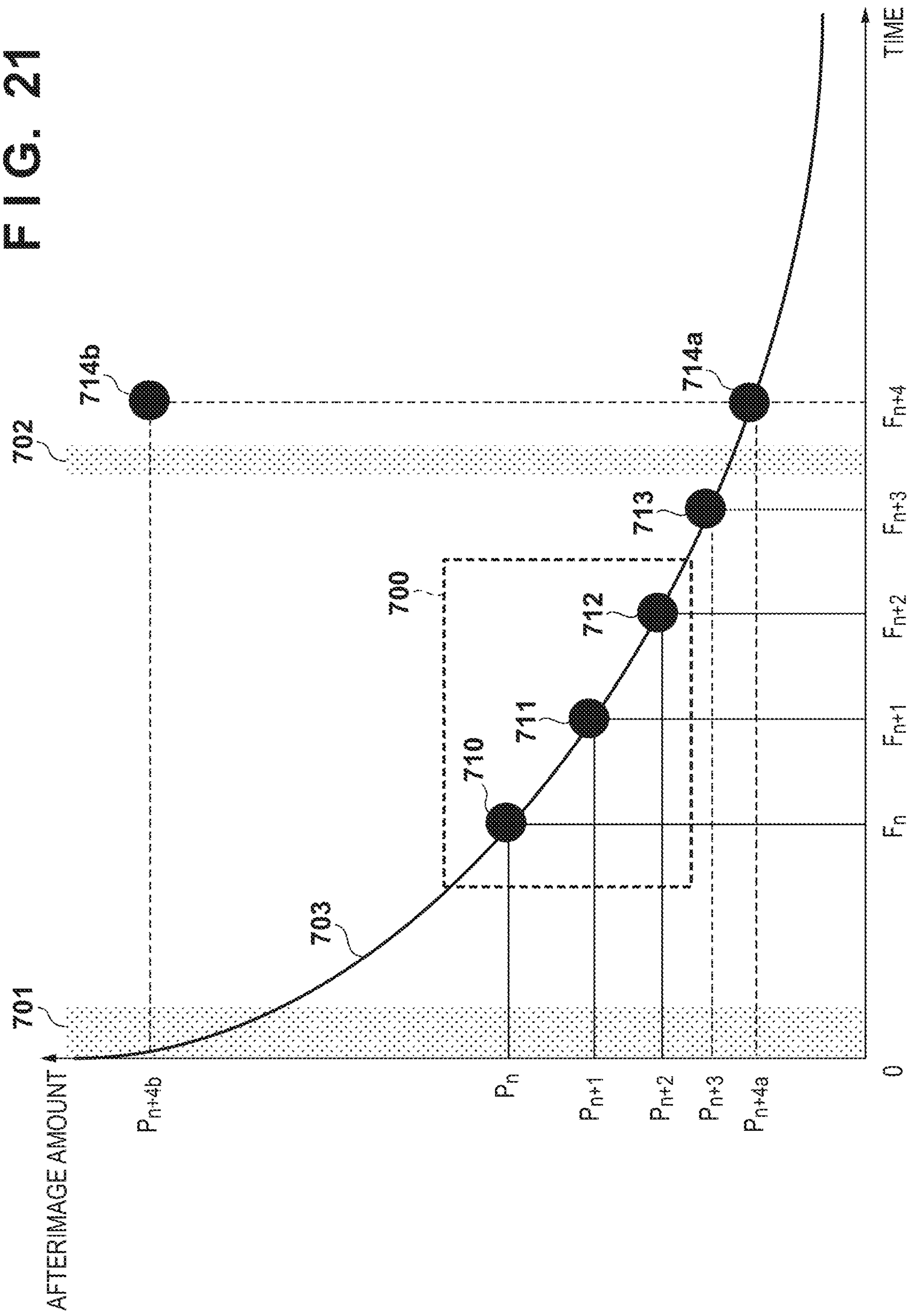
FIG. 21 is a timing chart exemplifying the attenuation characteristic of an afterimage amount.

FIG. 21 is a timing chart exemplifying the attenuation characteristic of the afterimage amount, in which the abscissa represents the time and the ordinate represents the afterimage amount (afterimage component amount). When irradiation with radiation 701 is performed, the afterimage component amount attenuates with time like a nonlinear attenuation characteristic 703. Referring to FIG. 21, an afterimage amount 710 indicates an offset afterimage $P_n$ ($P_n=U_n-T_n$) when the radiation image X is captured in an nth frame $F_n$, and an afterimage amount 711 indicates an offset afterimage $P_{n+1}$ ($P_{n+1}=U_{n+1}-T_{n+1}$) when the radiation image X is captured in an (n+1)th frame $F_{n+1}$. In addition, an afterimage amount 712 indicates an offset afterimage $P_{n+2}$ ($P_{n+2}=U_{n+2}-T_{n+2}$) when the radiation image X is captured in an (n+2)th frame $F_{n+2}$.

A range 700 shown in FIG. 21 exemplifies the range of a plurality of offset afterimages used to obtain an average offset afterimage generated in step S613 of FIG. 20. In the example shown in FIG. 21, assume that an average offset afterimage is generated using three offset afterimages included in the range 700. The image generation circuit 113 generates an average offset afterimage by averaging the pixel values of the plurality of offset afterimages (for example, $P_n$, $P_{n+1}$, and $P_{n+2}$ in FIG. 21) obtained in advance by continuing imaging. A correction coefficient calculated for the average offset afterimage is represented by $K_{AVE}$.

Referring to FIG. 21, an afterimage amount 713 indicates an offset afterimage $P_{n+3}$ ($P_{n+3}=U_{n+3}-T_{n+3}$) when the radiation image X is captured in an (n+3)th frame $F_{n+3}$, and the accumulation period 713 attenuates from the preceding frame $F_{n+2}$ in accordance with the attenuation characteristic 703.

Afterimage amounts 714*a* and 714*b* represent afterimage amounts after irradiation with radiation 702, and the afterimage amount 714*a* indicates an offset afterimage $P_{n+4a}$ ($P_{n+4a}=U_{n+4a}-T_{n+4a}$) when the radiation image X is captured in an (n+4)th frame $F_{n+4}$. In addition, the afterimage amount 714*b* indicates an offset afterimage $P_{n+4b}$ ($P_{n+4b}=U_{n+4b}-T_{n+4b}$) when the radiation image X is captured in an (n+4)th frame $F_{n+4}$.

Even after irradiation with the radiation 702, the afterimage amount 714*a* attenuates from the preceding frame $F_{n+3}$ in accordance with the attenuation characteristic 703. On the other hand, the afterimage amount 714*b* is an afterimage amount deviating from the attenuation characteristic 703.

With respect to the offset afterimages ($P_{n+3}$ and $P_{n+4a}$) newly obtained by continuing imaging, the afterimage amount changes in accordance with the attenuation characteristic 703. Even if the correction coefficient k is calculated for each of the offset afterimages ($P_{n+3}$ and $P_{n+4a}$), the difference from the correction coefficient $K_{AVE}$ calculated for the average offset afterimage is estimated to be small. In this case, as will be described in steps S621 and S622 when YES is determined in step S620 of FIG. 20, if the difference between the average pixel value in the offset afterimages ($P_{n+3}$ and $P_{n+4a}$) newly obtained by continuing imaging and the average pixel value in the average offset afterimage falls within a predetermined range (YES in step S620), adjustment afterimages ($K_{AVE}$ $(U_{n+3}-T_{n+3})$ and $K_{AVE}$ $(U_{n+4a}-T_{n+4a})$) are generated using the correction coefficient $K_{AVE}$ calculated for the average offset afterimage.

On the other hand, if the difference between the average pixel value in the offset afterimage ($P_{n+4b}$) newly obtained by continuing imaging and the average pixel value in the average offset afterimage exceeds the predetermined range (NO in step S620), an adjustment afterimage ($K(U_{n+4b}$-$T_{n+4b}))$ is generated using the recalculated correction coefficient k in the newly obtained offset afterimage ($P_{n+4b}$) (steps S625 and S626). The detailed processing procedure will be described below with reference to the flowchart shown in FIG. 20.

The flowchart shown in FIG. 20 shows the procedure of processing of improving the efficiency of calculation processing of the correction coefficient k in consideration of the attenuation characteristic of the afterimage component included in the offset afterimage (U−T). Note that the processing shown in FIG. 20 includes processing common to the flowchart shown in FIG. 19, and different parts of processing will be described in detail to avoid a repetitive description.

In step S601, the control circuit 112 confirms the presence/absence of an imaging start request from the computer 120. This processing is the same as that in step S501 of FIG. 19.

In step S602, the control circuit 112 resets an internal imaging counter n to 0. The control circuit 112 includes a memory (not shown), and can store the setting of the imaging counter n. In this step, the control circuit 112 resets the setting of the imaging counter n stored in the memory (not shown).

In step S603, the control circuit 112 increments the imaging counter n.

Processes of steps S604 to S611 are the same as those of steps S502 to S509 of FIG. 19. That is, the processes of steps S604 to S611 are the same those of step S502 (the generation of the radiation image X), step S503 (the generation of the imaging offset image U), step S504 (the generation of the radiation afterimage (X−S)), step S505 (the generation of the offset afterimage (U−T), step S506 (the calculation of the correction coefficient k), step S507 (the generation of the adjustment afterimage k(U−T)), step S508 (the generation of the corrected radiation image X'), and step S509 (the determination of whether to continue imaging) of FIG. 19.

In step S612, the control circuit 112 determines whether the imaging counter n has reached a predetermined number. If it is determined that the imaging counter n has not exceeded the predetermined number (NO in step S612), the control circuit 112 returns the process to step S603 and repeats the processes in step S603 and the subsequent steps. On the other hand, if it is determined, in the determination processing of step S612, that the imaging counter n has reached the predetermined number (YES in step S612), the control circuit 112 advances the process to step S613.

In step S613, the image generation circuit 113 reads out several latest offset afterimages (U−T) that have been stored in the storage device 170 in step S607, for example, $P_n$, $P_{n+1}$, and $P_{n+2}$ in FIG. 21, and averages the pieces of pixel information (pixel value information) of the readout several latest offset afterimages (U−T), thereby generating an average offset afterimage as an average image of the offset afterimages (U−T).

In step S614, the image generation circuit 113 calculates the correction coefficient k with respect to an afterimage amount in the average offset afterimage generated in step S613 by the same method as in step S506 of FIG. 19, and stores the calculated correction coefficient k in the storage device 170. The correction coefficient k calculated in this step corresponds to the correction coefficient $K_{AVE}$ described with reference to FIG. 21.

Processes of steps S615 to S618 are the same as the processes of steps S502 to S505 of FIG. 19, that is, the processes of step S502 (the processing for generating the radiation image X), step S503 (the processing for generating the imaging offset image U), step S504 (the processing for generating the radiation afterimage (X−S)), and step S505 (the processing for generating the offset afterimage (U−T)) of FIG. 19.

In step S619, the image generation circuit 113 calculates the difference (the absolute value of the difference) between the average pixel value in the imaging offset afterimage (U−T) generated in step S616 and the average pixel value in the average offset afterimage generated in step S613.

By determining (step S620) whether the difference between the average pixel value in the offset afterimage newly obtained by continuing imaging and the average pixel value in the average offset afterimage falls within the predetermined range, the image generation circuit 113 adjusts the correction coefficient to be used for processing for generating an adjustment afterimage.

In step S620, the image generation circuit 113 determines whether the difference (the absolute value of the difference) calculated in step S619 falls within the predetermined range. If the image generation circuit 113 determines that the difference (the absolute value of the difference) exceeds the predetermined range (NO in step S620), the image generation circuit 113 advances the process to step S625.

On the other hand, if it is determined, in the determination processing of step S620, that the difference (the absolute value of the difference) falls within the predetermined range (YES in step S620), the image generation circuit 113 advances the process to step S621. If it is determined, in the determination processing of step S620, that the absolute value of the difference between the average pixel value in the offset afterimage (U−T) calculated in step S619 and the average pixel value in the average offset afterimage does not exceed the predetermined range, there is no large change in the characteristic of the afterimage.

In step S621, the image generation circuit 113 decides, as the correction coefficient k for generating an adjustment afterimage, the correction coefficient k (the correction coefficient $K_{AVE}$ described with reference to FIG. 21) of the average offset afterimage obtained in step S614. If the difference (the absolute value of the difference) does not exceed the predetermined range, the image generation circuit 113 generates an adjustment afterimage using the correction coefficient k (step S614) (the correction coefficient $K_{AVE}$ described with reference to FIG. 21) calculated for the average offset afterimage, and subtracts the adjustment afterimage (k(U−T)) from the radiation afterimage X newly obtained by continuing imaging, thereby generating the corrected radiation image X'.

Processes (processes in steps S622 to S624) of newly obtaining various kinds of images by continuing imaging are the same as those of steps S507 to S509 of FIG. 19. That is, the processes are the same as those of step S507 (the generation of the adjustment afterimage k(U−T)), step S508 (the generation of the corrected radiation image X'), and step S509 (the determination of whether to continue imaging) of FIG. 19.

In step S622, the image generation circuit 113 performs processing of generating the adjustment afterimage (k(U−

T)) using the correction coefficient k (the correction coefficient $K_{AVE}$ described with reference to FIG. 21) decided in step S621.

In step S623, the image generation circuit 113 generates the corrected radiation image (X'=(X−S)−k(U−T)) in which the afterimage is reduced from the radiation image X, by subtracting the adjustment afterimage (k(U−T)) generated in step S622 from the radiation afterimage (X−S) generated in step S617. The image generation circuit 113 transmits the generated corrected radiation image X' to the computer 120.

Then, in step S624, the control circuit 112 performs processing of determining whether to continue imaging, which is the same as in step S611. If it is determined to continue imaging (YES in step S624), the control circuit 112 returns the process to step S615, and repeats the same processing. Note that for the purpose of updating the correction coefficient k to be used in step S621 every time imaging is performed, the processes from step S613 may be repeated.

If it is determined not to continue imaging (NO in step S624), the processing for generating the radiation image is ended. Thus, in a case where there is no large change in the characteristic of the afterimage, it is possible to reduce the afterimage by using even the correction coefficient k calculated in step S614. Therefore, it is possible to improve the efficiency of the calculation processing by omitting calculation of the correction coefficient k.

On the other hand, if it is determined, in the determination processing of step S620, that the difference (the absolute value of the difference) calculated in step S619 exceeds the predetermined range (NO in step S620), such large change that the predetermined range is exceeded occurs in the characteristic of the afterimage in the middle of imaging (for example, the afterimage amount 714*b* in FIG. 21). In this case, it is considered that irradiation with strong radiation (for example, the radiation 702 in FIG. 21) is performed again, and the image generation circuit 113 advances the process to step S625. In subsequent processing, if the difference (the absolute value of the difference) exceeds the predetermined value, the image generation circuit 113 generates the adjustment afterimage (k(U−T)) using the recalculated correction coefficient k in the offset afterimage (U−T: for example, $P_{n+4b}$ in FIG. 21) newly obtained by continuing imaging, and subtracts the adjustment afterimage (k(U−T)) from the radiation afterimage (X−S) newly obtained by continuing imaging, thereby generating the corrected radiation image X'.

In step S625, the image generation circuit 113 recalculates the correction coefficient k. When performing recalculation, the image generation circuit 113 calculates the correction coefficient k by the same calculation processing as that in step S608 (S506) using the offset afterimage (U−T: for example, $P_{n+4b}$ in FIG. 21) generated in step S618. In this way, by switching the calculation method of the correction coefficient k in accordance with the temporal change amount of the afterimage, it is possible to improve the efficiency of calculation of the correction coefficient k.

Processes of steps S626 and S627 are the same as those of steps S507 and S508 of FIG. 19. That is, the processes are the same as those of step S507 (the generation of the adjustment afterimage (k(U−T)) and step S508 (the generation of the corrected radiation image X') of FIG. 19.

In step S626, the image generation circuit 113 performs processing of generating the adjustment afterimage (k(U−T)) using the correction coefficient k calculated in step S625. Then, the image generation circuit 113 generates the corrected radiation image X'(X'=(X−S)−k(U−T)) in which the afterimage is reduced from the radiation image X, by subtracting the adjustment afterimage (k(U−T)) from the radiation afterimage (X−S) generated in step S617. The image generation circuit 113 transmits the generated corrected radiation image X' to the computer 120. After that, the process is returned to step S602 again and the same processing is performed. In the processing described with reference to FIG. 20, in a case where a large change occurs in the characteristic of the afterimage in the middle of imaging, the adjustment afterimage (k(U−T)) is generated using the recalculated correction coefficient k, and the corrected radiation image X' is generated by correcting the radiation image X, thereby making it possible to more accurately reduce the influence of the afterimage.

In the above-described fourth embodiment, the pixel array 200 includes only the pixels P to be used to generate a radiation image. Instead of this, the pixel array 200 may include pixels to be used for the purpose other than generation of a radiation image, like pixels to be used for automatic exposure control.

According to the technique disclosed in the above-described fourth embodiment, it is possible to perform accurate afterimage correction while improving the frame rate and reducing noise in a radiation image.

Fifth Embodiment

Figure 22:
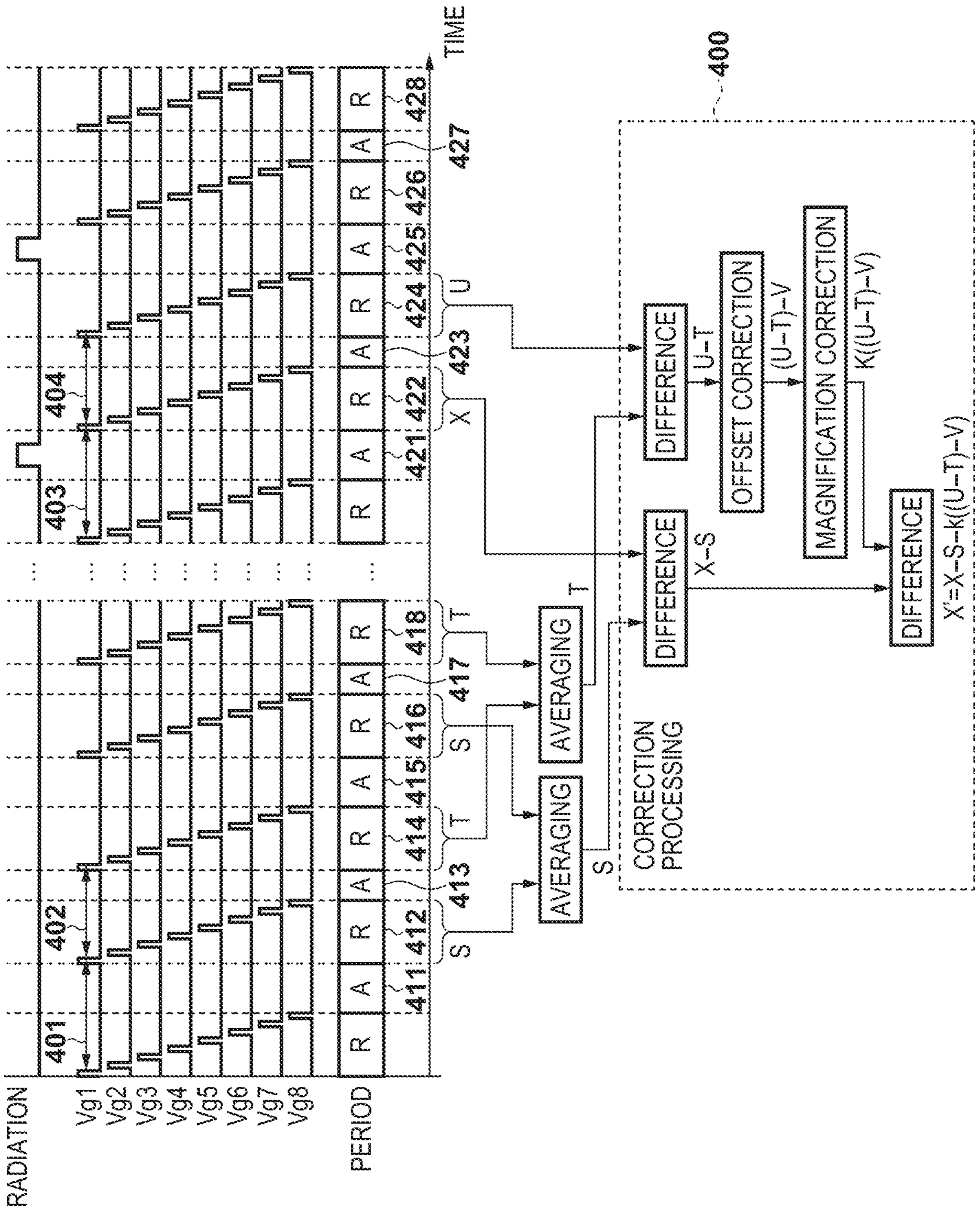
FIG. 22 is a view for explaining an example of the operation of a radiation imaging system according to some embodiments.

An example of the operation of a radiation imaging system 100 according to the fifth embodiment will be described with reference to FIG. 22. The upper side of FIG. 22 shows a timing chart, and the lower side of FIG. 22 shows the procedure of signal processing. The same applies to FIGS. 23 to 25 to be described later. The operation shown in FIG. 22 is started when, for example, the user of the radiation imaging system 100 gives an instruction. The operation of the radiation imaging system 100 is controlled by the computer 120. Under the control of the computer 120, the operation of a radiation imaging apparatus 110 is executed by a control circuit 112. More specifically, the control circuit 112 executes the operation shown in FIG. 22 by controlling a driving circuit 210 and a readout circuit 220. In the following description, execution of a specific operation by controlling the driving circuit 210 or the readout circuit 220 by the control circuit 112 will sometimes simply be referred to as execution of a specific operation by the control circuit 112 hereinafter.

In the timing chart shown in FIG. 22, "radiation" indicates whether the radiation imaging apparatus 110 is irradiated with radiation 160. Low level indicates that the radiation imaging apparatus 110 is not irradiated with the radiation 160 and high level indicates that the radiation imaging apparatus 110 is irradiated with the radiation 160.

In the timing chart shown in FIG. 22, "Vg1" to "Vg8" represent the levels of driving signals supplied from the driving circuit 210 to the driving lines Vg1 to Vg8, respectively. In the example shown in FIG. 22, a case where the pixel array 200 includes eight pixel rows will be described but the number of pixel rows is not limited to this.

In the timing chart shown in FIG. 22, "period" represents a period (time length) during which a specific operation is executed. Imaging by the radiation imaging apparatus 110 includes an accumulation period ("A" in FIG. 22) during which an accumulation operation is executed and a readout period ("R" in FIG. 22) during which a readout operation is executed. The control circuit 112 selects none of a plurality of pixels P included in a pixel array 200 during the accumulation period. More specifically, the driving circuit 210 maintains a state in which an OFF signal is supplied to each of the driving lines Vg1 to Vg8. This accumulates, in each conversion device C, electric charges generated in the conversion device C, and also accumulates electric charges according to a dark current flowing to each conversion device C.

During the readout period, the control circuit 112 selects each of the plurality of pixels P included in the pixel array 200, and reads out a signal from the selected pixel P. More specifically, the driving circuit 210 sequentially supplies an ON signal to each of the driving lines Vg1 to Vg8. First, the driving circuit 210 supplies the ON signal only to the driving line Vg1. This turns on a switch element S(1, j) (j=1, . . . , n), a conversion device C(1, j) and a signal line Sigj are rendered conductive, and thus electric charges accumulated in the conversion device C(1, j) are read out into the signal line Sigj. Next, the driving circuit 210 supplies the ON signal only to the driving line Vg2. This turns on a switch element S(2, j), a conversion device C(2, j) and the signal line Sigj are rendered conductive, and thus electric charges accumulated in the conversion device C(2, j) are read out into the signal line Sigj. When the driving circuit 210 repeats this operation up to the driving line Vg8, the electric charges based on those accumulated in the conversion device C are read out by the readout circuit 220 via the signal line Sigj. In the following description, execution of the readout operation for the plurality of pixels P means execution of the readout operation for each of the plurality of pixels P.

The operation by the radiation imaging apparatus 110 includes an operation executed in imaging preparation, and an operation executed after imaging preparation ends. A period after imaging preparation ends may include a period during which a radiation image is captured, and may further include a period during which a moving image is captured. The period during which the radiation image is captured may be called an imaging period. As will be described later, during the imaging period, the radiation imaging apparatus 110 need not always be irradiated with the radiation 160, and may intermittently be irradiated with the radiation 160.

In imaging preparation, the radiation imaging apparatus 110 is not irradiated with the radiation 160. Imaging preparation may end when a predetermined condition is satisfied. The predetermined condition may be, for example, a condition that a predetermined number of offset images (to be described later) are generated. When imaging preparation ends, the radiation imaging apparatus 110 may notify a computer 120 that radiation irradiation is possible.

After imaging preparation ends, the radiation imaging apparatus 110 is irradiated with the radiation 160, thereby generating a radiation image corresponding to the radiation 160. As shown in FIG. 22, the radiation imaging apparatus 110 may be irradiated with the radiation 160 as a plurality of pulses. The radiation imaging apparatus 110 may generate a radiation image for each pulse. When the radiation imaging apparatus 110 executes moving image capturing, a radiation image for each pulse may form a frame of the moving image.

The control circuit 112 alternately executes the accumulation operation and the readout operation in a state in which radiation irradiation is not performed in imaging preparation. As shown in FIG. 22, the accumulation operation is executed during an accumulation period 411, and signals based on electric charges accumulated in the plurality of pixels P are read out during a subsequent readout period 412. Similarly, in an accumulation period 413 to a readout period 418, the control circuit 112 reads out, during the subsequent readout period, at least signals based on electric charges accumulated during the accumulation period. Signals read out from the pixels P in imaging preparation are used to generate an offset image.

During the readout period 412, a signal based on electric charges accumulated for a time length 401 is read out from the pixel P. The time length 401 is a time length from when the last readout operation of the pixel P ends (that is, the driving signal changes to low level) until the current readout operation of the pixel P ends (that is, the driving signal changes to low level again). The same applies to other time lengths for which electric charges are accumulated. The time length 401 includes the accumulation period 411. During the readout period 414, a signal based on electric charges accumulated for a time length 402 is read out from the pixel P. The time length 402 includes the accumulation period 413.

In the example shown in FIG. 22, the accumulation period 413 is shorter than the accumulation period 411. Thus, the time length 402 is shorter than the time length 401. A signal read out from the pixel P during the readout period 412 is represented as a long-time offset signal (first offset signal), and a signal read out from the pixel P during the readout period 414 is represented as a short-time offset signal (second offset signal).

The image generation circuit 113 generates a long-time offset image S based on the long-time offset signals (first offset signals) read out from the plurality of pixels P included in the pixel array 200. The long-time offset image S is represented as a matrix of m rows and n columns, and the signal read out from the pixel P(i, j) is the (i, j) element of the matrix. The image generation circuit 113 generates a short-time offset image T based on the short-time offset signals (second offset signals) read out from the plurality of pixels P included in the pixel array 200. The short-time offset image T is represented as a matrix of m rows and n columns, and the signal read out from the pixel P(i, j) is the (i, j) element of the matrix.

The control circuit 112 repeatedly executes the operations in the accumulation period 411 to the readout period 414. That is, the same operations as in the accumulation period 411 to the readout period 414 are executed in the accumulation period 415 to the readout period 418. In this way, the control circuit 112 alternately executes the readout operation of reading out the long-time offset signals and the readout operation of reading out the short-time offset signals in imaging preparation.

After imaging preparation ends, the control circuit 112 starts to capture a moving image (that is, a plurality of radiation images). More specifically, the control circuit 112 alternately executes the accumulation operation and the readout operation. As shown in FIG. 22, the accumulation operation is executed during an accumulation period 421, and signals based on electric charges accumulated in the plurality of pixels P are read out during a subsequent readout period 422. Similarly, in an accumulation period 423 to a readout period 428, the control circuit 112 reads out, during the subsequent readout period, at least signals based on electric charges accumulated during the accumulation period. Signals read out from the pixels P after imaging preparation ends are used to generate a radiation image and an offset image.

During the readout period 422, a signal based on electric charges accumulated for a time length 403 is read out from the pixel P. The time length 403 includes the accumulation period 421. The accumulation period 421 includes a period during which the radiation imaging apparatus 110 is irradiated with the radiation 160. Therefore, the time length 403 includes a period during which the radiation imaging apparatus 110 is irradiated with the radiation 160. The time length 403 may be equal to the time length 401. During the readout period 424, a signal based on electric charges accumulated for a time length 404 is read out from the pixel P. The time length 404 includes the accumulation period 423. The time length 404 does not include a period during which the radiation imaging apparatus 110 is irradiated with the radiation 160. The time length 404 may be equal to the time length 402.

In the example shown in FIG. 22, the accumulation period 423 is shorter than the accumulation period 421. Thus, the time length 404 is shorter than the time length 403. A signal read out from the pixel P during the readout period 422 is represented as a radiation signal, and a signal read out from the pixel P during the readout period 424 is represented as an imaging offset signal. The radiation signal includes a component corresponding to the radiation 160 with which the radiation imaging apparatus 110 is irradiated during the accumulation period 421. By setting the accumulation period 423 shorter than the accumulation period 421, the frame rate of the moving image generated by the radiation imaging apparatus 110 can be improved.

The image generation circuit 113 generates a radiation image X based on the radiation signals read out from the plurality of pixels P included in the pixel array 200. The radiation image X is represented as a matrix of m rows and n columns, and the signal read out from the pixel P(i, j) is the (i, j) element of the matrix. The image generation circuit 113 generates an imaging offset image U based on the imaging offset signals (third offset signals) read out from the plurality of pixels P included in the pixel array 200. The imaging offset image U is represented as a matrix of m rows and n columns, and the signal read out from the pixel P(i, j) is the (i, j) element of the matrix.

The control circuit 112 repeatedly executes the operations in the accumulation period 421 to the readout period 424. That is, the same operations as in the accumulation period 421 to the readout period 424 are executed in the accumulation period 425 to the readout period 428. In this way, the control circuit 112 alternately executes the readout operation of reading out the radiation signals and the readout operation of reading out the imaging offset signals after imaging preparation ends (for example, in capturing a moving image).

Subsequently, a method in which the image generation circuit 113 corrects the radiation image X using the long-time offset image S, the short-time offset image T, and the imaging offset image U will be described. As described above, components of the long-time offset image S, the short-time offset image T, the imaging offset image U, and the radiation image X are respectively given by the long-time offset signal, the short-time offset signal, the imaging offset signal, and the radiation signal. In the following method, the radiation signal is corrected using the long-time offset signal, the short-time offset signal, and the imaging offset signal.

As described above, in imaging preparation, the control circuit 112 alternately executes generation of the long-time offset image S and generation of the short-time offset image T. This generates the plurality of long-time offset images S and the plurality of short-time offset images T. In imaging preparation, the image generation circuit 113 creates one long-time offset image S by averaging the plurality of long-time offset images S, and stores the created image in a storage device 170 of the image generation circuit 113 for subsequent processing. Similarly, in imaging preparation, the image generation circuit 113 creates one short-time offset image T by averaging the plurality of short-time offset images T, and stores the created image in the storage device 170 of the image generation circuit 113 for subsequent processing. By averaging the plurality of offset images in this way, noise included in the offset image can be reduced. The number of offset images used for averaging may be two, as shown in FIG. 22, or may be three or more. The number of offset images used for averaging may be preset.

After imaging preparation ends, the image generation circuit 113 generates the radiation image X and the imaging offset image U, and stores them in the storage device 170 of the image generation circuit 113. The image generation circuit 113 reads out the long-time offset image S from the storage device 170, and subtracts the long-time offset image S from the radiation image X, thereby generating a radiation afterimage ("X−S" in FIG. 22). In addition, the image generation circuit 113 reads out the short-time offset image T from the storage device 170, and subtracts the short-time offset image T from the imaging offset image U, thereby generating an offset afterimage ("U−T" in FIG. 22).

An afterimage component included in each of the radiation afterimage (X−S) and the offset afterimage (U−T) is proportional to a time length for which electric charges are accumulated in the pixel P. The image generation circuit 113 performs offset correction before multiplying each element of the offset afterimage (U−T) by a coefficient k equal to the ratio of the time length 403 to the time length 404 (that is, a value obtained by dividing the time length 403 by the time length 404).

The image generation circuit 113 performs offset correction of offset noise signals included in the short-time offset signal (second offset signal) and the imaging offset signal (third offset signal), and generates a radiation image based on correction of a radiation signal using the long-time offset signal (first offset signal) and the short-time offset signal and imaging offset signal having undergone offset correction.

The image generation circuit 113 generates an offset correction value using pixel information of a light-shielded pixel included in the short-time offset image T generated based on the short-time offset signals and pixel information of a light-shielded pixel included in the imaging offset image U generated based on the imaging offset signals. The image generation circuit 113 performs offset correction of reducing the offset noise signals using a generated offset correction value V.

By using, as pixel information, the average value of the pixel values of optical black pixels (OBs) included in the offset afterimage, the image generation circuit 113 may generate the offset correction value V to be used for offset correction. With respect to the OBs used for offset correction, the average value of the pixel values of pixels in a region where an irradiation field is narrowed by a collimator and a region where X-rays are shielded may be used as pixel information. Furthermore, in a case where the characteristic changes for each pixel row (line) of the offset afterimage, the offset correction value V may be calculated using, as pixel information, the average value of the pixel values of OBs on the left and right side of each pixel row (line) of the offset afterimage or light-shielded pixels on each pixel row (line).

In a driving method of reading out an image, the offset characteristic for each pixel row may change in a case where, for example, a mode of reading out only the same pixel row within a short time or a cropping readout mode of narrowing an irradiation field is switched to a mode of reading out signals based on electric charges from all the pixel rows (all screen lines) of the pixel array in which the plurality of pixels P are arrayed in a matrix.

In the fifth embodiment, by executing offset correction before multiplying each element of the offset afterimage by the coefficient k, it is possible to reduce artifact caused by the offset characteristic.

The image generation circuit 113 generates an offset afterimage ("(U−T)−V" in FIG. 22) based on the offset signals having undergone offset correction by performing offset correction for the offset afterimage using the offset value V. After that, the image generation circuit 113 generates an adjustment afterimage ("k((U−T)−V)" in FIG. 22) by multiplying each element of the offset afterimage ((U−T)−V) after offset correction by the coefficient k equal to the ratio of the time length 403 to the time length 404 (that is, a value obtained by dividing the time length 403 by the time length 404). Then, the image generation circuit 113 generates a radiation image X'("X−S−k((U−T)−V)" in FIG. 22) by subtracting the adjustment afterimage (k((U−T)−V)) from the radiation afterimage (X−S). The radiation image X' is an image obtained by correcting the radiation image X using the long-time offset image S, the short-time offset image T, the imaging offset image U, the offset correction value V of the offset afterimage (U−T), and the coefficient k. The image generation circuit 113 transmits the corrected radiation image X' to the computer 120.

The above-described calculation order for generating the radiation image X' is merely an example, and calculation may be performed in another order. The offset correction value V can include a correction value Vt for the second offset signal calculated based on the pixel information (for example, the pixel values) of a light-shielded region included in an image based on the short-time offset signals (second offset signals), and a correction value Vu for the third offset signal calculated based on the pixel information of a light-shielded region included in an image based on the imaging offset signals (third offset signals). The image generation circuit 113 performs offset correction of an offset noise signal included in the short-time offset signal (second offset signal) using the correction value Vt for the second offset signal, and performs offset correction of an offset noise signal included in the imaging offset signal (third offset signal) using the correction value Vu for the third offset signal. The image generation circuit 113 corrects a radiation signal using the long-time offset signal, the coefficient k, and the short-time offset signal and imaging offset signal having undergo offset correction.

The radiation image X', that is, X−S−k((U−T)−V) is changed to X−k(U−Vu)+(k(T−Vt)−S). Thus, in imaging preparation, the image generation circuit 113 may calculate k (T−Vt)−S using the long-time offset image S, the short-time offset image T, and the coefficient k, and store this value as a correction value in the storage device 170 of the image generation circuit 113. At this time, Vu represents an offset correction value calculated from the pixel information of a light-shielded region or OBs in the imaging offset image U, and Vt represents an offset correction value calculated from the pixel information of a light-shielded region or OBs in the short-time offset image T.

In imaging preparation, the image generation circuit 113 may store, in the storage device 170, the first correction value calculated using the long-time offset signal (first offset signal), the short-time offset signal (second offset signal), and the correction value Vt for the second offset signal. The first correction value can be obtained as (T−Vt)−S by each image generated based on each signal. After calculating the coefficient k, the first correction value can be obtained as k (T−Vt)−S.

After imaging preparation ends, the image generation circuit 113 may correct the radiation signal using the second correction value calculated using the imaging offset signal (third offset signal) and the correction value Vu for the third offset signal, and the first correction value stored in the storage device 170 of the image generation circuit 113. The second correction value can be obtained as (U−Vu) by each image generated based on each signal. Furthermore, after calculating the coefficient k, the second correction value can be obtained as k(U−Vu).

Note that if the time length 404 (fourth time length) is equal to the time length 403 (third time length), calculation of the ratio can be omitted, and the first correction value and the second correction value can be obtained using the coefficient k=1. On the other hand, if the time length 404 is different from the time length 403, the image generation circuit 113 may correct the radiation signal using the short-time offset signal (second offset signal) and imaging offset signal (third offset signal) having undergone offset correction further using the ratio of the time length 403 (third time length) to the time length 404 (fourth time length).

The image generation circuit 113 may set, as offset correction target regions, all the regions (all the screen lines) formed by a plurality of pixel rows and a plurality of pixel columns regardless of the control of the control circuit 112. Alternatively, the image generation circuit 113 may set, as an offset correction target region, a region of interest formed by a specific pixel row or pixel column among the plurality of pixel rows and the plurality of pixel columns, which is read out based on the control of the control circuit 112.

The coefficient k can be decided based on the preset of a timing at which the driving circuit 210 supplies the ON signal to the pixel array 200. In capturing a moving image, the image generation circuit 113 may correct the radiation image X using the imaging offset image U, the correction value stored in the storage device 170, and the coefficient k. In this way, by storing the correction value instead of storing the long-time offset image S and the short-time offset image T, it is possible to reduce the memory consumption of the storage device 170 of the image generation circuit 113.

Subsequently, the technical significance to alternately execute obtaining of the long-time offset image S and obtaining of the short-time offset image T will be described. The driving lines Vg1 to Vgm have various capacitive couplings in the pixel array 200. For example, the driving line Vg2 intersects the signal lines Sig1 to Sign at a plurality of positions of the pixel array 200, and has capacitive coupling at each intersection. Since the driving line Vg2 extends in parallel to the driving line Vg3, it also has capacitive coupling with the driving line Vg3. Since the driving line Vg2 extends in parallel to part of a bias line Bs, it also has capacitive coupling with the bias line Bs. Furthermore, the driving line Vg2 has capacitive coupling with a node of a connecting portion between the switch element S and the conversion device C.

These capacitive couplings change the level of the driving signal supplied to the driving line Vg, and thus potentials of the signal line Sig, the bias line Bs, other driving lines Vg, and the node of the connecting portion between the switch element S and the conversion device C also change. The signal line Sig, the bias line Bs, the driving lines Vg, and the node of the connecting portion between the switch element S and the conversion device C whose potentials have changed return to the original potentials with time. However, the return amount is different depending on the length of the accumulation period.

Even if the switch element S is in the OFF state, a leakage current may flow. When the switch element S is turned off, the node between the conversion device C and the switch element S changes to the low level side due to injection of electric charges from the control terminal (gate). Therefore, immediately after the switch element S is turned off, a potential difference is generated between the main terminals (source and drain) to cause a leakage current to flow. The leakage current depends on the potential difference between the two main terminals (source and drain) of the switch element. If a leakage current flows during the accumulation period, the potential difference becomes small, and thus the leakage current is different depending on the length of the accumulation period. If the leakage current flows to the switch element S, a current also flows to the signal line Sig and the bias line Bs.

For the above reasons, obtained offset images may be different between a case where the long-time offset image S and the short-time offset image T are continuously obtained a plurality of times and a case where the long-time offset image S and the short-time offset image T are alternately obtained. In the above-described operation of the radiation imaging apparatus 110, the long-time offset image S and the short-time offset image T are alternately obtained in imaging preparation, and the radiation image X and the imaging offset image U are alternately obtained after imaging preparation ends. This can make the state of the capacitive coupling in the pixel array 200 in imaging preparation close to the state of the capacitive coupling in the pixel array 200 in capturing a radiation image. Therefore, it is possible to accurately reduce noise included in the radiation image X.

In the operation shown in FIG. 22, the image generation circuit 113 corrects the radiation signal using the imaging offset signal obtained after the radiation signal. Instead of this, the image generation circuit 113 may correct the radiation signal using the imaging offset signal obtained before the radiation signal.

In the above-described example, the time length 401 is equal to the time length 403. Instead of this, these time lengths may be different from each other. In a case where the time lengths are different from each other, the image generation circuit 113 may multiply each element of the long-time offset image S by the ratio of the time length 403 to the time length 401, and then subtract the resultant from the radiation image X. In the above-described example, the time length 402 is equal to the time length 404. Instead of this, these time lengths may be different from each other. In a case where the time lengths are different from each other, the image generation circuit 113 may multiply each element of the short-time offset image T by the ratio of the time length 404 to the time length 402, and then subtract the resultant from the imaging offset image U.

Subsequently, an example of the operation of the radiation imaging apparatus 110 different from the above-described operation shown in FIG. 22 will be described with reference to FIG. 23. In the operation shown in FIG. 22, to generate the short-time offset image T and the imaging offset image U, the control circuit 112 selects one of the plurality of pixel rows at one time. In the operation shown in FIG. 23, to generate the short-time offset image T and the imaging offset image U, the control circuit 112 selects two of the plurality of pixel rows at one time. More specifically, the control circuit 112 simultaneously selects the (2h−1)th pixel row and the 2hth pixel row (h=1, . . . , m/2). Such operation of simultaneously selecting a plurality of pixel rows can be called a binning operation. In the example shown in FIG. 23, two pixel rows are simultaneously selected but three or more pixel rows may simultaneously be selected.

The plurality of pixel rows include the first pixel row including the first pixel and the second pixel row including the second pixel, and the driving circuit 210 reads out imaging offset signals based on electric charges accumulated in the first pixel and electric charges accumulated in the second pixel by selecting the first pixel row and the second pixel row. For example, the control circuit 112 selects the first pixel row and the second pixel row during a period (that may be referred to as the first pixel row selection period) in which the driving signal supplied to the driving line Vg1 is at high level in the readout period 424. This reads out imaging offset signals based on electric charges accumulated in the pixel P(1, j) and electric charges accumulated in the pixel P(2, j).

By reading out the imaging offset signals by the binning operation, it is possible to shorten the readout period (for example, the readout period 424) for reading out the imaging offset signals. As a result, it is possible to improve the frame rate of a moving image. The accumulation period 423 may be shorter than the accumulation period 421 or may be equal to the accumulation period 421. Even if the length of the accumulation period 423 is equal to that of the accumulation period 421, it is possible to improve the frame rate of a moving image by reading out the imaging offset signals by the binning operation. Since the imaging offset signals are read out by the binning operation, short-time offset signals to be used as differences from the imaging offset signals may be read out by the binning operation. Instead of this, the short-time offset signal may be read out by a normal operation (selection of one row). In this case, the short-time offset signal may be multiplied by the coefficient for adjusting the time length for which electric charges are accumulated in the pixel P.

Figure 23:
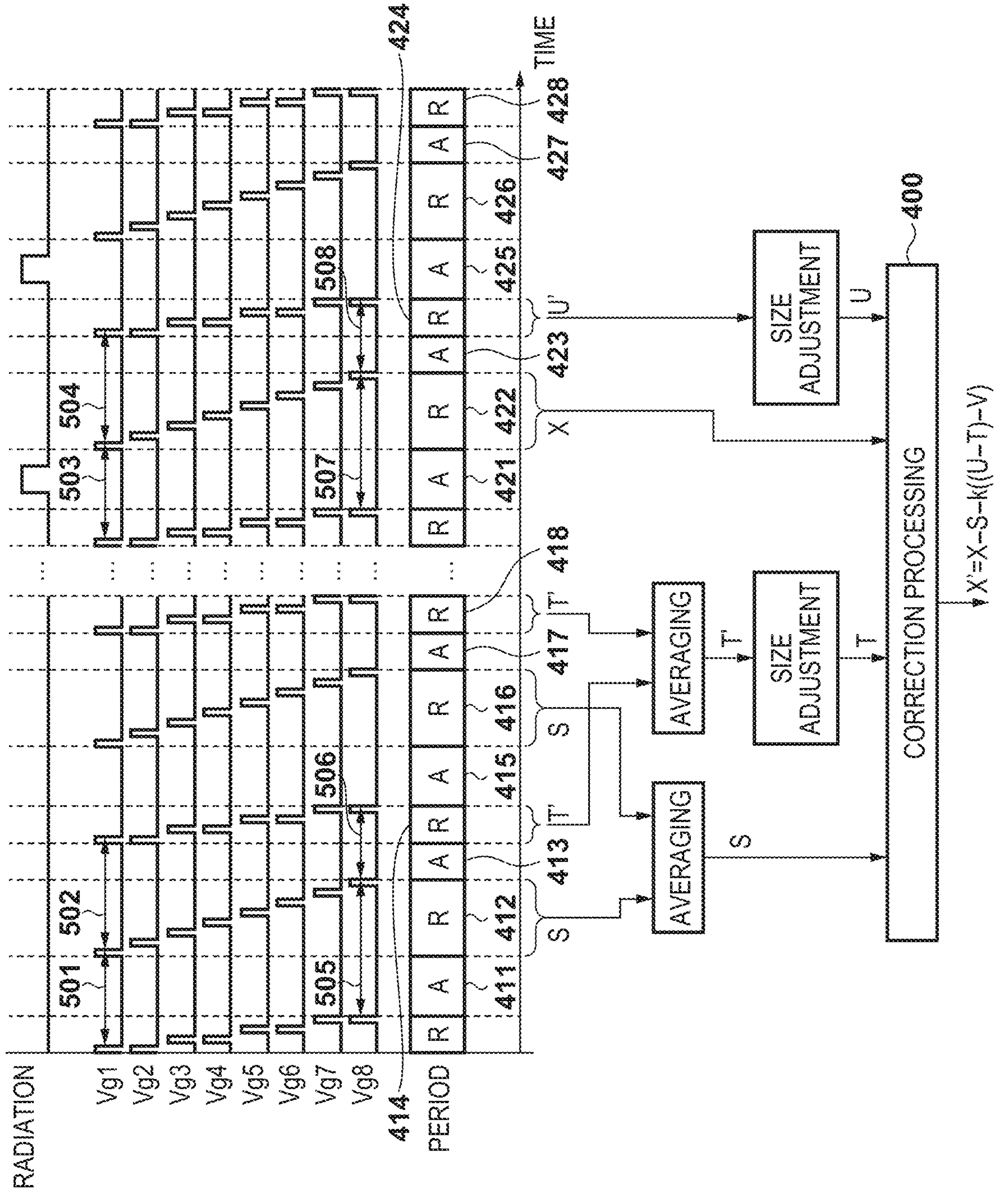
FIG. 23 is a view for explaining an example of the operation of the radiation imaging system according to some embodiments.

In the operation shown in FIG. 23, to generate the long-time offset image S and the radiation image X, the control circuit 112 may select one of the plurality of pixel rows at one time, similar to the operation shown in FIG. 22. For example, the control circuit 112 selects the first pixel row and does not select another row (for example, the second pixel row) during a period (that may be referred to as the first pixel row selection period) in which the driving signal supplied to the driving line Vg1 is at high level in the readout period 422. This reads out a radiation signal based on electric charges accumulated in the pixel P(1, j). Instead of the operation shown in FIG. 23, the binning operation may be performed to generate the long-time offset image S and the radiation image X.

Subsequently, a radiation image generation method in the operation shown in FIG. 23 will be described. The image generation circuit 113 generates the long-time offset image S in imaging preparation, as in the explanation of FIG. 22. Furthermore, in imaging preparation, the image generation circuit 113 generates a short-time offset image T' based on the short-time offset signals read out, by the binning operation, from the plurality of pixels P included in the pixel array 200. The short-time offset image T' is represented as a matrix of (m/2) rows and n columns, and signals read out from the pixels P(2i−1, j) and P(2i, j) are the (i, j) elements of the matrix (i=1, . . . , m/2, j=1, . . . , n). The image generation circuit 113 may generate one short-time offset image T' by averaging the plurality of short-time offset images T'.

After that, the image generation circuit 113 generates the short-time offset image T by adjusting the size of the short-time offset image T' to be equal to the size of the radiation image X. More specifically, the image generation circuit 113 sets, as the (i, j) element (i=1, . . . , m, j=1, . . . , n) of the short-time offset image T, a value obtained by multiplying the (Ceiling (i/2), j) element of the short-time offset image T' by ½. Ceiling represents a ceiling function, that is, round-up of digits after the decimal point. The reason why the element is multiplied by ½ is that each element of the short-time offset image T' represents the sum of the signals of two pixels.

After that, as in the explanation of FIG. 22, the image generation circuit 113 generates the radiation image X after imaging preparation ends. The driving circuit 210 reads out the radiation image based on the electric charges accumulated in the first pixel by selecting the first pixel row during the second selection period, and the driving circuit 210 selects no second pixel row during the second selection period. After imaging preparation ends, the image generation circuit 113 generates an imaging offset image U' based on the imaging offset signals read out, by the binning operation, from the plurality of pixels P included in the pixel array 200. A method of generating the imaging offset image U' is the same as the method of generating the short-time offset image T' and a description thereof will be omitted. After that, the image generation circuit 113 generates the imaging offset image U by adjusting the size of the imaging offset image U' to be equal to the size of the radiation image X. A method of generating the imaging offset image U is the same as the method of generating the short-time offset image T and a description thereof will be omitted.

The image generation circuit 113 generates the radiation image X' by correcting the radiation image X using the thus generated long-time offset image S, short-time offset image T, and imaging offset image U. The correction processing of the radiation image X may be the same as correction processing 400 shown in FIG. 22 and a description thereof will be omitted.

The adjustment of the size of the offset image may be performed in another order. For example, the image generation circuit 113 may generate the adjustment image of the correction processing 400 without adjusting the size of the offset image, and then adjust the size of the adjustment image.

As shown in FIG. 23, the ratio of the length of the accumulation time of electric charges read out as a radiation signal to the length of the accumulation time of electric charges read out as an imaging offset signal is different for each pixel row. This is caused by reading out the radiation signal by a normal operation (that is, one of pixel rows is selected) and reading out the imaging offset signals by the binning operation. For example, on the first pixel row, a radiation signal based on electric charges accumulated in the pixel P for a time length 503 is read out and an imaging offset signal based on electric charges accumulated in the pixel P for a time length 504 is read out. On the eighth pixel row, a radiation signal based on electric charges accumulated in the pixel P for a time length 507 is read out and an imaging offset signal based on electric charges accumulated in the pixel P for a time length 508 is read out. The time length 507 is different from the time length 503. The time length 508 is different from the time length 504. Furthermore, the ratio of the time length 508 to the time length 507 is different from the ratio of the time length 503 to the time length 504.

The image generation circuit 113 may use the individual coefficient k for each pixel row in the correction processing 400. More specifically, the image generation circuit 113 may use the ratio of the time length 503 to the time length 504 as the coefficient k with respect to the pixels P included in the first pixel row. The image generation circuit 113 may use the ratio of the time length 507 to the time length 508 as the coefficient k with respect to the pixels P included in the eighth pixel row. The ratio of the time length 507 to the time length 508 is different from the ratio of the time length 503 to the time length 504.

With respect to each of the plurality of pixel rows, the length of the accumulation time of the electric charges read out as a long-time offset signal may be equal to the length of the accumulation time of the electric charges read out as a radiation signal. For example, with respect to the first pixel row, a time length 501 may be equal to the time length 503 and a time length 502 may be equal to the time length 504. With respect to the eighth pixel row, a time length 505 may be equal to the time length 507 and a time length 506 may be equal to the time length 508.

Figure 24:
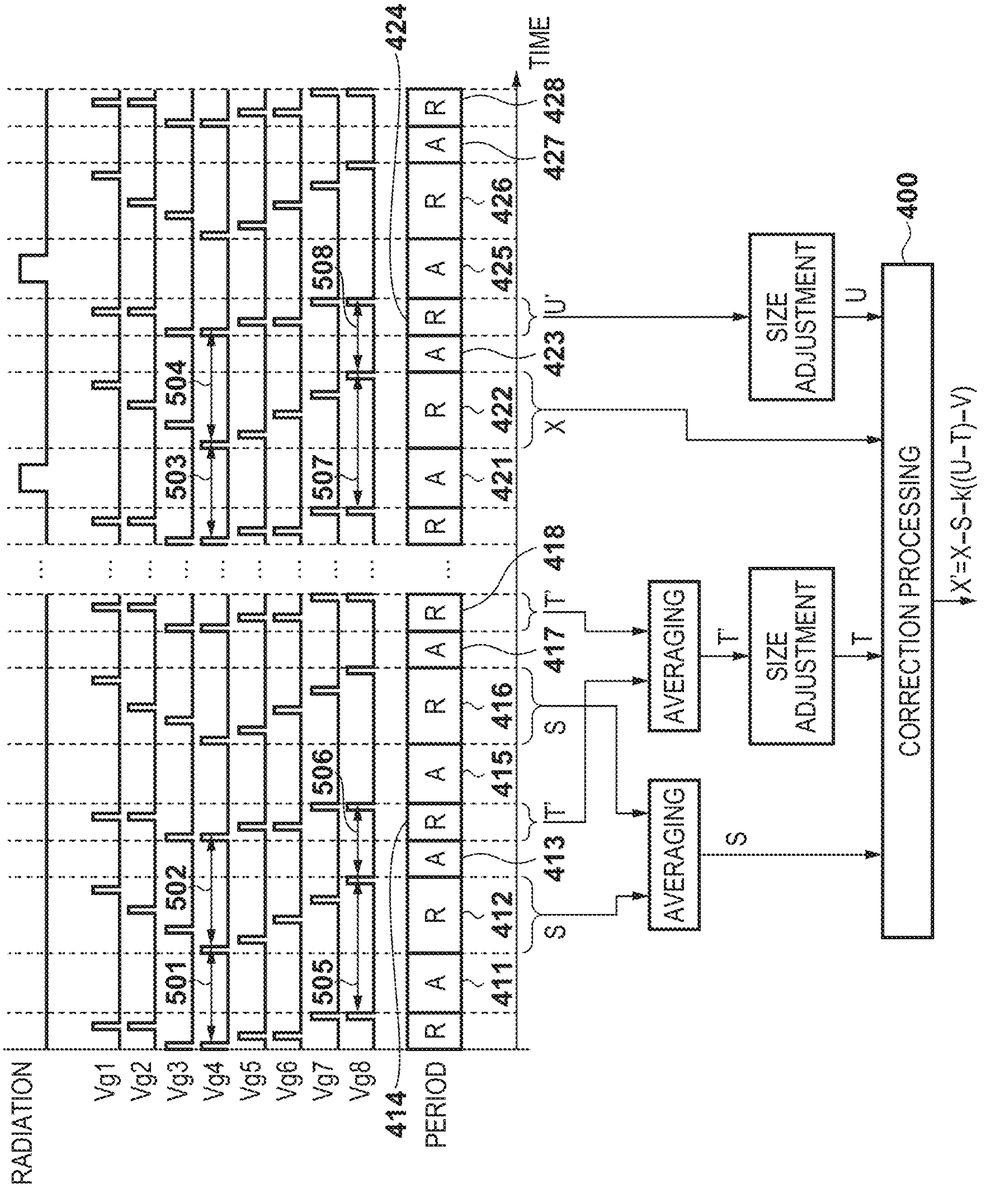
FIG. 24 is a view for explaining an example of the operation of the radiation imaging system according to some embodiments.

Subsequently, an example of the operation of the radiation imaging apparatus 110 different from the above-described operation shown in FIG. 22 will be described with reference to FIG. 24. In the operation shown in FIG. 24, similar to the operation shown in FIG. 23, the short-time offset signals and the imaging offset signals are read out by the binning operation. In the operation shown in FIG. 24, to read out a signal from each of the plurality of pixels P included in the pixel array 200, a pixel row is selected outward from the center of the plurality of pixel rows. In the example of the operation of the radiation imaging apparatus 110, the driving circuit 210 selects pixel rows located at the center of the plurality of pixel rows during one readout period in which each of the plurality of pixel rows is selected, before two pixel rows located at the two ends of the plurality of pixel rows. More specifically, in the example shown in FIG. 24, to read out the long-time offset signals and the radiation signals, the control circuit 112 sequentially selects the pixel rows in the order of the fourth row, the fifth row, the third row, the sixth row, the second row, the seventh row, the first row, and the eighth row. To read out the short-time offset signals and the imaging offset signals, the control circuit 112 sequentially selects the pixel rows in the order of the third and fourth rows, the fifth and sixth rows, the first and second rows, and the seventh and eighth rows. In this way, in the operation shown in FIG. 24, the control circuit 112 selects pixel rows located at the center of the plurality of pixel rows before two pixel rows located at the two ends of the plurality of pixel rows.

In the operation shown in FIG. 24, the coefficient k for the pixel row selected first is smaller than the coefficient k for the pixel row selected later. As the coefficient k is larger, noise included in the short-time offset signal and the imaging offset signal can be increased. Therefore, by selecting the pixel rows so that the coefficient k for the pixel P which is located at the center of the image and highly probably becomes a region of interest of the radiation image is small, it is possible to further reduce a deterioration in image quality of the radiation image caused by noise. In a case where the coefficient k is large, noise may be increased. Therefore, the coefficient k may be set to a value smaller than the ratio between the lengths of the electric charge accumulation times in accordance with the degree of influence of an afterimage.

Subsequently, an example of the operation of the radiation imaging apparatus 110 different from the above-described operation shown in FIG. 22 will be described with reference to FIG. 25. In the operation shown in FIG. 25, similar to the operation shown in FIG. 23, the short time offset signals and the imaging offset signals are read out by the binning operation. In the operation shown in FIG. 25, the control circuit 112 switches, for each readout period, a combination of pixel rows to be selected to read out the imaging offset signals by the binning operation. Similarly, the control circuit 112 switches, for each readout period, a combination of pixel rows to be selected to read out the imaging offset signals by the binning operation.

First, an operation in imaging preparation will be described. An operation in an accumulation period 711 to an accumulation period 713 and an operation in an accumulation period 715 to an accumulation period 717 may be the same as the operation in the accumulation period 411 to the accumulation period 413 in FIG. 22 and a description thereof will be omitted. During a readout period 714, the control circuit 112 simultaneously selects the (2h−1)th pixel row and the 2hth pixel row (h=1, . . . , m/2). This reads out imaging offset signals based on electric charges accumulated in the pixel P(2h−1, j) and electric charges accumulated in the pixel P(2h, j). During a readout period 718, the control circuit 112 simultaneously selects the 2hth pixel row and the (2h+1)th pixel row (h=1, . . . , m/2−1). This reads out imaging offset signals based on electric charges accumulated in the pixel P(2h−1, j) and electric charges accumulated in the pixel P(2h, j). Note that the pixel rows (that is, the first row and the mth row) located at the two ends of the plurality of pixel rows are selected one by one.

Similar to the operation shown in FIG. 22, the image generation circuit 113 generates the long-time offset image S. The image generation circuit 113 generates a short-time offset image T1' using the short-time offset signals read out during the readout period 714, and generates a short-time offset image T2' using the short-time offset signals read out during the readout period 718. The image generation circuit 113 generates each of the short-time offset images T1 and T2 by adjusting the size of each of the short-time offset images T1' and T2'. The image generation circuit 113 generates the short-time offset image T by averaging the short-time offset images T1 and T2. By averaging the combination of the different pixel rows in this way, it is possible to improve the resolution in the column direction (the vertical direction in FIG. 25) of the short-time offset image T. In the example of FIG. 25, only one short-time offset image T1' and one short-time offset image T2' are shown. To generate the short-time offset image T, the plurality of short-time offset images T1' and T2' may be averaged.

Subsequently, an operation after imaging preparation ends (for example, in capturing a moving image) will be described. An operation in a readout period 721 to a readout period 727 may be the same as the operation in the readout period 712 to the readout period 718 and a description thereof will be omitted.

Similar to the operation shown in FIG. 22, the image generation circuit 113 generates the radiation image X. The image generation circuit 113 generates an imaging offset image U1' using the imaging offset signals read out during the readout period 723, and generates an imaging offset image U2' using the imaging offset signals read out during the readout period 727. The image generation circuit 113 generates each of imaging offset images U1 and U2 by adjusting the size of each of the imaging offset images U1' and U2'. The image generation circuit 113 generates the imaging offset image U by averaging the imaging offset images U1 and U2. By averaging the combination of the different pixel rows in this way, it is possible to improve the resolution in the column direction (the vertical direction in FIG. 25) of the imaging offset image U.

Figure 25:
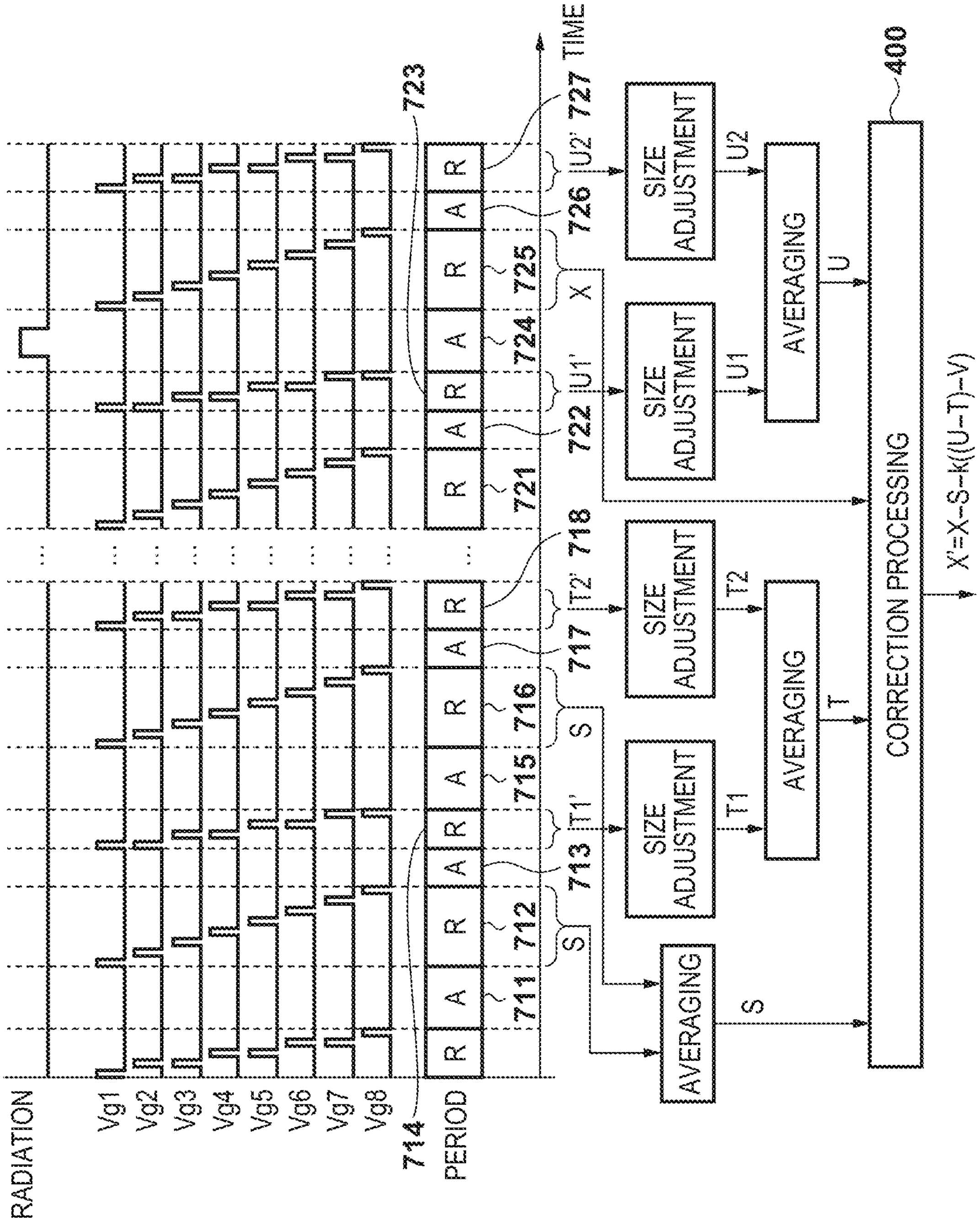
FIG. 25 is a view for explaining an example of the operation of the radiation imaging system according to some embodiments.

For example, as shown in FIG. 25, the plurality of pixel rows further include the third pixel row including the third pixel, and the driving circuit 210 reads out the radiation image based on the electric charges accumulated in the first pixel by selecting the first pixel row during the second selection period, and the driving circuit 210 selects no second pixel row during the second selection period.

The driving circuit 210 reads out the imaging offset signals based on the electric charges accumulated in the second pixel and the electric charges accumulated in the third pixel by selecting the second pixel row and the third pixel row during the third selection period. The driving circuit 210 selects no third pixel row during the first selection period, and selects no first pixel row during the third selection period. The image generation circuit 113 corrects the radiation signal read out during the second selection period using the long-time offset signal (first offset signal), the short-time offset signal (second offset signal), the imaging offset signal (third offset signal) read out during the first selection period, and the imaging offset signal (third offset signal) read out during the third selection period.

After that, the image generation circuit 113 generates the radiation image X' by correcting the radiation image X using the thus generated long-time offset image S, short-time offset image T, and imaging offset image U. The correction processing of the radiation image X may be the same as the correction processing 400 shown in FIG. 22 and a description thereof will be omitted. As described above, the imaging offset image U is generated using the imaging offset signals read out during the readout period 723 before the accumulation period 724 in which irradiation with the radiation 160 is performed and the imaging offset signals read out during the readout period 727 after the accumulation period 724. This can reduce noise in the radiation image X more accurately. In this example, the accumulation period 726 during which none of the plurality of pixels are selected and which does not include a period in which the radiation imaging apparatus is irradiated with radiation is shorter than the accumulation period 724.

In the above-described fifth embodiment, the pixel array 200 includes only the pixels P to be used to generate a radiation image. Instead of this, the pixel array 200 may include pixels to be used for the purpose other than generation of a radiation image, like pixels to be used for automatic exposure control.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a ‘non-transitory computer-readable storage medium’) to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-097247, filed Jun. 13, 2023, Japanese Patent Application No. 2023-191126, filed Nov. 8, 2023, Japanese Patent Application No. 2023-191127, filed Nov. 8, 2023, and Japanese Patent Application No. 2024-011258, filed Jan. 29, 2024, which are hereby incorporated by reference herein in their entirety.

What is claimed is:

1. A radiation imaging apparatus comprising:
- a plurality of pixels arranged to form a plurality of pixel rows and a plurality of pixel columns and configured to generate and accumulate electric charges;
- a driving circuit configured to supply, to the plurality of pixels, a driving signal for selecting one of the plurality of pixels;
- a readout circuit configured to read out a signal based on the electric charges accumulated in the pixel selected by the driving signal;
- a control circuit configured to control the readout circuit and the driving circuit; and
- an image generation circuit configured to generate a radiation image,
- wherein with respect to at least a first pixel among the plurality of pixels,
- the control circuit controls the readout circuit and the driving circuit to
- alternately execute, in imaging preparation,
- a first readout operation of reading out a first offset signal based on electric charges accumulated in the first pixel for a first time length, and
- a second readout operation of reading out a second offset signal based on electric charges accumulated in the first pixel for a second time length shorter than the first time length, and
- alternately execute, after imaging preparation ends,
- a third readout operation of reading out a radiation signal based on electric charges accumulated in the first pixel for a third time length including a period during which the radiation imaging apparatus is irradiated with radiation, and
- a fourth readout operation of reading out a third offset signal based on electric charges accumulated in the first pixel for a fourth time length shorter than the third time length without including a period during which the radiation imaging apparatus is irradiated with the radiation, and
- the image generation circuit generates the radiation image based on correction of the radiation signal using the first offset signal, the second offset signal, and the third offset signal.

2. The apparatus according to claim 1, wherein
- the plurality of pixel rows include a first pixel row including the first pixel and a second pixel row including a second pixel, and
- the driving circuit reads out the third offset signal based on electric charges accumulated in the first pixel and electric charges accumulated in the second pixel by selecting the first pixel row and the second pixel row during a first selection period.

3. The apparatus according to claim 2, wherein
- the driving circuit reads out the radiation image based on electric charges accumulated in the first pixel by selecting the first pixel row during a second selection period, and
- the driving circuit does not select the second pixel row during the second selection period.

4. The apparatus according to claim 3, wherein
- the plurality of pixel rows further include a third pixel row including a third pixel,
- the driving circuit reads out the third offset signal based on electric charges accumulated in the first pixel and electric charges accumulated in the third pixel by selecting the first pixel row and the third pixel row during a third selection period, and
- the driving circuit does not select the third pixel row during the first selection period, and does not select the second pixel row during the third selection period.

5. The apparatus according to claim 4, wherein the image generation circuit corrects the radiation signal read out during the second selection period using the first offset signal, the second offset signal, the third offset signal read out during the first election period, and the third offset signal read out during the third election period.

6. The apparatus according to claim 1, wherein
- imaging by the radiation imaging apparatus includes, after imaging preparation ends,
- a first accumulation period during which none of the plurality of pixels are selected and which includes a period during which the radiation imaging apparatus is irradiated with the radiation,
- a first readout period during which each of the plurality of pixels is selected to read out at least a signal based on electric charges accumulated during the first accumulation period,
- a second accumulation period during which none of the plurality of pixels are selected and which includes no period during which the radiation imaging apparatus is irradiated with the radiation, and
- a second readout period during which each of the plurality of pixels is selected to read out at least a signal based on electric charges accumulated during the second accumulation period, and
- the second accumulation period is shorter than the first accumulation period.

7. The apparatus according to claim 1, wherein the driving circuit selects a pixel row located at a center of the plurality of pixel rows before two pixel rows located at two ends of the plurality of pixel rows during one readout period in which each of the plurality of pixel rows is selected.

8. The apparatus according to claim 1, wherein the image generation circuit
- stores, in a memory, a correction value calculated using the first offset signal and the second offset signal in imaging preparation, and
- corrects the radiation signal using the third offset signal and the correction value stored in the memory after imaging preparation ends.

9. The apparatus according to claim 1, wherein the image generation circuit corrects the radiation signal further using a ratio of the third time length to the fourth time length.

10. The apparatus according to claim 9, wherein with respect to a fourth pixel among the plurality of pixels, the control circuit controls the readout circuit and the driving circuit to alternately execute, in imaging preparation, a fifth readout operation of reading out a fourth offset signal based on electric charges accumulated in the fourth pixel for a fifth time length, and a sixth readout operation of reading out a fifth offset signal based on electric charges accumulated in the fourth pixel for a sixth time length shorter than the fifth time length, and execute, after imaging preparation ends, a seventh readout operation of reading out a second radiation signal based on electric charges accumulated in the fourth pixel for a seventh time length including a period during which the radiation imaging apparatus is irradiated with the radiation, and an eighth readout operation of reading out a sixth offset signal based on electric charges accumulated in the fourth pixel for an eighth time length shorter than the seventh time length without including a period during which the radiation imaging apparatus is irradiated with the radiation, the image generation circuit generates the radiation image further based on correction of the second radiation signal using the fourth offset signal, the fifth offset signal, the sixth offset signal, and the ratio of the seventh time length to the eighth time length, and the ratio of the seventh time length to the eighth time length is different from the ratio of the third time length to the fourth time length.

11. The apparatus according to claim 1, wherein the image generation circuit corrects the radiation signal using the third offset signal obtained after the radiation signal.

12. The apparatus according to claim 1, wherein the third time length is equal to the first time length, and the fourth time length is equal to the second time length.

13. A radiation imaging system comprising:

a radiation imaging apparatus defined in claim 1; and a signal processing unit configured to process a radiation image obtained by the radiation imaging apparatus.

14. A control method for a radiation imaging apparatus including a plurality of pixels arranged to form a plurality of pixel rows and a plurality of pixel columns and configured to generate and accumulate electric charges, comprising:

with respect to at least a first pixel among the plurality of pixels, alternately executing, in imaging preparation, a first readout operation of reading out a first offset signal based on electric charges accumulated in the first pixel for a first time length, and a second readout operation of reading out a second offset signal based on electric charges accumulated in the first pixel for a second time length shorter than the first time length;

alternately executing, after imaging preparation ends, a third readout operation of reading out a radiation signal based on electric charges accumulated in the first pixel for a third time length including a period during which the radiation imaging apparatus is irradiated with radiation, and a fourth readout operation of reading out a third offset signal based on electric charges accumulated in the first pixel for a fourth time length shorter than the third time length without including a period during which the radiation imaging apparatus is irradiated with the radiation; and generating a radiation image based on correction of the radiation signal using the first offset signal, the second offset signal, and the third offset signal.

15. A radiation imaging apparatus comprising:

a plurality of pixels arranged to form a plurality of pixel rows and a plurality of pixel columns and configured to generate and accumulate electric charges;

a driving circuit configured to supply, to the plurality of pixels, a driving signal for selecting one of the plurality of pixels;

a readout circuit configured to read out a signal based on the electric charges accumulated in the pixel selected by the driving signal;

a control circuit configured to control the readout circuit and the driving circuit; and an image generation circuit configured to generate a radiation image, wherein with respect to at least a first pixel among the plurality of pixels, the control circuit controls the readout circuit and the driving circuit to alternately execute, in imaging preparation, a first readout operation of reading out a first offset signal based on electric charges accumulated in the first pixel for a first time length, and a second readout operation of reading out a second offset signal based on electric charges accumulated in the first pixel for a second time length shorter than the first time length, and alternately execute, after imaging preparation ends, a third readout operation of reading out a radiation signal based on electric charges accumulated in the first pixel for a third time length including a period during which the radiation imaging apparatus is irradiated with radiation, and a fourth readout operation of reading out a third offset signal based on electric charges accumulated in the first pixel for a fourth time length shorter than the third time length without including a period during which the radiation imaging apparatus is irradiated with the radiation, and the image generation circuit performs offset correction of offset noise signals included in the second offset signal and the third offset signal, and generates the radiation image based on correction of the radiation signal using the first offset signal, and the second offset signal and the third offset signal having undergone the offset correction.

* * * * *